United States Patent
Tokiwa et al.

(10) Patent No.: US 10,785,416 B2
(45) Date of Patent: Sep. 22, 2020

(54) CAMERA, DISPLAY CONTROL METHOD OF CAMERA, AND DISPLAY CONTROL PROGRAM OF CAMERA

(71) Applicant: FUJIFILM Corporation, Tokyo (JP)

(72) Inventors: Kentaro Tokiwa, Saitama (JP); Hirofumi Horii, Saitama (JP); Yuichi Fujimura, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/292,752

(22) Filed: Mar. 5, 2019

(65) Prior Publication Data

US 2019/0199936 A1 Jun. 27, 2019

Related U.S. Application Data

(63) Continuation of application No. PCT/JP2017/034747, filed on Sep. 26, 2017.

(30) Foreign Application Priority Data

Sep. 27, 2016 (JP) .................. 2016-188698

(51) Int. Cl.
*H04N 5/232* (2006.01)
*H04N 5/225* (2006.01)
(Continued)

(52) U.S. Cl.
CPC ......... *H04N 5/232939* (2018.08); *G03B 7/00* (2013.01); *G03B 17/02* (2013.01);
(Continued)

(58) Field of Classification Search
CPC ............................................. H04N 5/232939
(Continued)

(56) References Cited

U.S. PATENT DOCUMENTS

2004/0169726 A1 9/2004 Moustier et al.
2006/0215043 A1 9/2006 Furukawa
(Continued)

FOREIGN PATENT DOCUMENTS

CN 1554036 A 12/2004
CN 101452366 A 6/2009
(Continued)

OTHER PUBLICATIONS

Bildstrom, "BGH Decision", Feb. 26, 2015, pp. 1-21, with partial translation.
(Continued)

*Primary Examiner* — Joel W Fosselman
(74) *Attorney, Agent, or Firm* — Birch, Stewart, Kolasch & Birch, LLP

(57) ABSTRACT

Provided are a camera having good visibility and operability with a compact configuration, a display control method of the camera, and a display control program of the camera. A sub-display 16 is provided on a top surface of a camera body 10. A first operation dial D1 and a second operation dial D2 are provided near the sub-display 16. The sub-display 16 displays setting contents iC of the camera and image pictures iD1 and iD2 of the first operation dial D1 and the second operation dial D2. The image pictures iD1 and iD2 of the first operation dial D1 and the second operation dial D2 are displayed in an overlapped manner. Contact with the first operation dial D1 and the second operation dial D2 is detected, and an image picture of an operation dial in which the contact is detected is displayed on a forefront surface.

42 Claims, 39 Drawing Sheets

(51) Int. Cl.
*G03B 7/00* (2014.01)
*G03B 17/02* (2006.01)
*G03B 17/18* (2006.01)

(52) U.S. Cl.
CPC ............ *G03B 17/18* (2013.01); *H04N 5/225* (2013.01); *H04N 5/22525* (2018.08); *H04N 5/232* (2013.01)

(58) Field of Classification Search
USPC .................................................. 348/333.02
See application file for complete search history.

(56) References Cited

U.S. PATENT DOCUMENTS

| | | | |
|---|---|---|---|
| 2007/0283292 A1 | 12/2007 | Bucher et al. | |
| 2014/0380243 A1 | 12/2014 | Furue et al. | |
| 2015/0062052 A1 | 3/2015 | Bernstein et al. | |
| 2015/0109510 A1* | 4/2015 | Fujita ..................... | G03B 17/02 348/333.02 |
| 2015/0130712 A1 | 5/2015 | Hirai | |
| 2015/0370427 A1 | 12/2015 | Zhang et al. | |

FOREIGN PATENT DOCUMENTS

| | | |
|---|---|---|
| CN | 101461158 A | 6/2009 |
| CN | 101465995 A | 6/2009 |
| CN | 103226446 A | 7/2013 |
| CN | 104238874 A | 12/2014 |
| CN | 104508619 A | 4/2015 |
| CN | 105094534 A | 11/2015 |
| CN | 105892854 A | 8/2016 |
| CN | 105915771 A | 8/2016 |
| EP | 2 133 780 A1 | 12/2009 |
| JP | 8-76225 A | 3/1996 |
| JP | 2006-79281 A | 3/2006 |
| JP | 4018368 B2 | 12/2007 |
| WO | WO 2014/002659 A1 | 1/2014 |

OTHER PUBLICATIONS

German Office Action dated Nov. 19, 2019, for counterpart German Patent Application No. 11 2017 004 244.5, with English translation.
International Preliminary Report on Patentability and Written Opinion of the International Searching Authority (forms PCT/IB/373, PCT/ISA/237 and PCT/IB/326) , dated Apr. 11, 2019, for corresponding International Application No. PCT/JP2017/034747, with a Written Opinion translation.
International Search Report (form PCT/ISA/210), dated Dec. 12, 2017, for corresponding International Application No. PCT/JP2017/034747, with an English translation.
Chinese Office Action and Search Report dated May 7, 2020, for counterpart Chinese Patent Application No. 201780059129.1, with English translation.

* cited by examiner

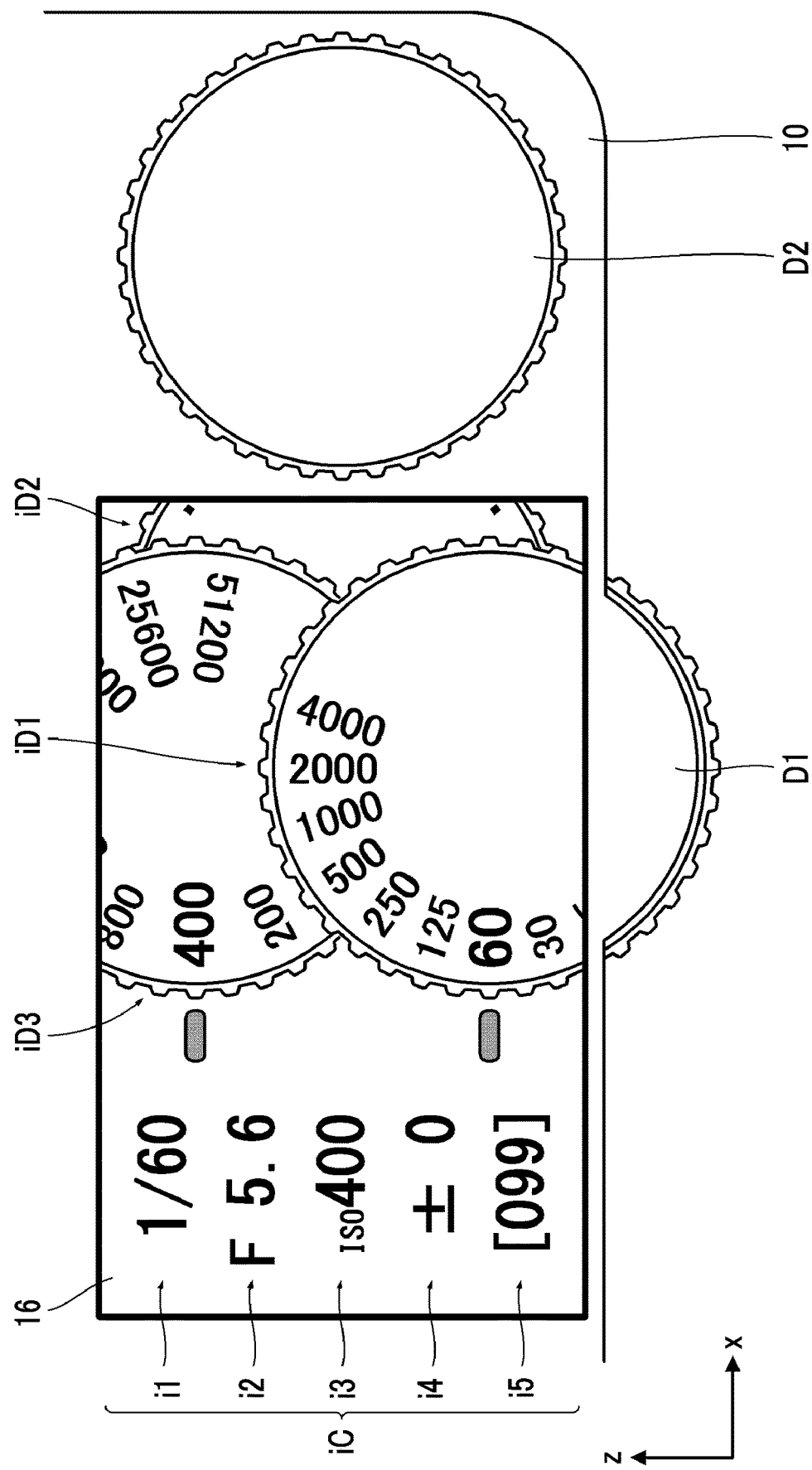

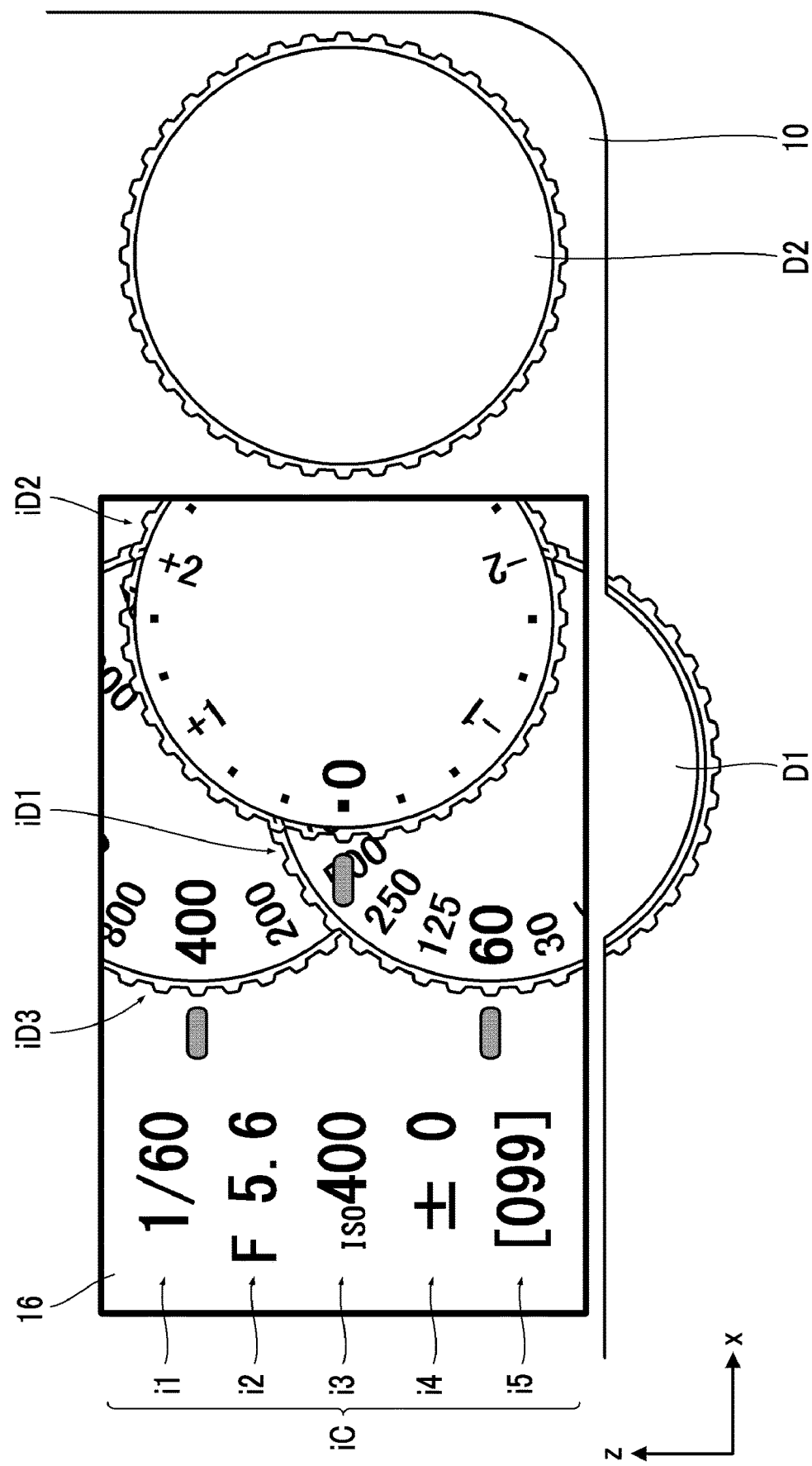

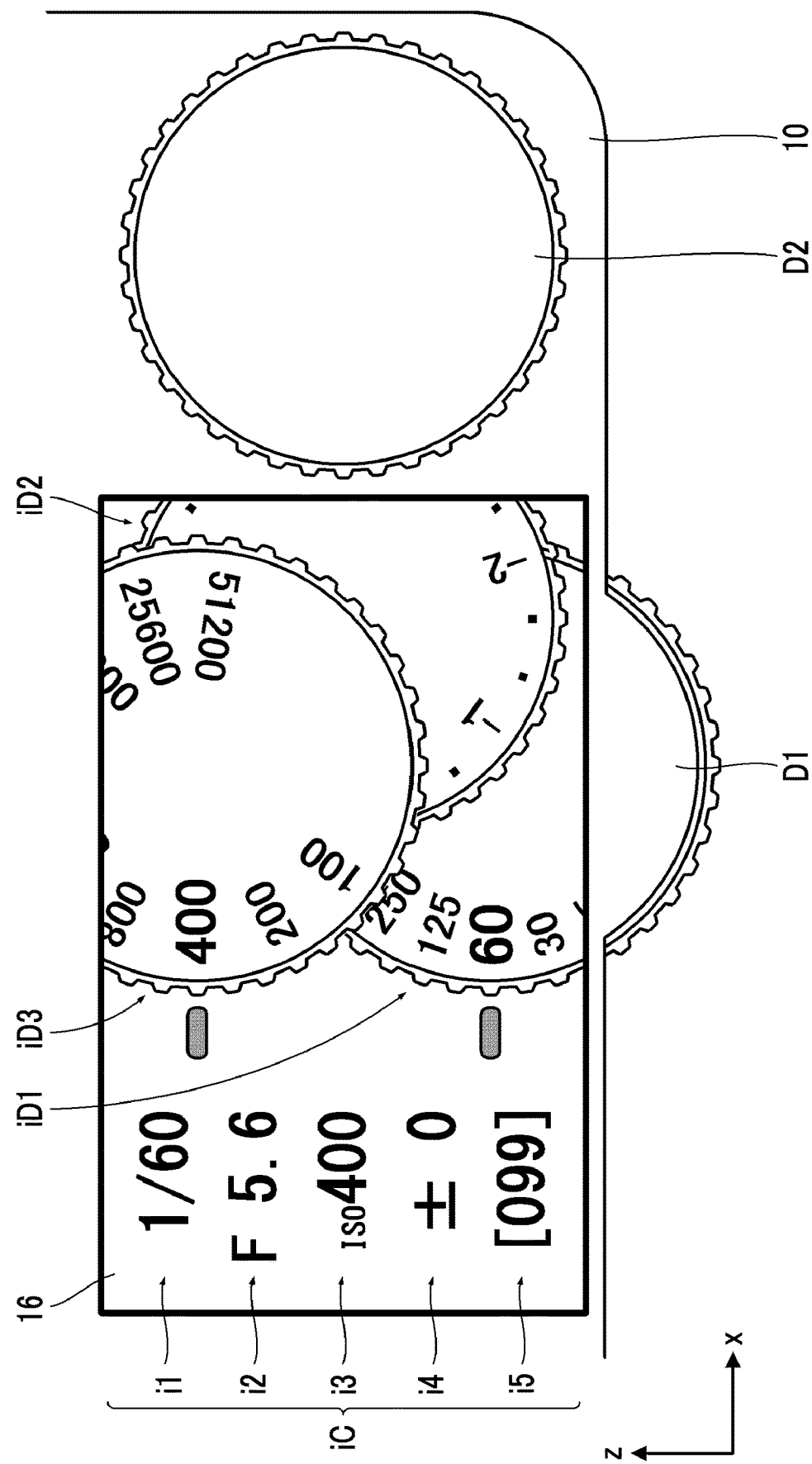

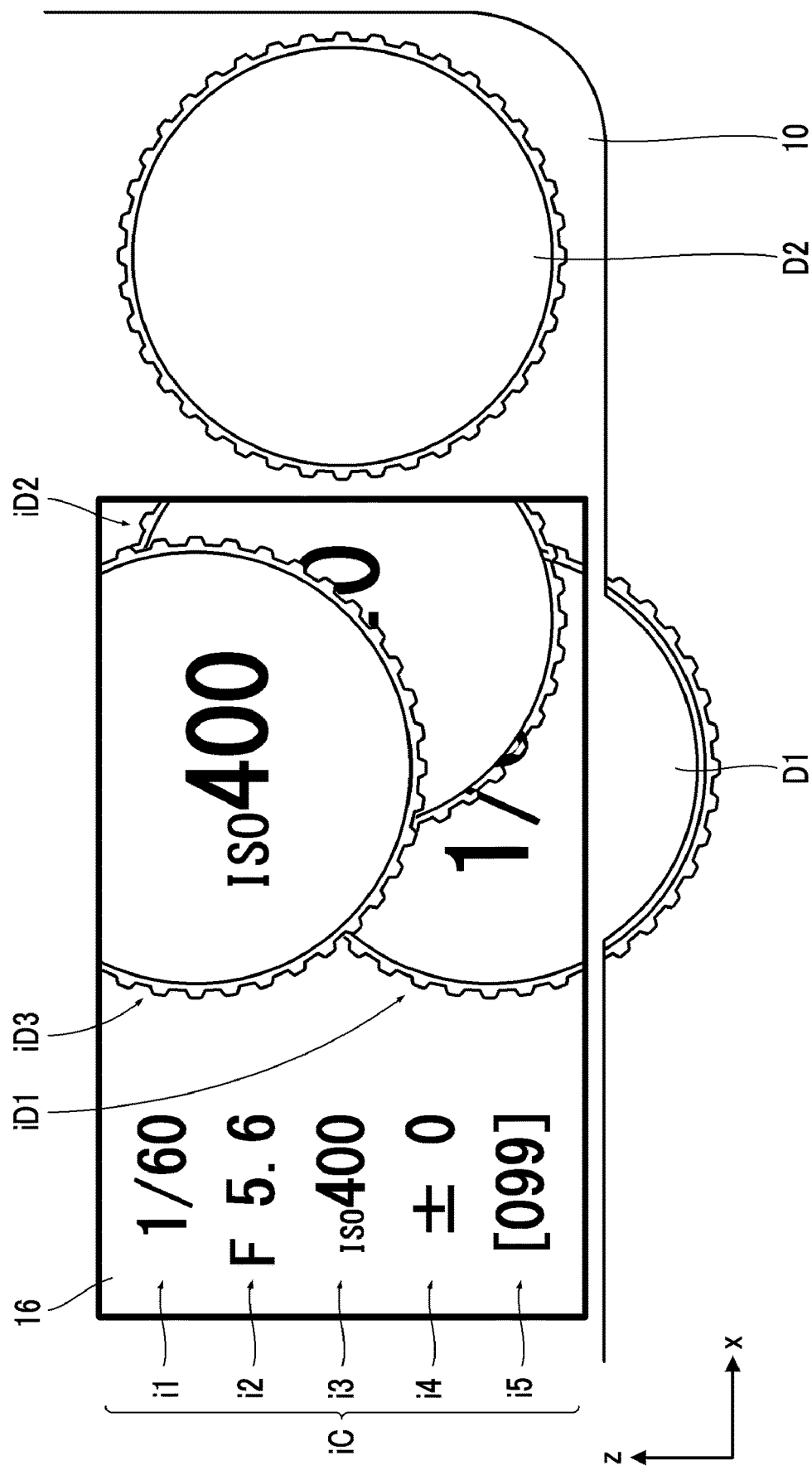

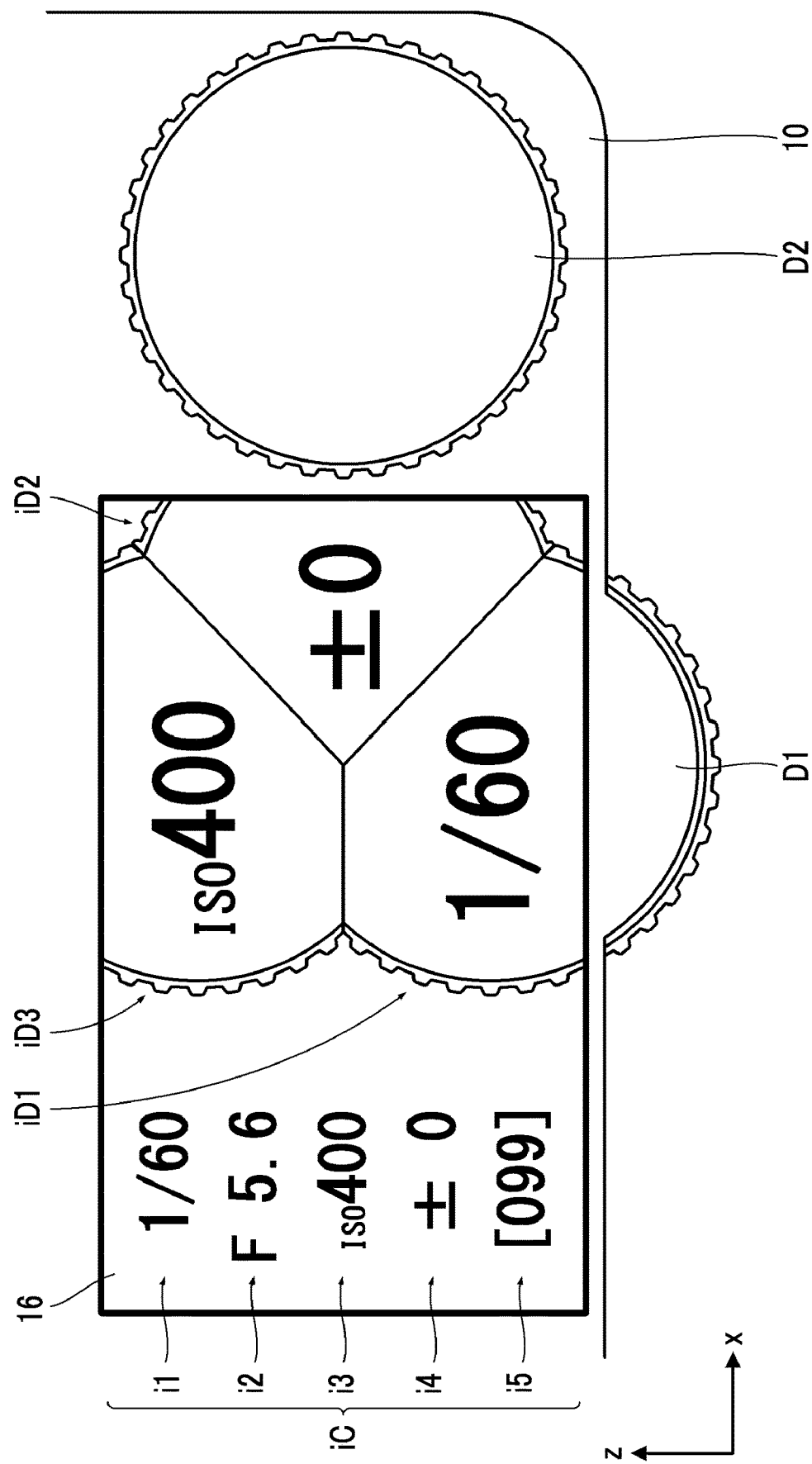

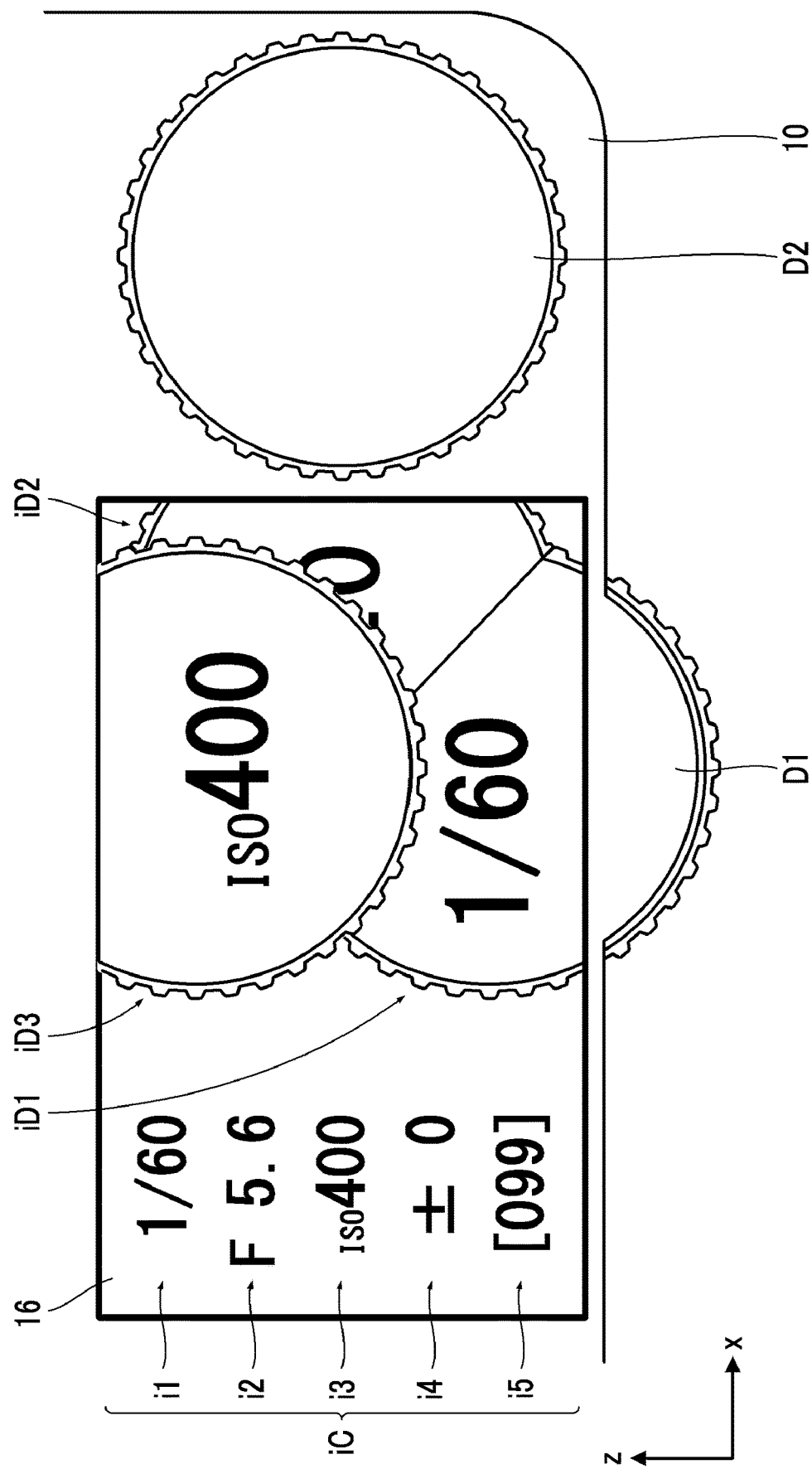

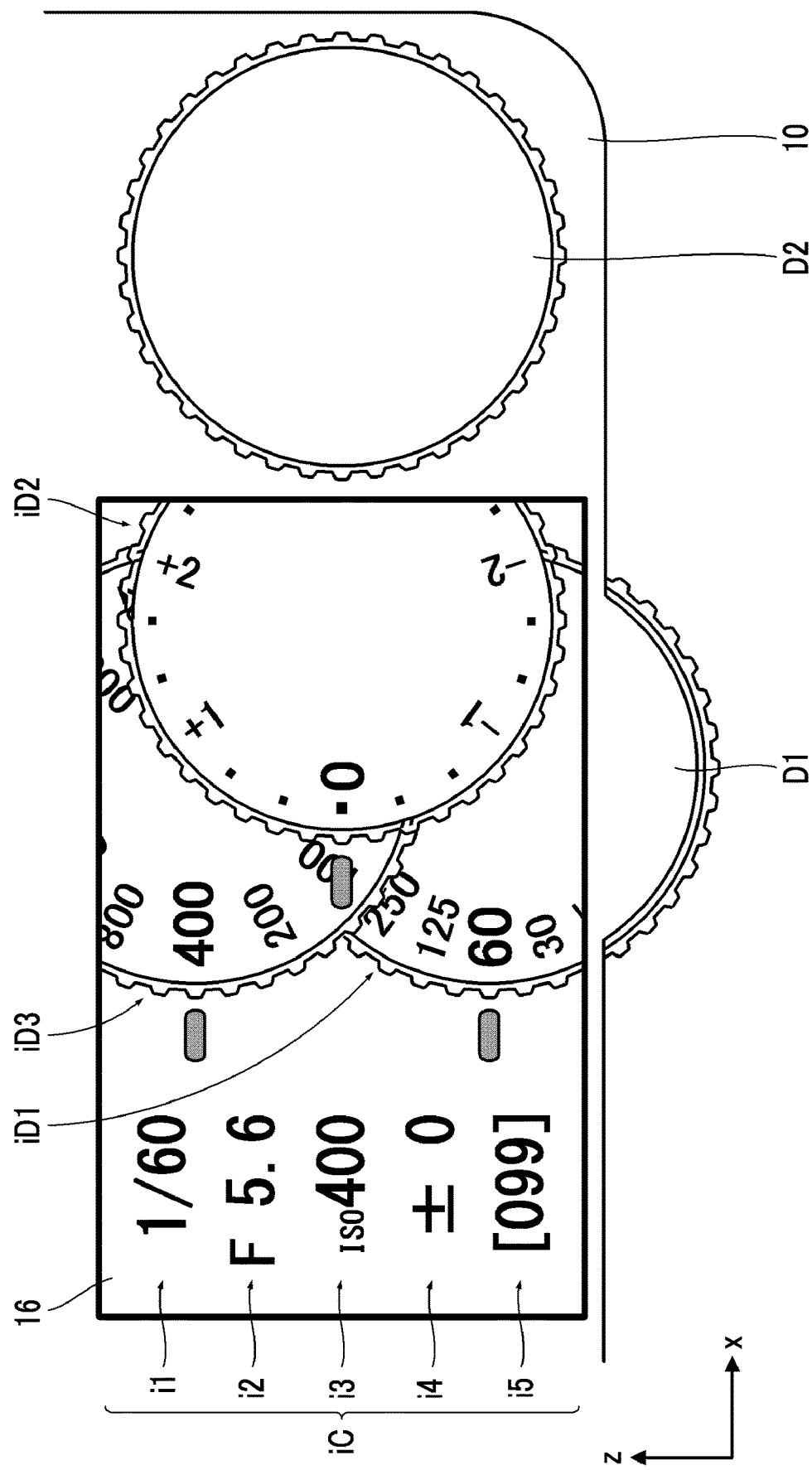

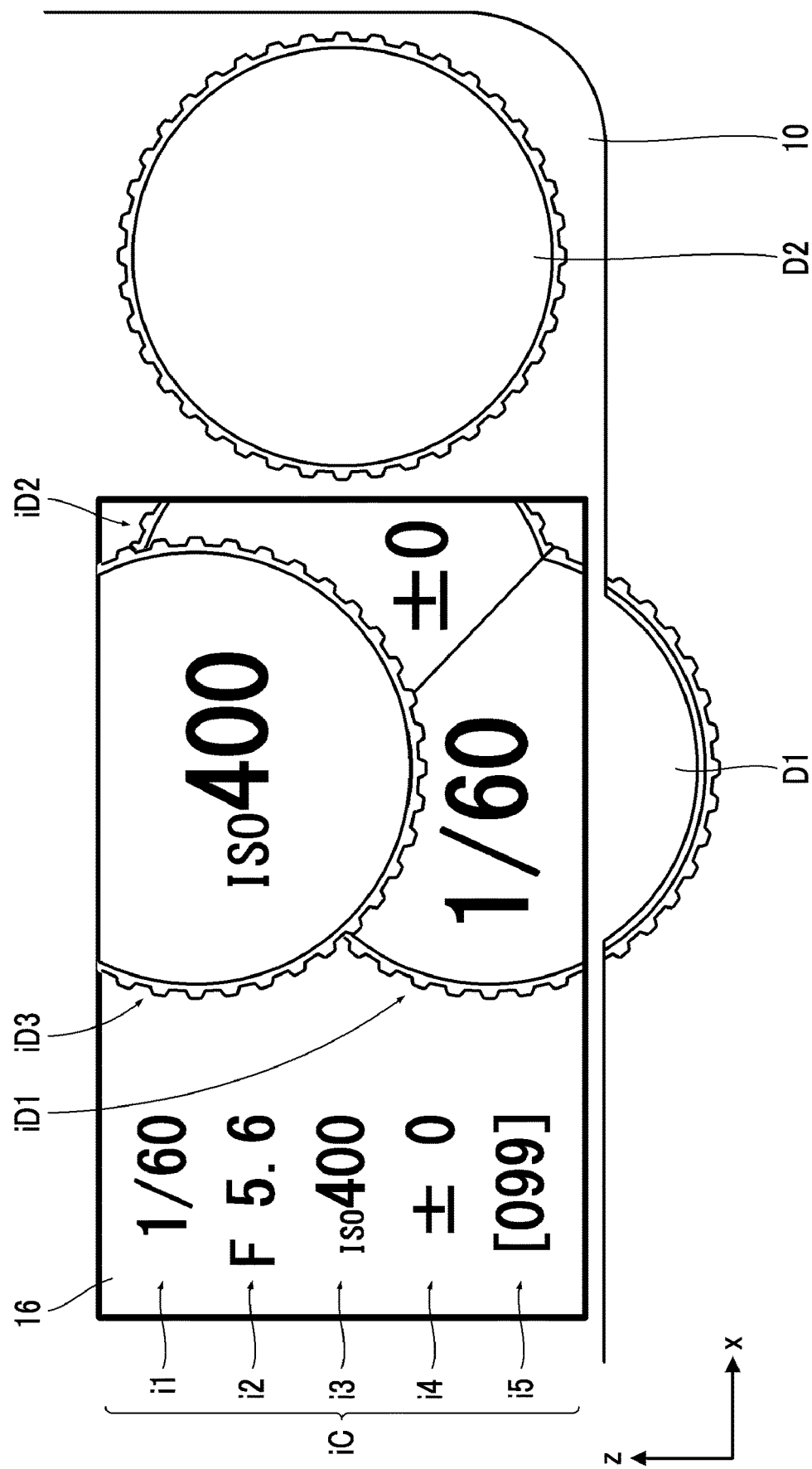

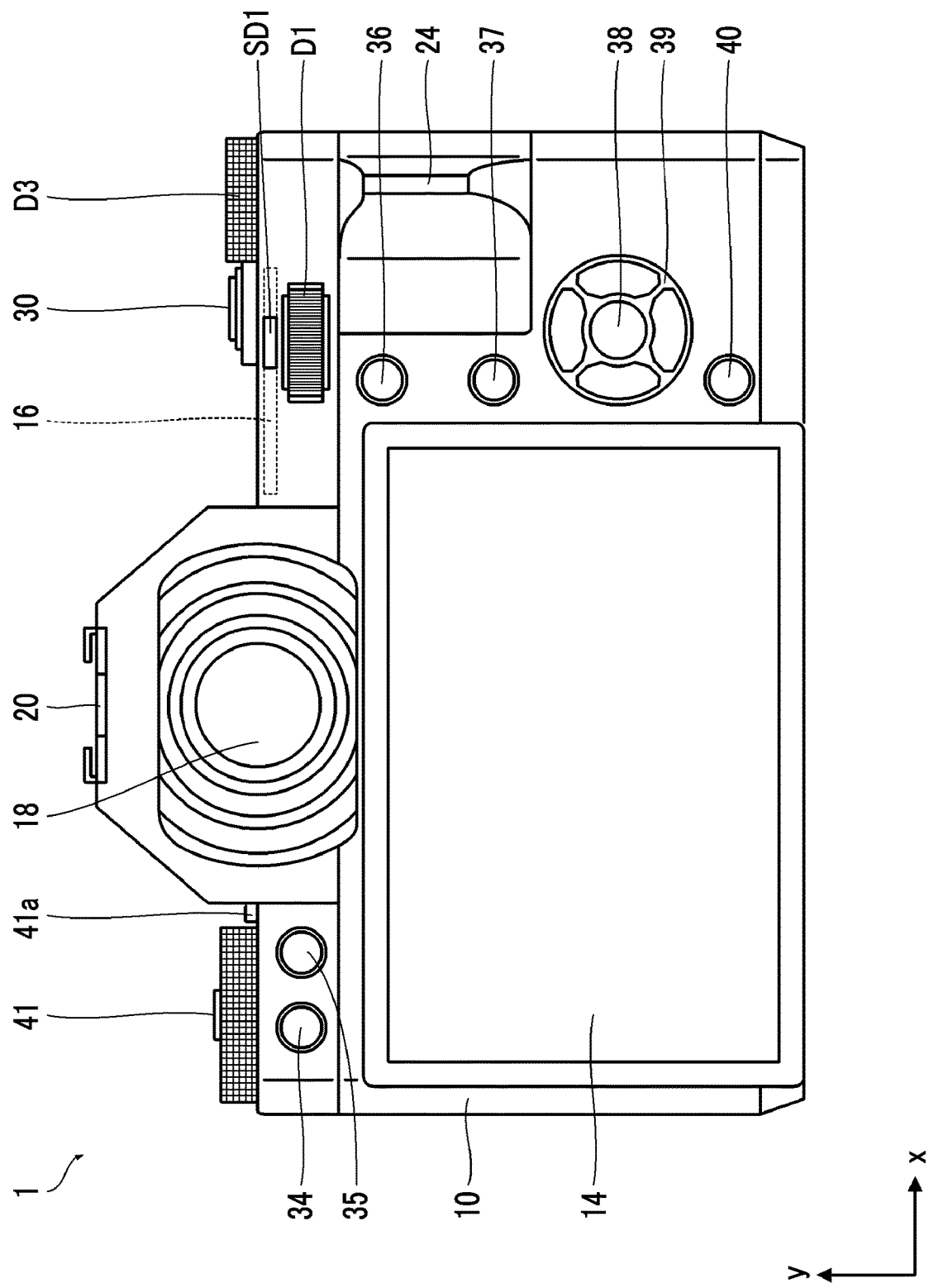

CAMERA, DISPLAY CONTROL METHOD OF CAMERA, AND DISPLAY CONTROL PROGRAM OF CAMERA

CROSS-REFERENCE TO RELATED APPLICATIONS

The present application is a Continuation of PCT International Application No. PCT/JP2017/034747 filed on Sep. 26, 2017 claiming priority under 35 U.S.C § 119(a) to Japanese Patent Application No. 2016-188698 filed on Sep. 27, 2016. Each of the above applications is hereby expressly incorporated by reference, in their entirety, into the present application.

BACKGROUND OF THE INVENTION

1. Field of the Invention

The present invention relates to a camera that performs various settings by using a rotary operation dial, a display control method of the camera, and a display control program of the camera.

2. Description of the Related Art

A camera that performs various settings by using a rotary operation dial is known.

For example, JP1996-076225A (JP-H08-076225A) discloses a camera that uses a combination of a rotary operation dial and a display section to perform various settings.

Further, WO2014/002659A discloses a camera in which an image picture of an operation dial is displayed on a display section in a case where contact with the operation dial is detected.

SUMMARY OF THE INVENTION

However, there is a case where the camera is provided with a plurality of operation dials. In such case, in a case where the display section is provided for each operation dial, there is a disadvantage that the number of components increases and the size of the camera increases. On the other hand, in a case where the plurality of operation dials shares one display section, there is a problem that a display on the display section becomes complicated, and thus visibility and operability deteriorate. In a case where a large display section is used in order to solve the problem, there is a disadvantage that the size of the camera increases.

The invention has been made in consideration of the above-mentioned circumstances, and an object of the invention is to provide a camera having good visibility and operability with a compact configuration, a display control method of the camera, and a display control program of the camera.

Means for achieving the above-mentioned object are as follows.

(1) A camera comprising:
a display section;
a plurality of rotary operation dials;
a detection unit that detects contact or approach of a finger with each of the operation dials; and
a display control unit that controls a display on the display section,
wherein the display control unit displays an image picture of each of the operation dials at a mutually overlapping position and switches an overlapping order of the image picture of each of the operation dials based on a detection result of the detection unit to display the image picture of the operation dial, on which the contact or the approach is detected, on a front surface.

According to the embodiment, the image picture of each of the operation dials is displayed on the display section. The image picture of each of the operation dials is displayed at the mutually overlapping position. The overlapping order of the image picture of each of the operation dials is controlled based on the detection result of the contact or the approach of the finger to the actual operation dial. That is, the image picture of the operation dial on which the contact or the approach of the finger is detected is controlled so as to be displayed on the front surface. Accordingly, it is possible to easily view the image picture of the operation dial under the operation and thus to provide good operability. Further, it is possible to reduce a space necessary for the display by displaying the image picture of each of the operation dials in an overlapped manner. That is, according to the embodiment, it is possible to ensure good visibility even with a small display section and thus to provide good operability.

(2) The camera according to (1),
wherein the display control unit switches a display form of the image picture of the operation dial to be displayed on the front surface between a case where the contact or the approach is detected by the detection unit and a case where the contact or the approach is not detected by the detection unit.

According to the embodiment, the display form of the image picture of the operation dial to be displayed on the front surface can be switched between the case where the contact or the approach of the finger to the operation dial is detected and the case where the contact or the approach of the finger to the operation dial is not detected. Accordingly, it is possible to easily confirm whether the setting is being changed from the display on the display section.

(3) The camera according to (2),
wherein the display control unit displays the image picture in a form in which setting values settable by the operation dial are displayed side by side on a dial plate portion in the case where the contact or the approach is detected by the detection unit and displays the image picture in a form in which only a current setting value is displayed on the dial plate portion in the case where the contact or the approach is not detected by the detection unit.

According to the embodiment, in the case where the contact or the approach of the finger to the operation dial is detected, the image picture is displayed in the form in which the setting values settable by the operation dial are displayed side by side on the dial plate portion. On the other hand, in the case where the contact or the approach of the finger to the operation dial is not detected, the image picture is displayed in the form in which only the current setting value is displayed on the dial plate portion. Accordingly, it is possible to confirm whether the setting is being changed from the display on the display section. Further, since the settable setting values are displayed side by side on the dial plate portion during the setting change, it is possible to easily grasp what setting value can be set. On the other hand, since only the current setting value is displayed on the dial plate portion in a case where the setting is not being changed, it is possible to easily confirm the current setting value. Accordingly, it is possible to provide better operability.

(4) The camera according to (3),
wherein in the case where the setting values settable by the operation dial are displayed side by side on the dial plate portion, the display control unit displays the setting values settable by the operation dial side by side along an arc that defines an external shape of the image picture.

According to the embodiment, in the case where the setting values settable by the operation dial are displayed side by side on the dial plate portion, the setting values settable by the operation dial are displayed side by side along the arc that defines the external shape of the image picture. For example, the setting values settable by the operation dial are displayed side by side in an arc-like shape at regular intervals like numerical values displayed on the dial plate portion of a common operation dial. Accordingly, it is possible to display the setting value in an easily visible manner.

(5) The camera according to any one of (1) to (4), wherein the display control unit displays the image picture in the form in which only the current setting value is displayed on the dial plate portion for the operation dial other than the operation dial whose image picture is displayed on a forefront surface.

According to the embodiment, the image picture is displayed in the form in which only the current setting value is displayed on the dial plate portion for the operation dial other than the operation dial whose image picture is displayed on a forefront surface. That is, the image picture hidden underneath and displayed is displayed in the form in which only the current setting value is displayed on the dial plate portion. Accordingly, it is possible to easily confirm the current setting.

(6) The camera according to (5), wherein the display control unit displays the current setting value on the dial plate portion avoiding a region where the image picture of another operation dial is overlapped.

According to the embodiment, in the case where the image picture of the other operation dial is displayed on the top in an overlapped manner, the current setting value is displayed avoiding the overlapping region. That is, the current setting value is displayed in a region that can be visually recognized on the dial plate portion (region where the other operation dial is not overlapped). Accordingly, it is possible to more easily confirm the current setting value.

(7) The camera according to any one of (1) to (6), wherein the display control unit displays the setting value of the operation dial other than the operation dial whose image picture is displayed on a forefront surface in a margin region of the display section.

According to the embodiment, the setting value of the operation dial other than the operation dial whose image picture is displayed on the forefront surface is displayed in the margin region of the display section. Accordingly, it is possible to confirm the setting value of the operation dial whose image picture is hidden underneath and thus to provide better operability.

(8) The camera according to any one of (1) to (7), wherein in a case where three or more operation dials are provided,
the display control unit displays the image picture of at least one operation dial in a fixed manner.

According to the embodiment, in the case where three or more operation dials are provided, the image picture of at least one operation dial is displayed in a fixed manner. In this case, the image picture of the operation dial is excluded from a switching target of an overlapping order. Since there is a case where the fixed display of an image picture is easily viewed depending on the layout of the operation dial, the image picture is excluded from the switching target of the overlapping order in such case. In this case, the switching of the overlapping order is performed with image pictures of remaining operation dials. For example, in a case where one image picture is fixed in the case where three operation dials are provided, the switching of the overlapping order is performed with the image pictures of the remaining two operation dials.

(9) The camera according to (8), wherein the display control unit displays the image picture of the operation dial to be displayed in a fixed manner on the forefront surface.

According to the embodiment, in the case where one image picture of the operation dial is fixed, the image picture of the operation dial to be displayed in a fixed manner is displayed on the forefront surface. Accordingly, it is possible to improve the visibility of an image picture of a specific operation dial.

(10) A camera comprising:
a display section;
a plurality of rotary operation dials; and
a display control unit that controls a display on the display section,
wherein the display control unit displays an image picture of each of the operation dials at a mutually overlapping position and switches an overlapping order of the image picture of each of the operation dials based on an operation of each of the operation dials to display the image picture of the operated operation dial on a front surface.

According to the embodiment, the image picture of each of the operation dials is displayed on the display section. The image picture of each of the operation dials is displayed at the mutually overlapping position. The overlapping order of the image picture of each of the operation dials is controlled based on the operation of the actual operation dial. That is, the overlapping order is controlled such that the image picture of the operated operation dial is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability.

(11) The camera according to (10), wherein the display control unit switches a display form of the image picture of the operation dial to be displayed on the front surface between a case where the operation dial is operated and a case where the operation dial is not operated.

According to the embodiment, the display form of the image picture of the operation dial to be displayed on the front surface can be switched between the case where the operation dial is operated and the case where the operation dial is not operated. Accordingly, it is possible to confirm whether the setting is being changed from the display on the display section.

(12) The camera according to (11), wherein the display control unit displays the image picture in a form in which setting values settable by the operation dial are displayed side by side on a dial plate portion in the case where the operation dial is operated and displays the image picture in a form in which only a current setting value is displayed on the dial plate portion in the case where the operation dial is not operated.

According to the embodiment, in the case where the operation dial is operated, the image picture is displayed in the form in which the setting values settable by the operation dial are displayed side by side on the dial plate portion. On the other hand, in the case where the operation dial is not operated, the image picture is displayed in the form in which only the current setting value is displayed on the dial plate portion. Accordingly, it is possible to confirm whether the setting is being changed from the display on the display section. Further, since the settable setting values are displayed side by side on the dial plate portion during the setting change, it is possible to easily grasp what setting value can be set. On the other hand, since only the current setting value is displayed on the dial plate portion in the case where the setting is not being changed, it is possible to easily confirm the current setting value. Accordingly, it is possible to provide better operability.

(13) The camera according to (12),
wherein in the case where the setting values settable by the operation dial are displayed side by side on the dial plate portion, the display control unit displays the setting values settable by the operation dial side by side along an arc that defines an external shape of the image picture.

According to the embodiment, in the case where the setting values settable by the operation dial are displayed side by side on the dial plate portion, the setting values settable by the operation dial are displayed side by side along the arc that defines the external shape of the image picture. For example, the setting values settable by the operation dial are displayed side by side in an arc-like shape at regular intervals like numerical values displayed on the dial plate portion of a common operation dial. Accordingly, it is possible to display the setting value in an easily visible manner.

(14) The camera according to any one of (10) to (13),
wherein the display control unit displays the image picture in the form in which only the current setting value is displayed on the dial plate portion for the operation dial other than the operation dial whose image picture is displayed on a forefront surface.

According to the embodiment, the image picture is displayed in the form in which only the current setting value is displayed on the dial plate portion for the operation dial other than the operation dial whose image picture is displayed on a forefront surface. That is, the image picture hidden underneath and displayed is displayed in the form in which only the current setting value is displayed on the dial plate portion. Accordingly, it is possible to easily confirm the current setting.

(15) The camera according to (14),
wherein the display control unit displays the current setting value on the dial plate portion avoiding a region where the image picture of another operation dial is overlapped.

According to the embodiment, in the case where the image picture of the other operation dial is displayed on the top in an overlapped manner, the current setting value is displayed avoiding the overlapping region. That is, the current setting value is displayed in a region that can be visually recognized on the dial plate portion (region where the other operation dial is not overlapped). Accordingly, it is possible to more easily confirm the current setting value.

(16) The camera according to any one of (10) to (15),
wherein the display control unit displays the setting value of the operation dial other than the operation dial whose image picture is displayed on the forefront surface in a margin region of the display section.

According to the embodiment, the setting value of the operation dial other than the operation dial whose image picture is displayed on the forefront surface is displayed in the margin region of the display section. Accordingly, it is possible to confirm the setting value of the operation dial whose image picture is hidden underneath and thus to provide better operability.

(17) The camera according to any one of (10) to (16),
wherein in a case where three or more operation dials are provided,
the display control unit displays the image picture of at least one operation dial in a fixed manner.

According to the embodiment, in the case where three or more operation dials are provided, the image picture of at least one operation dial is displayed in a fixed manner. In this case, the image picture of the operation dial is excluded from the switching target of the overlapping order. Since there is a case where the fixed display of an image picture is easily viewed depending on the layout of the operation dial, the image picture is excluded from the switching target of the overlapping order in such case. In this case, the switching of the overlapping order is performed with image pictures of remaining operation dials. For example, in a case where one image picture is fixed in the case where three operation dials are provided, the switching of the overlapping order is performed with the image pictures of the remaining two operation dials.

(18) The camera according to (17),
wherein the display control unit displays the image picture of the operation dial to be displayed in a fixed manner on the forefront surface.

According to the embodiment, in the case where one image picture of the operation dials is fixed, the image picture of the operation dial to be displayed in a fixed manner is displayed on the forefront surface. Accordingly, it is possible to improve the visibility of the image picture of the specific operation dial.

(19) A camera comprising:
a display section;
a plurality of rotary operation dials;
a detection unit that detects contact or approach of a finger with each of the operation dials; and
a display control unit that controls a display on the display section,
wherein the display control unit displays an image picture of each of the operation dials at a mutually overlapping position, displays the image picture of each of the operation dials in a mutually overlapping region in a divided manner in a case where the contact or the approach is not detected by the detection unit, and displays the image picture of each of the operation dials in an overlapped manner and displays an image picture of an operation dial, on which the contact or the approach is detected, on the front surface in a case where the contact or the approach is detected by the detection unit.

According to the embodiment, the image picture of each of the operation dials is displayed on the display section. The image picture of each of the operation dials is displayed at the mutually overlapping position. In the case where the contact or the approach of the finger is not detected by the detection unit, the image picture of each of the operation dials is displayed in the mutually overlapping region in a divided manner. That is, a boundary line is set so as not to be overlapped each other, and the image picture of each of the operation dials is displayed in a divided manner by the boundary line. On the other hand, in the case where the contact or the approach of the finger is detected by the detection unit, the image picture of each of the operation dials is displayed in an overlapped manner. At this time, the image picture of the operation dial on which the contact or the approach is detected is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability. Further, since the display form of the image picture of each of the operation dials is switched between the case where the contact or the approach of the finger to the operation dial is detected and the case where the contact or the approach of the finger to the operation dial is not detected, it is possible to easily confirm whether the setting is being changed from the display on the display section.

(20) The camera according to (19), wherein in the case where the contact or the approach is detected by the detection unit, the display control unit displays setting value of the operation dial other than the operation dial whose image picture is displayed on a forefront surface in a margin region of the display section.

According to the embodiment, in the case where the contact or the approach is detected by the detection unit, the setting value of the operation dial other than the operation dial whose image picture is displayed on the forefront surface is displayed in the margin region of the display section. Accordingly, it is possible to confirm the setting value of the operation dial whose image picture is hidden underneath and thus to provide better operability.

(21) The camera according to any one of (19) or (20), wherein in a case where three or more operation dials are provided, the display control unit displays the image picture of at least one operation dial in a fixed manner in a case where the image picture of each of the operation dials is displayed in an overlapped manner.

According to the embodiment, in the case where three or more operation dials are provided, the image picture of at least one operation dial is displayed in a fixed manner. In this case, the image picture of the operation dial is excluded from the switching target of the overlapping order. Since there is a case where the fixed display of an image picture is easily viewed depending on the layout of the operation dial, the image picture is excluded from the switching target of the overlapping order in such case. In this case, the switching of the overlapping order is performed with image pictures of remaining operation dials. For example, in a case where one image picture is fixed in the case where three operation dials are provided, the switching of the overlapping order is performed with the image pictures of the remaining two operation dials.

(22) The camera according to (21), wherein the display control unit displays the image picture of the operation dial to be displayed in a fixed manner on the forefront surface.

According to the embodiment, in the case where one image picture of the operation dials is fixed, the image picture of the operation dial to be displayed in a fixed manner is displayed on the forefront surface. Accordingly, it is possible to improve the visibility of the image picture of the specific operation dial.

(23) The camera according to any one of (19) to (22), wherein in the case where the image picture of each of the operation dials is displayed in an overlapped manner, the display control unit displays the image picture in a form in which only a current setting value is displayed on the dial plate portion for the operation dial other than the operation dial whose image picture is displayed on the forefront surface.

According to the embodiment, the image picture is displayed in the form in which only the current setting value is displayed on the dial plate portion for the operation dial other than the operation dial whose image picture is displayed on a forefront surface. That is, the image picture hidden underneath and displayed is displayed in the form in which only the current setting value is displayed on the dial plate portion. Accordingly, it is possible to easily confirm the current setting.

(24) The camera according to (23), wherein the display control unit displays the current setting value on the dial plate portion avoiding a region where the image pictures of other operation dials are overlapped.

According to the embodiment, in the case where the image picture of the other operation dial is displayed on the top in an overlapped manner, the current setting value is displayed avoiding the overlapping region. That is, the current setting value is displayed in a region that can be visually recognized on the dial plate portion (region where the other operation dial is not overlapped). Accordingly, it is possible to more easily confirm the current setting value.

(25) A camera comprising:

a display section;

a plurality of rotary operation dials; and a display control unit that controls a display on the display section, wherein the display control unit displays an image picture of each of the operation dials at a mutually overlapping position, displays the image picture of each of the operation dials in a mutually overlapping region in a divided manner in a case where the operation dial is not operated, and displays the image picture of each of the operation dials in an overlapped manner and displays an image picture of an operated operation dial on a front surface in a case where the operation dial is operated.

According to the embodiment, the image picture of each of the operation dials is displayed on the display section. The image picture of each of the operation dials is displayed at the mutually overlapping position. In the case where the operation dial is not operated, the image picture of each of the operation dials is displayed in the mutually overlapping region in a divided manner. On the other hand, in the case where the operation dial is operated, the image picture of each of the operation dials is displayed in an overlapped manner. At this time, the image picture of the operated operation dial is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability. Further, since the display form of the image picture of each of the operation dials is switched between the case where the operation dial is operated and the case where the operation dial is not operated, it is possible to easily confirm whether the setting is being changed from the display on the display section.

(26) The camera according to (25), wherein in the case where the operation dial is operated, the display control unit displays a setting value of the operation dial other than the operation dial whose image picture is displayed on a forefront surface in a margin region of the display section.

According to the embodiment, in the case where the operation dial is operated, the setting value of the operation dial other than the operation dial whose image picture is displayed on the forefront surface is displayed in the margin region of the display section. Accordingly, it is possible to confirm the setting value of the operation dial whose image picture is hidden underneath and thus to provide better operability.

(27) The camera according to any one of (25) or (26), wherein in a case where three or more operation dials are provided, the display control unit displays the image picture of at least one operation dial in a fixed manner in a case where the image picture of each of the operation dials is displayed in an overlapped manner.

According to the embodiment, in the case where three or more operation dials are provided, the image picture of at least one operation dial is displayed in a fixed manner. In this case, the image picture of the operation dial is excluded from the switching target of the overlapping order. Since there is a case where the fixed display of an image picture is easily viewed depending on the layout of the operation dial, the image picture is excluded from the switching target of the overlapping order in such case. In this case, the switching of the overlapping order is performed with image pictures of remaining operation dials. For example, in a case where one image picture is fixed in the case where three operation dials are provided, the switching of the overlapping order is performed with the image pictures of the remaining two operation dials.

(28) The camera according to (27), wherein the display control unit displays the image picture of the operation dial to be displayed in a fixed manner on the forefront surface.

According to the embodiment, in the case where one image picture of the operation dials is fixed, the image picture of the operation dial to be displayed in a fixed manner is displayed on the forefront surface. Accordingly, it is possible to improve the visibility of the image picture of the specific operation dial.

(29) The camera according to any one of (25) to (28), wherein in the case where the image picture of each of the operation dials is displayed in an overlapped manner, the display control unit displays the image picture in a form in which only a current setting value is displayed on the dial plate portion for the operation dial other than the operation dial whose image picture is displayed on the forefront surface.

According to the embodiment, the image picture is displayed in the form in which only the current setting value is displayed on the dial plate portion for the operation dial other than the operation dial whose image picture is displayed on a forefront surface. That is, the image picture hidden underneath and displayed is displayed in the form in which only the current setting value is displayed on the dial plate portion. Accordingly, it is possible to easily confirm the current setting.

(30) The camera according to (29), wherein the display control unit displays the current setting value on the dial plate portion avoiding a region where the image pictures of other operation dials are overlapped.

According to the embodiment, in the case where the image picture of the other operation dial is displayed on the top in an overlapped manner, the current setting value is displayed avoiding the overlapping region. That is, the current setting value is displayed in a region that can be visually recognized on the dial plate portion (region where the other operation dial is not overlapped). Accordingly, it is possible to more easily confirm the current setting value.

(31) The camera according to any one of (1) to (30), wherein the display section is provided on a top surface of a camera body, and wherein the plurality of operation dials are provided near the display section.

According to the embodiment, the display section is provided on the top surface of the camera body. The plurality of operation dials are provided near the display section. It is possible to easily confirm the display by comprising the display section on the top surface of the camera body. Further, it is possible to easily view the display during the setting by comprising the operation dials near the display section.

(32) A display control method of a camera comprising:

displaying an image picture of each of a plurality of operation dials provided in an overlapped manner on a display section;

detecting contact or approach of a finger with each of the operation dials; and switching an overlapping order of the image picture of each of the operation dials based on a detection result to display the image picture of the operation dial, on which the contact or the approach is detected, on a front surface.

According to the embodiment, the image picture of each of the operation dials is displayed on the display section. The image picture of each of the operation dials is displayed at the mutually overlapping position. The overlapping order of the image picture of each of the operation dials is controlled based on the detection result of the contact or the approach of the finger to the actual operation dial. That is, the image picture of the operation dial on which the contact or the approach of the finger is detected is controlled so as to be displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability.

(33) A display control method of a camera comprising:

displaying an image picture of each of a plurality of operation dials provided in an overlapped manner on a display section; and switching an overlapping order of the image picture of each of the operation dials based on an operation of the operation dial to display the image picture of the operated operation dial on a front surface.

According to the embodiment, the image picture of each of the operation dials is displayed on the display section. The image picture of each of the operation dials is displayed at the mutually overlapping position. The overlapping order of the image picture of each of the operation dials is controlled based on the operation of the actual operation dial. That is, is controlled such that the image picture of the operated operation dial is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability.

(34) A display control method of a camera comprising:

displaying an image picture of each of a plurality of operation dials provided at a mutually overlapping position on a display section;

displaying the image picture of each of the operation dials in a mutually overlapping region in a divided manner in a case where contact or approach of a finger with each of the operation dials is not detected; and displaying the image picture of each of the operation dials in an overlapped manner and displaying an image picture of an operation dial, on which the contact or the approach is detected, on a front surface in a case where the contact or the approach of the finger to each of the operation dials is detected.

According to the embodiment, the image picture of each of the operation dials is displayed on the display section. The image picture of each of the operation dials is displayed at the mutually overlapping position. In the case where the contact or the approach of the finger to the operation dial is not detected, the image picture of each of the operation dials is displayed in the mutually overlapping region in a divided manner. That is, a boundary line is set so as not to be overlapped each other, and the image picture of each of the operation dials is displayed in a divided manner by the boundary line. On the other hand, the case where the contact or the approach of the finger to the operation dial is detected, the image picture of each of the operation dials is displayed in an overlapped manner. At this time, the image picture of the operation dial on which the contact or the approach is detected is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability. Further, since the display form of the image picture of each of the operation dials is switched between the case where the contact or the approach of the finger to the operation dial is detected and the case where the contact or the approach of the finger to the operation dial is not detected, it is possible to easily confirm whether the setting is being changed from the display on the display section.

(35) A display control method of a camera comprising:

displaying an image picture of each of a plurality of operation dials provided at a mutually overlapping position on a display section;

displaying the image picture of each of the operation dials in a mutually overlapping region in a divided manner in a case where the operation dial is not operated; and displaying the image picture of each of the operation dials in an overlapped manner and displaying an image picture of an operated operation dial on a front surface in a case where the operation dial is operated.

According to the embodiment, the image picture of each of the operation dials is displayed on the display section. The image picture of each of the operation dials is displayed at the mutually overlapping position. In the case where the operation dial is not operated, the image picture of each of the operation dials is displayed in the mutually overlapping region in a divided manner. On the other hand, in the case where the operation dial is operated, the image picture of each of the operation dials is displayed in an overlapped manner. At this time, the image picture of the operated operation dial is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability. Further, since the display form of the image picture of each of the operation dials is switched between the case where the operation dial is operated and the case where the operation dial is not operated, it is possible to easily confirm whether the setting is being changed from the display on the display section.

(36) A display control program of a camera causing a computer to realize:

a function of displaying an image picture of each of a plurality of operation dials provided in an overlapped manner on a display section; and a function of switching an overlapping order of the image picture of each of the operation dials based on a detection result of a detection unit that detects contact or approach of a finger with each of the operation dials to display the image picture of the operation dial, on which the contact or the approach is detected, on a front surface.

According to the embodiment, the image picture of each of the operation dials is displayed on the display section. The image picture of each of the operation dials is displayed at the mutually overlapping position. The overlapping order of the image picture of each of the operation dials is controlled based on the detection result of the contact or the approach of the finger to the actual operation dial. That is, the image picture of the operation dial on which the contact or the approach of the finger is detected is controlled so as to be displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability.

(37) A display control program of a camera causing a computer to realize:

a function of displaying an image picture of each of a plurality of operation dials provided in an overlapped manner on a display section; and a function of switching an overlapping order of the image picture of each of the operation dials based on an operation of the operation dial to display the image picture of the operated operation dial on a front surface.

According to the embodiment, the image picture of each of the operation dials is displayed on the display section. The image picture of each of the operation dials is displayed at the mutually overlapping position. The overlapping order of the image picture of each of the operation dials is controlled based on the operation of the actual operation dial. That is, is controlled such that the image picture of the operated operation dial is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability.

(38) A display control program of a camera causing a computer to realize:

a function of displaying an image picture of each of a plurality of operation dials provided at a mutually overlapping position on a display section; and a function of controlling a display of the image picture of each of the operation dials based on a detection result of a detection unit that detects contact or approach of a finger with each of the operation dials, and a function of displaying the image picture of each of the operation dials in a mutually overlapping region in a divided manner in a case where contact or approach of a finger with each of the operation dials is not detected, and of displaying the image picture of each of the operation dials in an overlapped manner and displaying an image picture of an operation dial, on which the contact or the approach is detected, on a front surface in a case where the contact or the approach of the finger to each of the operation dials is detected.

According to the embodiment, the image picture of each of the operation dials is displayed on the display section. The image picture of each of the operation dials is displayed at the mutually overlapping position. In the case where the contact or the approach of the finger to the operation dial is not detected, the image picture of each of the operation dials is displayed in the mutually overlapping region in a divided manner. That is, a boundary line is set so as not to be overlapped each other, and the image picture of each of the operation dials is displayed in a divided manner by the boundary line. On the other hand, the case where the contact or the approach of the finger to the operation dial is detected, the image picture of each of the operation dials is displayed in an overlapped manner. At this time, the image picture of the operation dial on which the contact or the approach is detected is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability. Further, since the display form of the image picture of each of the operation dials is switched between the case where the contact or the approach of the finger to the operation dial is detected and the case where the contact or the approach of the finger to the operation dial is not detected, it is possible to easily confirm whether the setting is being changed from the display on the display section.

(39) A display control program of a camera causing a computer to realize:

a function of displaying an image picture of each of a plurality of operation dials provided at a mutually overlapping position on a display section; and a function of controlling a display of the image picture of each of the operation dials based on an operation of the operation dial, and a function of displaying the image picture of each of the operation dials in a mutually overlapping region in a divided manner in a case where the operation dial is not operated, and of displaying the image picture of each of the operation dials in an overlapped manner and displaying an image picture of an operated operation dial on a front surface in a case where the operation dial is operated.

According to the embodiment, the image picture of each of the operation dials is displayed on the display section. The image picture of each of the operation dials is displayed at the mutually overlapping position. In the case where the operation dial is not operated, the image picture of each of the operation dials is displayed in the mutually overlapping region in a divided manner. On the other hand, in the case where the operation dial is operated, the image picture of each of the operation dials is displayed in an overlapped manner. At this time, the image picture of the operated operation dial is displayed on the front surface. Accordingly, it is possible to easily view the image picture of the operation dial under the operation and thus to provide good operability. Further, it is possible to reduce the space necessary for the display by displaying the image picture of each of the operation dials in an overlapped manner. That is, according to the embodiment, it is possible to ensure good visibility even with a small display section and thus to provide good operability. Further, since the display form of the image picture of each of the operation dials is switched between the case where the operation dial is operated and the case where the operation dial is not operated, it is possible to easily confirm whether the setting is being changed from the display on the display section.

According to the invention, it is possible to provide the camera having good visibility and operability with the compact configuration, the display control method of the camera, and the display control program of the camera.

BRIEF DESCRIPTION OF THE DRAWINGS

FIG. 38 is a plan view showing an example of the display on the sub-display.

FIG. 39 is a plan view showing an example of the display on the sub-display.

FIG. 40 is a plan view showing an example of the display on the sub-display.

FIG. 41 is a plan view showing an example of the display on the sub-display in a case where the operation dial is not touched.

FIG. 42 is a plan view showing an example of the display on the sub-display in a case where the image picture of each of the operation dials is displayed by being divided into mutually overlapping regions.

FIG. 43 is a plan view showing an example of the display on the sub-display in a case where contact with a third operation dial is detected in the case where the image picture of each of the operation dials is displayed by being divided into the mutually overlapping regions.

FIG. 44 is a diagram showing an example of the display on the sub-display in the case where the third operation dial is touched.

FIG. 45 is a diagram showing an example of the display of the image picture in the case where the current setting value is displayed on the dial plate portion avoiding the regions where the image pictures of other operation dials are overlapped.

FIG. 46 is a back view of a digital camera comprising a sensor that detects approach of the finger to the first operation dial.

DESCRIPTION OF THE PREFERRED EMBODIMENTS

A preferred embodiment of the invention will be described in detail below with reference to accompanying drawings.

First Embodiment

[Appearance]

Figure 1:
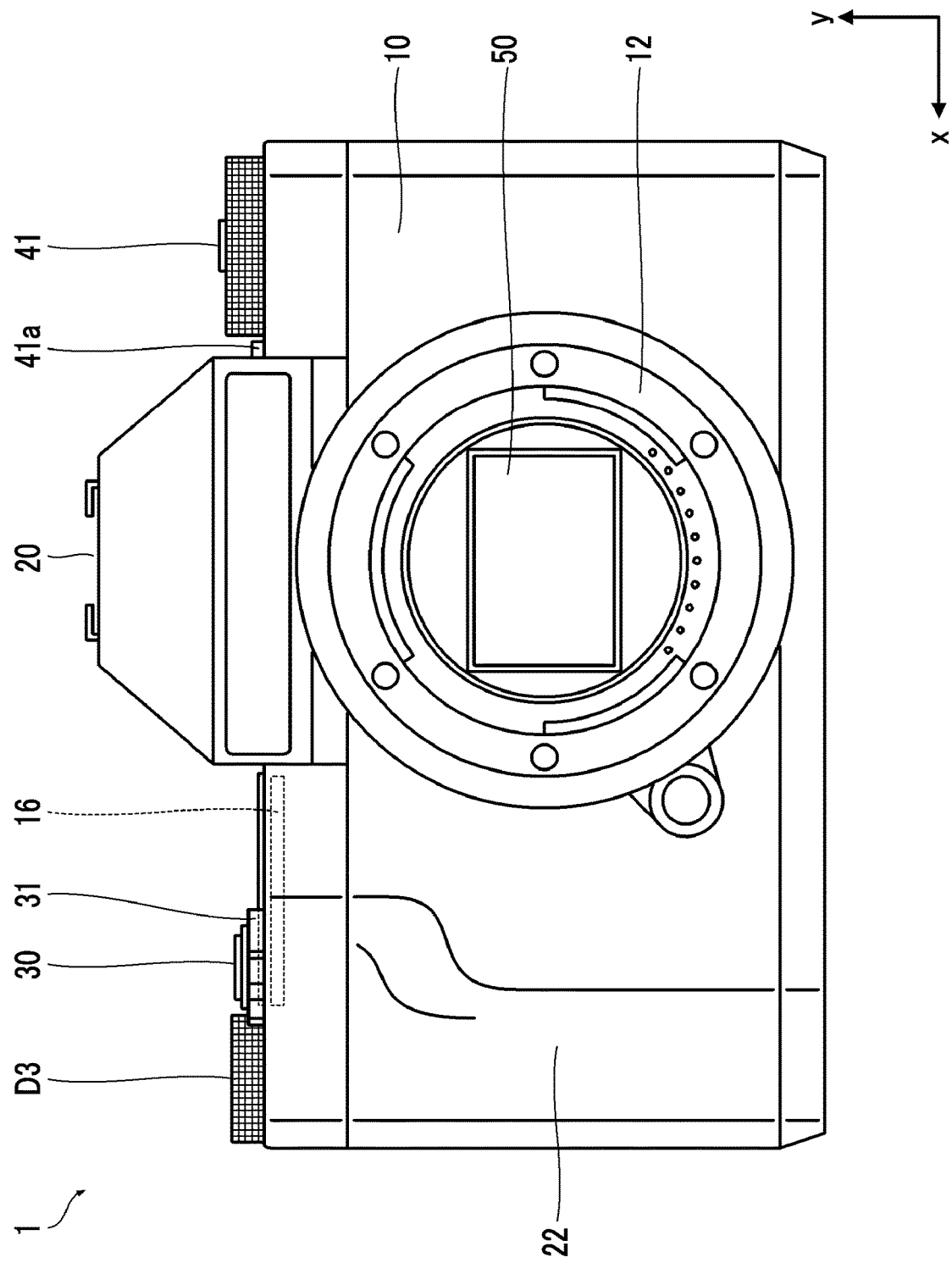
FIG. 1 is a front view of a digital camera.
Figure 2:
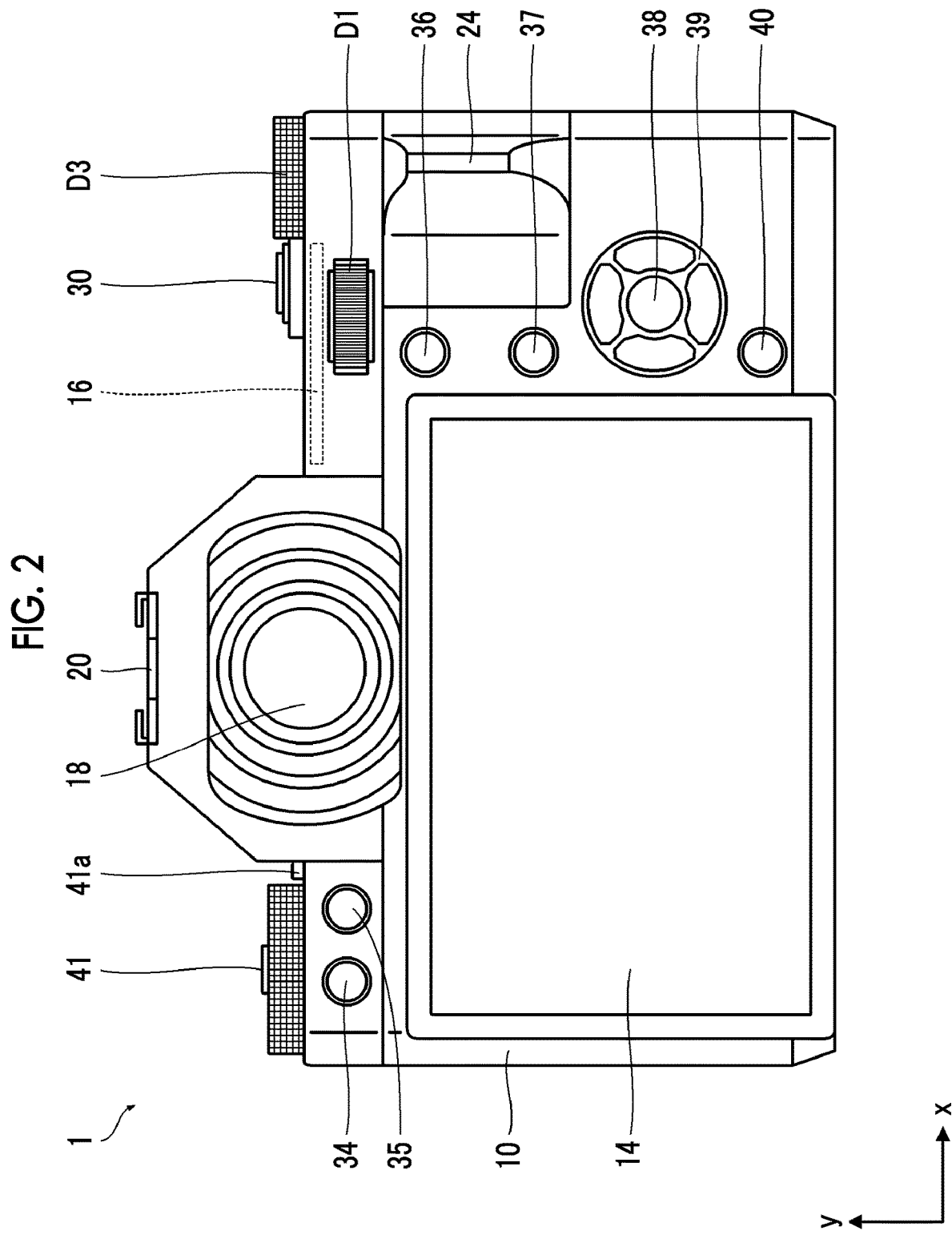
FIG. 2 is a back view of the digital camera.
Figure 3:
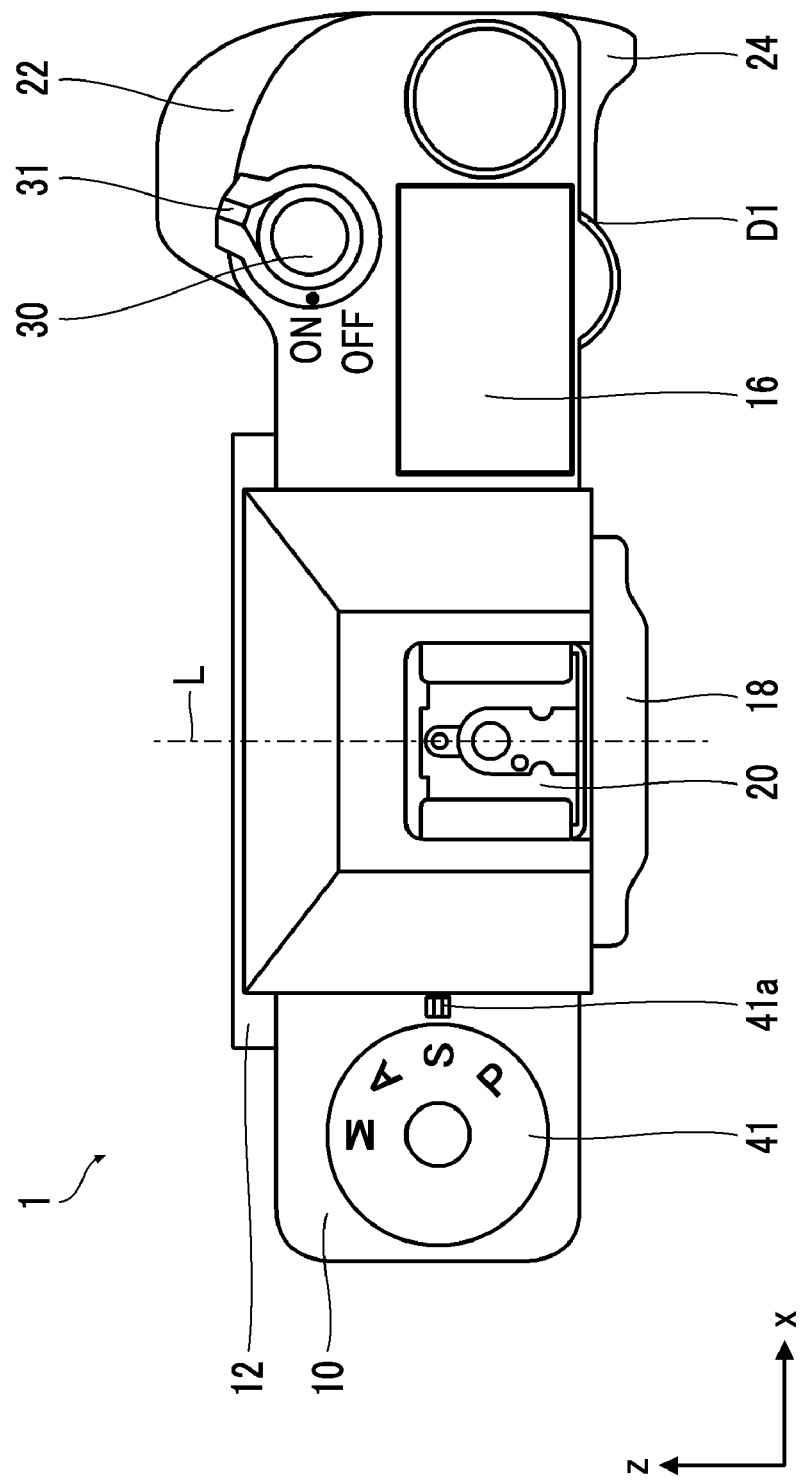
FIG. 3 is a plan view of the digital camera.
Figure 4:
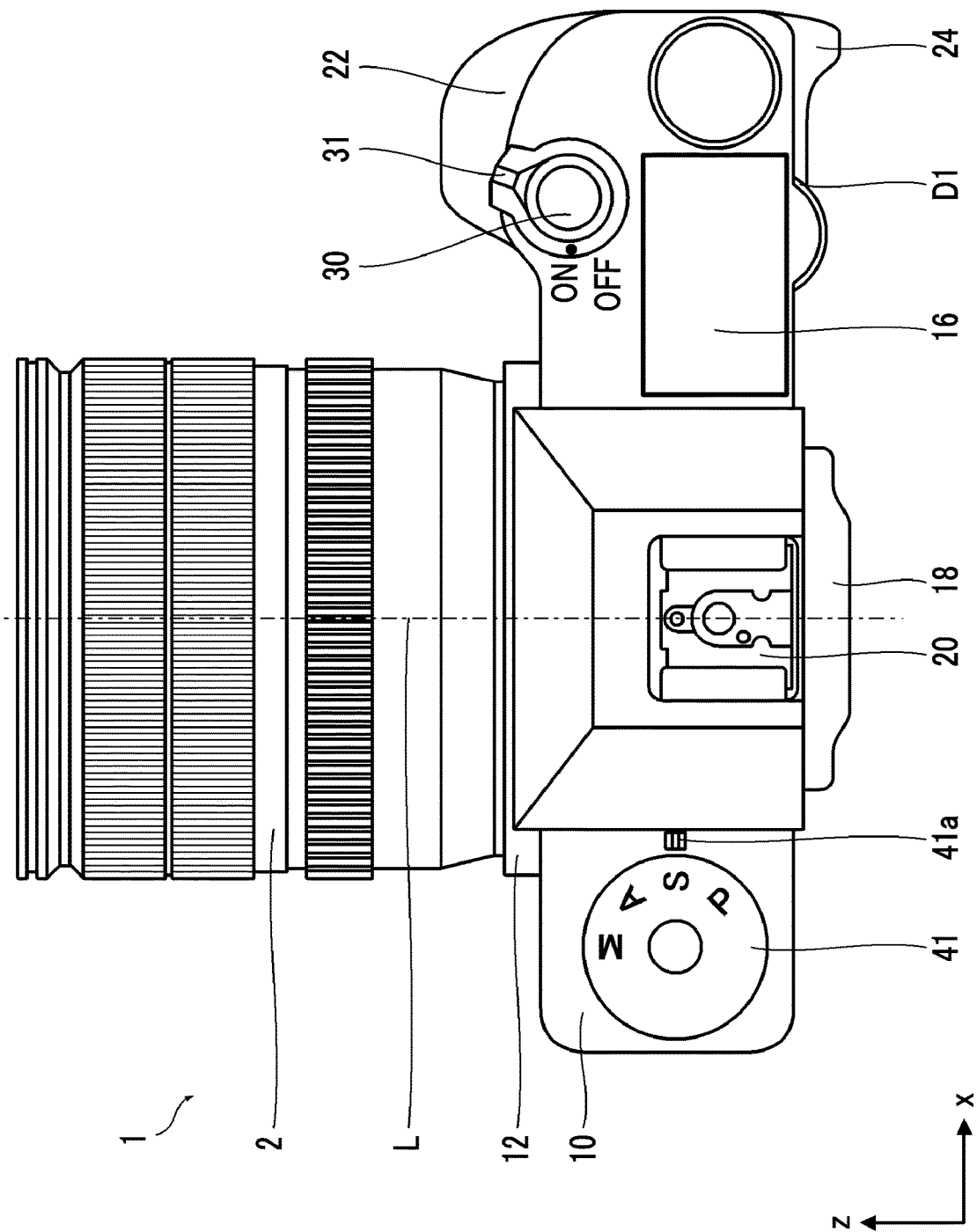
FIG. 4 is a plan view of the digital camera in a state where a lens is mounted.
Figure 5:
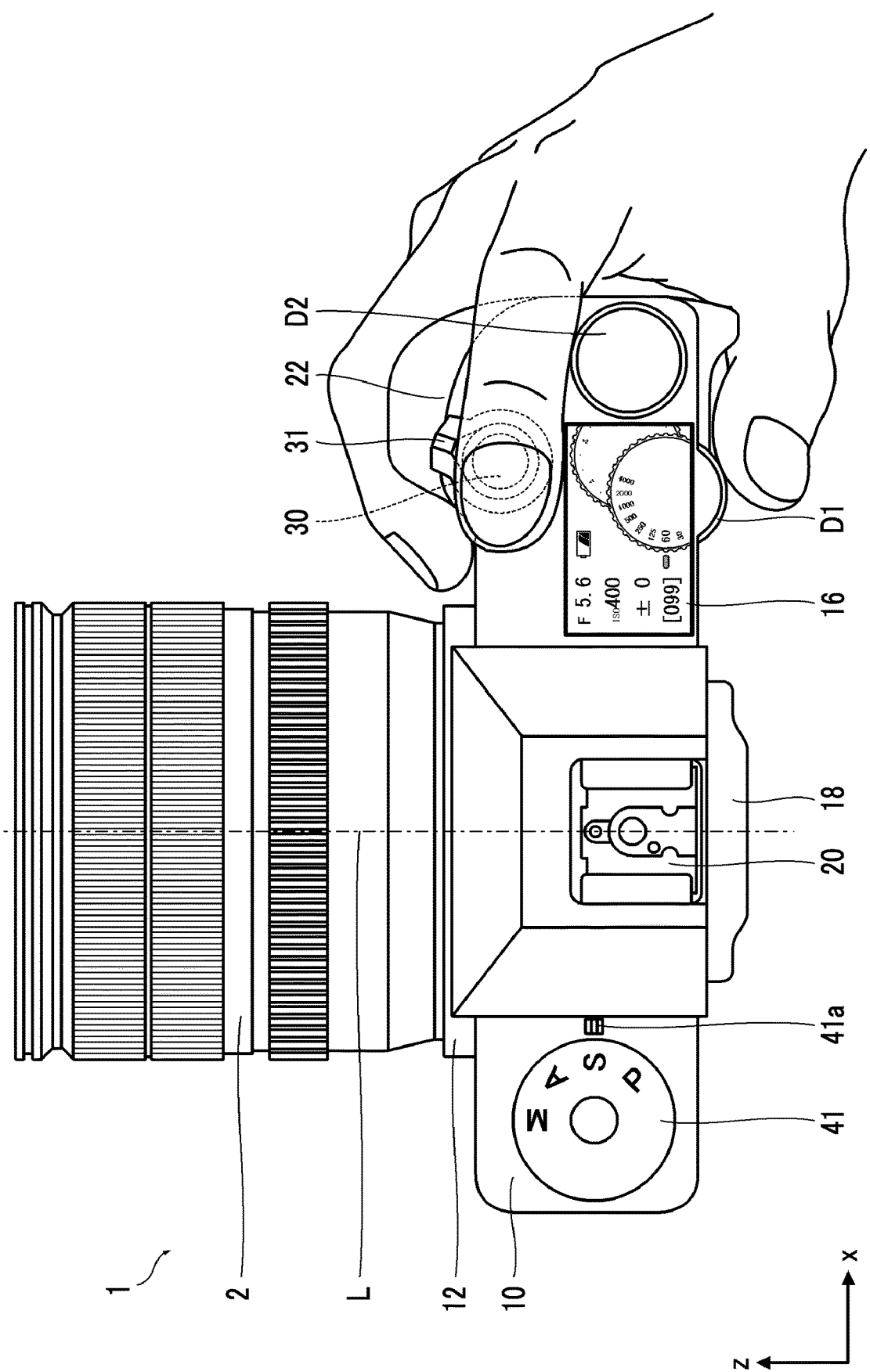
FIG. 5 is a plan view showing a use form at a time of imaging of the digital camera.

FIGS. 1, 2, and 3 are a front view, a back view, and a plan view, respectively, showing an example of a digital camera to which the invention is applied. Further, FIG. 4 is a plan view of the digital camera in a state where a lens is mounted. Further, FIG. 5 is a plan view showing a use form at a time of imaging of the digital camera.

In this specification, a direction along an optical axis L (a z direction in FIG. 3) is referred to as a front-rear direction and a subject side is referred to as a front direction. Further, on a plane orthogonal to the optical axis L, a direction along a long side of an image sensor 50 (an x direction in FIG. 1) is referred to as a lateral direction or a left-right direction and a direction along a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical view finder and is also referred to as a mirrorless digital camera.

As shown in FIGS. 1 to 5, the camera body 10 is provided with a lens mount 12, a main-display 14, a sub-display 16, an electronic view finder 18, a hot shoe 20, and the like. Further, a shutter button 30, a power supply lever 31, a playback button 34, a delete button 35, an AF lock button 36, an AE lock button 37, a menu button 38, selector buttons 39, a display button 40, a mode dial 41, a first operation dial D1, a second operation dial D2, and the like are provided as operation members.

«Camera Body»

The camera body 10 has the shape of a rectangular box that is thin in the front-rear direction. One (left side in FIG. 1) end portion of the camera body 10 is formed as a grip portion. A user grips the grip portion to perform a release operation. The grip portion comprises a grip 22 on the front surface side and a thumb rest 24 on the back surface side.

«Lens Mount»

The lens mount 12 is a mounting portion for the lens 2. As shown in FIG. 1, the lens mount 12 is provided on the front surface of the camera body 10. The lens 2 is mounted on the lens mount 12 attachably and detachably. The lens mount 12 is formed of a bayonet type.

«Main-Display»

The main-display 14 is mainly used for the display of an image. As shown in FIG. 2, the main-display 14 is provided on the back surface of the camera body 10. The main-display 14 is formed of, for example, a color liquid crystal display (LCD).

As described above, the main-display 14 is mainly used for the display of the image. The image to be displayed includes a live view image in addition to an imaged image. The live view is a function of displaying an image captured by an image sensor in real time. It is possible to confirm the angle of view, a focus state, and the like on the main-display 14 by performing the live view at the time of the imaging.

Further, the main-display 14 is also used as a graphical user interface (GUI). That is, in a case where various settings are performed, a setting screen is displayed on the main-display 14 and the various settings are performed on the setting screen.

«Sub-Display»

The sub-display 16 is an example of a display section. The sub-display 16 is mainly used for the display of setting contents of the camera. The sub-display 16 is formed of a display smaller than the main-display 14.

The sub-display 16 is provided on a top surface of the camera body 10 as shown in FIG. 3. In particular, in the digital camera 1 of the embodiment, the sub-display 16 is provided at an end portion on a grip portion side on the top surface of the camera body 10. A display surface of the sub-display 16 configures a part of the top surface of the camera body 10.

The display surface of sub-display 16 has a rectangular shape, and the short side thereof is disposed in parallel to the optical axis L. More specifically, the short side thereof is disposed along the front-rear direction (z direction), and the long side thereof is disposed along the lateral direction (x direction).

As described above, the sub-display 16 displays the setting contents of the digital camera 1. Specific display contents will be described below.

«Electronic View Finder»

The electronic view finder (EVF) 18 is an electronic finder in which the LCD is built. As shown in FIG. 2, the electronic view finder 18 is provided on the upper part of the camera body 10 (so-called warship part), and an eyepiece part is provided on the back surface.

«Hot Shoe»

The hot shoe 20 is a mounting portion of an external flash. As shown in FIG. 3, the hot shoe 20 is provided on the top surface of the camera body 10.

«Operation Member»

The camera body 10 is provided with the shutter button 30, the power supply lever 31, the playback button 34, the delete button 35, the AF lock button 36, the AE lock button 37, the menu button 38, the selector buttons 39, the display button 40, the mode dial 41, the first operation dial D1, the second operation dial D2, and the like as the operation members.

<Shutter Button>

The shutter button 30 is provided on the top surface (upper surface) of the camera body 10 and disposed on a grip portion side. The shutter button 30 is formed of a so-called two-stage switch that has a half-pressed stage and a fully-pressed stage. In a case where the shutter button 30 is half pressed, imaging preparations, that is, respective pieces of processing such as AE, AF, and AWB are performed. Thereafter, in a case where the shutter button 30 is fully pressed, main imaging, that is, receiving of an image for recording is performed. The AE is an abbreviation of automatic exposure and refers to a function that the camera automatically measures the brightness of a subject and decides proper exposure. Further, the AF is an abbreviation of automatic focus and refers to a function that the camera automatically measures a distance to the subject and focuses on the subject. Further, the AWB is an abbreviation of automatic white balance and refers to a function that the camera automatically determines a light situation and reproduces an appropriate color state.

<Power Supply Lever>

The power supply lever 31 is disposed coaxially with the shutter button 30. The power supply lever 31 is formed of a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

<Playback Button>

The playback button 34 is a button that switches a mode of the digital camera 1 to a playback mode. The playback button 34 is provided on the back surface of the camera body 10 and disposed above the main-display 14. In a case where the playback button 34 is pressed in a state where the mode of the digital camera 1 is set to the imaging mode, the mode of the digital camera 1 is switched to the playback mode. In the case where the playback mode is set, the last captured image is displayed on the main-display 14.

A function of switching from the playback mode to the imaging mode is assigned to the shutter button 30. In a case where the shutter button 30 is pressed in a state where the playback mode is set, the mode of the digital camera 1 is switched to the imaging mode.

<Delete Button>

The delete button 35 is a button that performs an instruction to delete the imaged image displayed on the main-display 14. The delete button 35 is provided on the back surface of the camera body 10 and disposed above the main-display 14. In a case where the delete button 35 is pressed in a state where the imaged image is displayed on the main-display 14, a screen that confirms the deletion is displayed on the main-display 14. In a case where the execution of the deletion is instructed according to the display on the main-display 14, the imaged image during playback is deleted from a memory card.

<AF Lock Button>

The AF lock button 36 is a button that performs an instruction to lock the focus. As shown in FIG. 2, the AF lock button 36 is provided on the back surface of the camera body 10 and disposed near a thumb rest 24. In a case where the AF lock button 36 is pressed, the focus is locked.

<AE Lock Button>

The AE lock button 37 is a button that performs an instruction to lock the exposure. As shown in FIG. 2, the AE lock button 37 is provided on the back surface of the camera body 10 and disposed near the thumb rest 24. In a case where the AE lock button 37 is pressed, the exposure is locked.

<Menu Button>

The menu button 38 is a button that calls a menu screen on the main-display 14. The menu button 38 is provided on the back surface of the camera body 10. The menu button 38 is pressed to display the menu screen on the main-display 14. The setting screen for performing various setting can be called from the menu screen.

The menu button 38 functions also as an OK button. The OK button refers to a button for instructing OK for a selection item, a confirmation item, or the like.

<Selector Button>

The selector button 39 is formed of four buttons of up, down, left, and right disposed on the same circle with the menu button 38 as the center. A function according to a setting situation of the digital camera 1 is assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an AF mode is assigned to the button in the upper direction, and a function of calling the setting screen of a consecutive imaging mode is assigned to the button in the lower direction. Furthermore, in a case where the various setting screens are called on the main-display 14, the four buttons function as buttons that move a cursor in each direction on the screens.

<Display Button>

The display button 40 is a button that performs an instruction to switch the display on the main-display 14. The display button 40 is provided on the back surface of the camera body 10. In a case where the display button 40 is pressed in a state where the playback mode or the imaging mode is set, the display on the main-display 14 is switched. For example, in a case where the display button 40 is pressed in the state where the playback mode is set, an imaging condition, histogram, and the like of an image displayed on the main-display 14 are displayed on the image in an overlapped manner. For example, in a case where the display button 40 is pressed in the state where the imaging mode is set, various pieces of information such as the imaging condition or the histogram are displayed on the live view image in an overlapped manner.

The display button 40 functions as a BACK button. The BACK button is a button that performs an instruction to return the display on the main-display 14 to one previous state. For example, the display button 40 is pressed in a state where various setting screens are displayed on the main-display 14, the display on the main-display 14 is returned to one previous state. Accordingly, it is possible to cancel the selection item, the confirmation item, or the like.

<Mode Dial>

The mode dial 41 is a dial that sets the imaging mode. Each symbol of "P", "S", "A", and "M" is displayed on the same circumference at regular intervals on the top surface of the mode dial 41. The symbol "P" represents the program, the symbol "S" represents the shutter speed priority, the symbol "A" represents the aperture stop priority, and the symbol "M" represents the manual.

Here, the program in the imaging mode refers to a mode in which a combination of the F-number and the shutter speed can be changed while the exposure is constantly maintained. The program is an imaging mode in which so-called program shift is possible.

The shutter speed priority refers to a mode in which the camera automatically decides an F-number such that the proper exposure is achieved for a shutter speed selected by the user.

The aperture stop priority refers to a mode in which the camera automatically decides a shutter speed such that the proper exposure is achieved for an F-number selected by the user.

The manual refers to a mode in which the user selects the shutter speed and the F-number.

The mode dial 41 is formed such that click-stop is possible at a position of each symbol with respect to an indicator 41a. In a case where the symbol "P" is set to the indicator 41a, the imaging mode is set to the program. In a case where the symbol "S" is set to the indicator 41a, the imaging mode is set to the shutter speed priority. In a case where the symbol "A" is set to the indicator 41a, the imaging mode is set to the aperture stop priority. In a case where the symbol "M" is set to the indicator 41a, the imaging mode is set to the manual.

FIG. 3 shows an example in the case where the imaging mode is set to the shutter speed priority. In this case, the symbol "S" is set to the indicator 41a.

<First Operation Dial>

The first operation dial D1 is one of a plurality of rotary operation dials provided. The first operation dial D1 is built in the camera body 10, and a part of the outer periphery thereof is disposed on the back surface of the camera body 10 in an exposed manner. More specifically, the part of the outer periphery thereof is disposed in the upper right corner of the back surface of the camera body 10 in an exposed manner. This position is a position where the operation is possible with the thumb of the right hand holding the grip portion of the camera body 10. Further, this position is a position near the sub-display 16 and is a position on the rear side as viewed from the sub-display 16. The "near" refers to a distance relationship to the extent that the sub-display 16 and the first operation dial D1 are disposed adjacent to each other as shown in FIG. 3.

Figure 6:
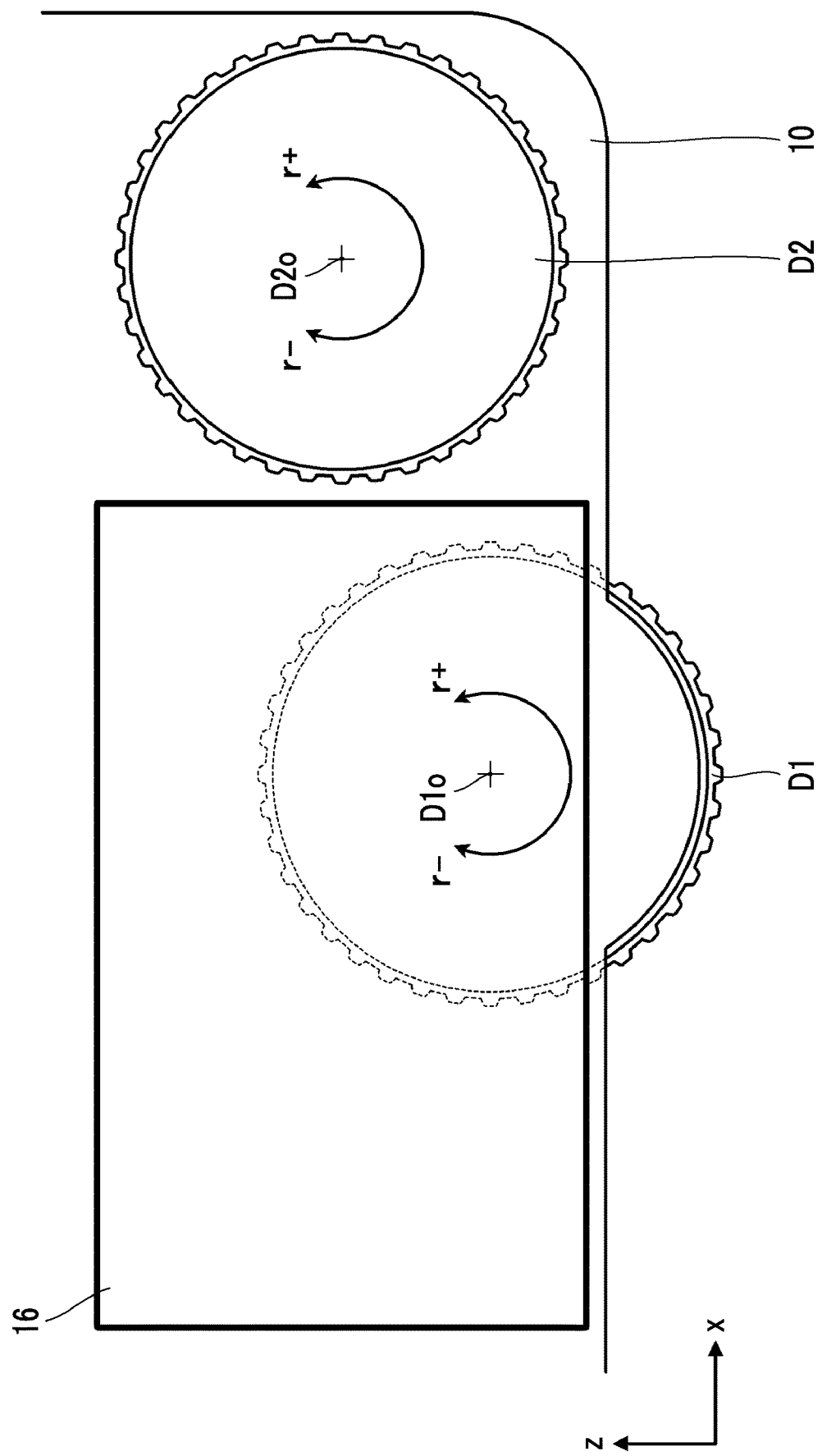
FIG. 6 is a plan view enlarging an installation part of a sub-display.

FIG. 6 is a plan view enlarging an installation part of a sub-display.

The first operation dial D1 is disposed on the lower side of the sub-display 16 in a case where the camera body 10 is viewed in a plan view. In other words, the sub-display 16 is disposed on the first operation dial D1 in an overlapped manner. Further, a rotation axis D1o of the first operation dial D1 is disposed orthogonally to the display surface of the sub-display 16. Furthermore, the rotation axis D1o of the first operation dial D1 is disposed within the display surface of the sub-display 16. In other words, the sub-display 16 is disposed on the axis of the first operation dial D1.

The first operation dial D1 has a disc shape, and unevenness for preventing slippage is periodically provided along the circumference direction on the outer periphery of the first operation dial D1.

The first operation dial D1 is provided such that the rotation operation thereof is possible endlessly and in both directions. That is, the first operation dial D1 is provided such that the rotation operation thereof is possible endlessly in a clockwise rotation direction r− and in a counterclockwise rotation direction r+ with the rotation axis D1o as the center. In this specification, the clockwise rotation direction r− is set as a minus rotation direction, and the counterclockwise rotation direction r+ is set as a plus rotation direction.

Further, the first operation dial D1 is provided with a click mechanism. The first operation dial D1 is provided such that the click-stop is possible at regular angle intervals by this click mechanism. The click-stop refers to a function of stopping the rotation with a click feeling. Since this type of click mechanism is a publicly known technique, a description of specific configuration thereof is omitted.

Figure 8:
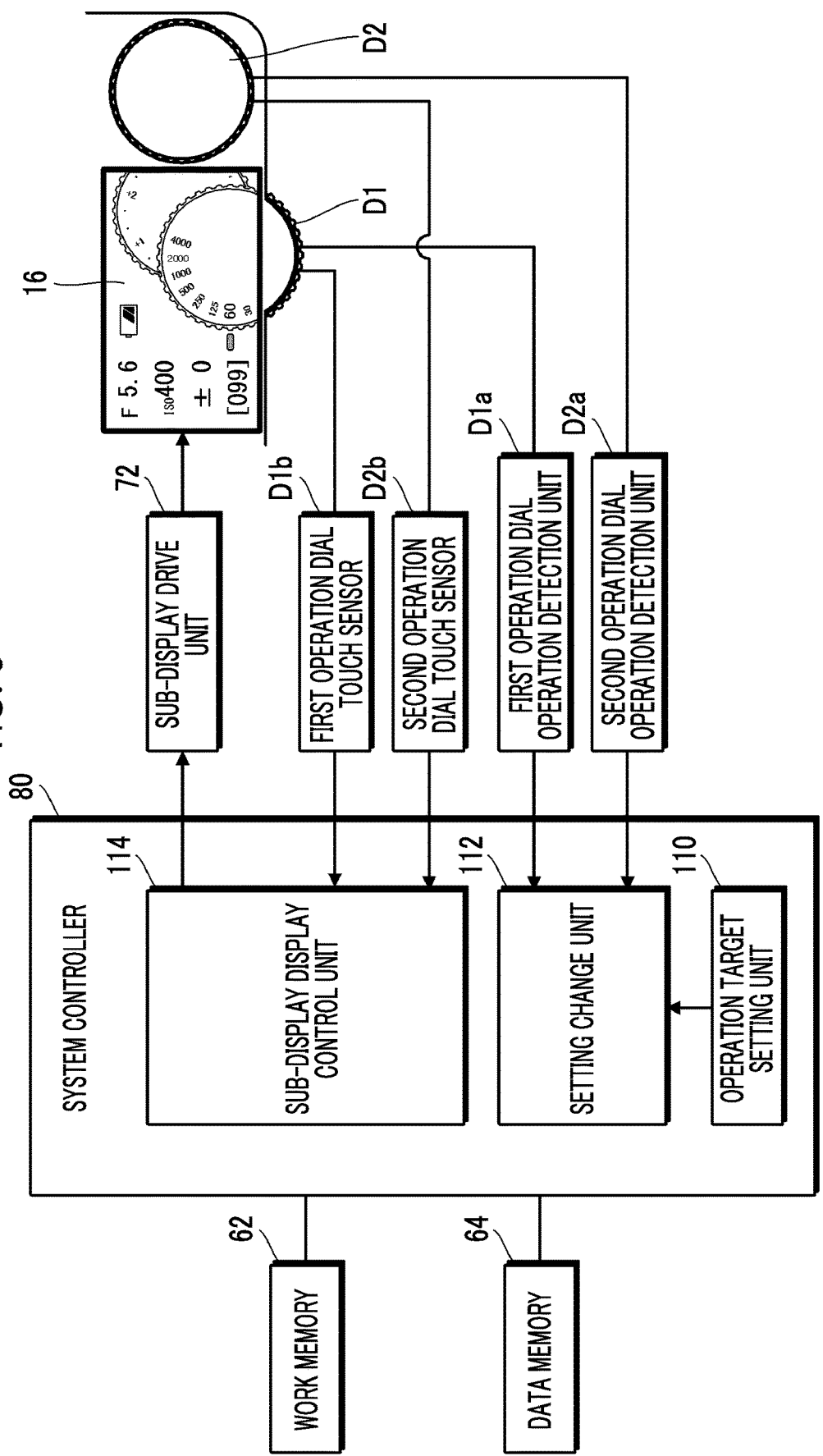
FIG. 8 is a block diagram showing a system configuration of an operation system by using a first operation dial and a second operation dial.

The operation of the first operation dial D1 is detected by a first operation dial operation detection unit D1a (refer to FIG. 8). The first operation dial operation detection unit D1a detects an operation direction and an operation amount of the first operation dial D1 and outputs the information to a system controller 80. The first operation dial operation detection unit D1a performs the detection, for example, with rotation detection means such as a rotary encoder.

The first operation dial D1 is provided with a touch sensor for detecting the contact of the finger. Hereinafter, this touch sensor provided in the first operation dial D1 is referred to as a first operation dial touch sensor D1b (refer to FIG. 8). The first operation dial touch sensor D1b is one example of the detection unit. The first operation dial touch sensor D1b detects the contact of the finger with the first operation dial D1 and outputs the information to the system controller 80.

A target operated by the first operation dial D1 is automatically switched according to a state of the digital camera 1. For example, in a case where the imaging mode is set, a function of performing the program shift is assigned in a case where a program mode is selected.

<Second Operation Dial>

The second operation dial D2 is one of the plurality of rotary operation dials provided. The second operation dial D2 is provided on the top surface of the camera body 10. More specifically, the second operation dial D2 is provided at the end portion on the grip portion side on the top surface of the camera body 10 as shown in FIG. 6. This position is a position near the sub-display 16 and is a position adjacent to the right as viewed from the sub-display 16.

The second operation dial D2 has the disc shape, and a rotation axis D2o of the second operation dial D2 is disposed orthogonally to the display surface of the sub-display 16. Further, the unevenness for preventing the slippage is periodically provided along the circumference direction on the outer periphery of the second operation dial D2.

The second operation dial D2 is provided such that the rotation operation thereof is possible endlessly and in both directions similarly to the first operation dial D1. That is, the second operation dial D2 is provided such that the rotation operation thereof is possible endlessly in the clockwise rotation direction r− and in the counterclockwise rotation direction r+ with the rotation axis D2o as the center.

Further, the second operation dial D2 is provided with the click mechanism. The second operation dial D2 is provided such that the click-stop is possible at regular angle intervals by this click mechanism.

The operation of the second operation dial D2 is detected by a second operation dial operation detection unit D2a (refer to FIG. 8). The second operation dial operation detection unit D2a detects the operation direction and the operation amount of the second operation dial D2 and outputs the information to a system controller 80. The second operation dial operation detection unit D2a performs the detection, for example, with the rotation detection means such as the rotary encoder.

The second operation dial D2 is provided with the touch sensor for detecting the contact of the finger. Hereinafter, the touch sensor provided in the second operation dial D2 is referred to as a second operation dial touch sensor D2b (refer to FIG. 8). The second operation dial touch sensor D2b is one example of the detection unit. The second operation dial touch sensor D2b detects the contact of the finger with the second operation dial D2 and outputs the information to the system controller 80.

A target operated by the second operation dial D2 is automatically switched according to the state of the digital camera 1. For example, in the case where the imaging mode is set, a function of setting the exposure correction amount is assigned in the case where the program mode is selected.

[Entire Control System]

Figure 7:
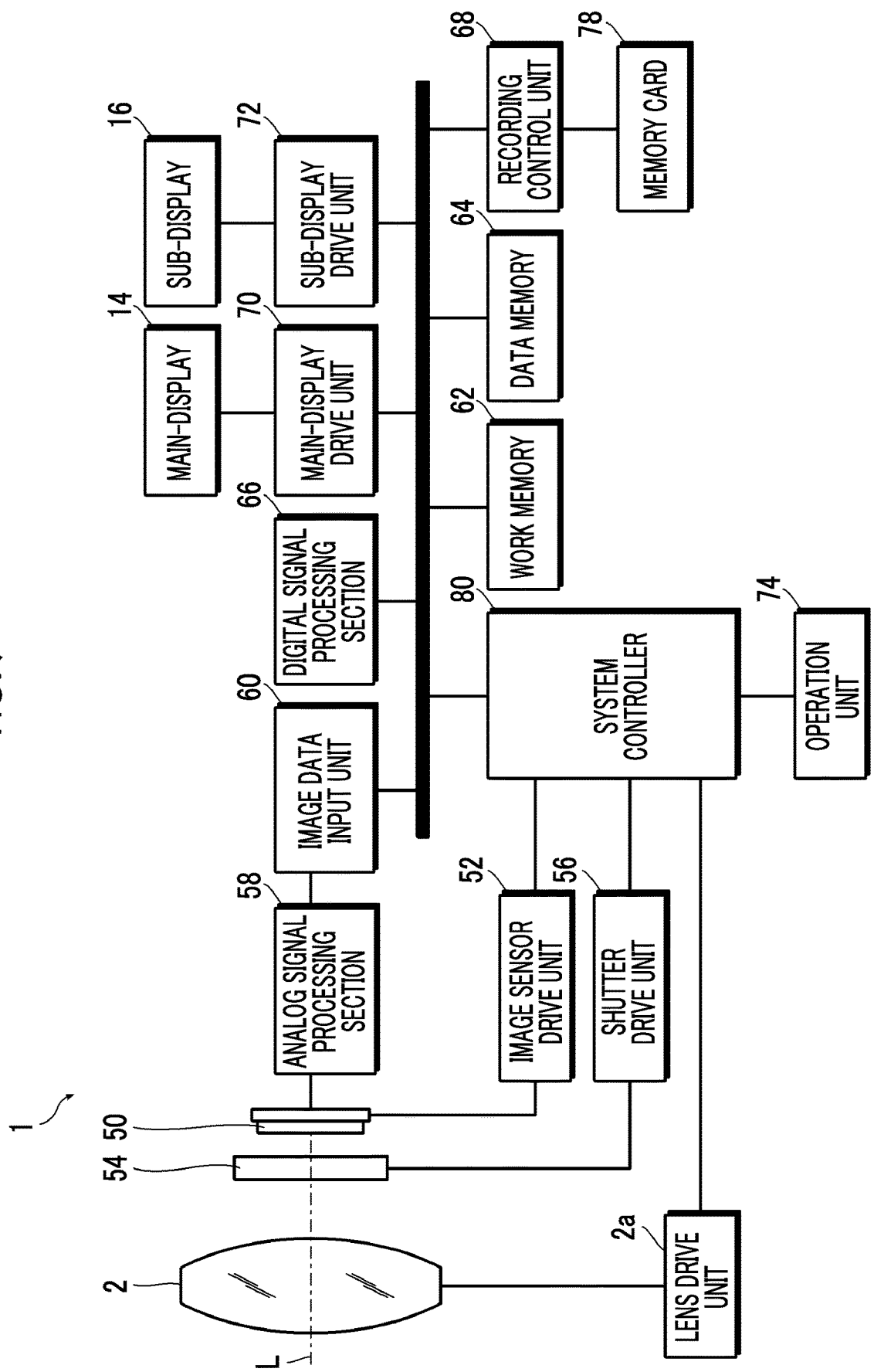
FIG. 7 is a block diagram showing a schematic configuration of the entire control system of the digital camera.

FIG. 7 is a block diagram showing a schematic configuration of the entire control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main-display drive unit 70, a sub-display drive unit 72, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50. FIG. 1 shows a state where the shutter is fully opened.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The main-display drive unit 70 drives the main-display 14 according to a command output from the system controller 80.

The sub-display drive unit 72 drives the sub-display 16 according to a command from the system controller 80.

The operation unit 74 includes the shutter button 30, the power supply lever 31, the playback button 34, the delete button 35, the AF lock button 36, the AE lock button 37, the menu button 38, the selector buttons 39, the display button 40, the mode dial 41, the first operation dial D1, the second operation dial D2, and the like, and outputs a signal in response to the operation of each operation member to the system controller 80.

The system controller 80 is a control unit that controls the operation of each unit of the digital camera 1. The system controller 80 is formed of a microcomputer. That is, the microcomputer executes a predetermined program to function as the system controller 80.

The system controller 80 also functions as a control unit for the lens 2. The system controller 80 controls the operation of the lens 2 through a lens drive unit 2a provided in the lens 2. The lens 2 comprises a stop, a focus lens, and the like. The lens drive unit 2a comprises a stop drive unit that drives the stop, a focus lens drive unit that drives the focus lens, and the like.

Pieces of processing from the imaging to the recording are roughly as follows.

First, the analog signal processing section 58 receives a signal output from the image sensor 50 by the full press of the shutter button 30. The signal is subjected to a predetermined analog signal processing to convert the signal to a digital signal and output in the analog signal processing section 58.

The work memory 62 receives the signal output from the analog signal processing section 58 through the image data input unit 60. Then, the signal is added to the digital signal processing section 66 from the work memory 62.

In the digital signal processing section 66, the added signal is subjected to a predetermined signal processing to generate image data for recording. The generated image data is temporarily stored in the work memory 62, then converted to a predetermined recording format, and stored in the memory card 78 through the recording control unit 68.

[Operation System by Using First Operation Dial and Second Operation Dial]

«Configuration»

FIG. 8 is a block diagram showing a system configuration of an operation system by using the first operation dial and the second operation dial.

The operation system by using the first operation dial D1 and the second operation dial D2 is mainly formed of the first operation dial operation detection unit D1a that detects the operation of the first operation dial D1, the second operation dial operation detection unit D2a that detects the operation of the second operation dial D2, the first operation dial touch sensor D1b that detects the contact with the first operation dial D1, the second operation dial touch sensor D2b that detects the contact with the second operation dial D2, an operation target setting unit 110 that sets operation targets of the first operation dial D1 and the second operation dial D2, a setting change unit 112 that changes the settings of items to be set by the operation target setting unit 110 based on the operations of the first operation dial D1 and the second operation dial D2, and a sub-display display control unit 114 that controls the display on the sub-display 16.

<First Operation Dial Operation Detection Unit>

The first operation dial operation detection unit D1a detects the operation with respect to the first operation dial D1. That is, the first operation dial operation detection unit D1a detects the operation direction and the operation amount thereof. The operation amount is detected in units of one click. That is, the rotation operation by one click is detected as 1. Therefore, in a case where the first operation dial D1 is rotated by two clicks counterclockwise, the operation amount becomes +2. Further, in a case where the first operation dial D1 is rotated by two clicks clockwise, the operation amount becomes −2. The first operation dial operation detection unit D1a is formed of, for example, the detection means such as the rotary encoder. In a case where the operation of the first operation dial D1 is detected, the first operation dial operation detection unit D1a outputs the information, that is, the information on the operation direction and the operation amount of the first operation dial D1 to the system controller 80.

<Second Operation Dial Operation Detection Unit>

The second operation dial operation detection unit D2a detects the operation with respect to the second operation dial D2. That is, the second operation dial operation detection unit D2a detects the operation direction and the operation amount of the second operation dial D2. The operation amount is detected in units of one click. That is, the rotation operation by one click is detected as 1. Therefore, in a case where the second operation dial D2 is rotated by two clicks counterclockwise, the operation amount becomes +2. Further, in a case where the second operation dial D2 is rotated by two clicks clockwise, the operation amount becomes −2. The second operation dial operation detection unit D2a is formed of, for example, the detection means such as the rotary encoder. In a case where the operation of the second operation dial D2 is detected, the second operation dial operation detection unit D2a outputs the information, that is, the information on the operation direction and the operation amount of the second operation dial D2 to the system controller 80.

<First Operation Dial Touch Sensor>

The first operation dial touch sensor D1b is one example of the detection unit. The first operation dial touch sensor D1b detects the contact of the finger with the first operation dial D1. In the case where the contact of the finger with the first operation dial D1 is detected, the first operation dial touch sensor D1b outputs the information to the system controller 80.

<Second Operation Dial Touch Sensor>

The second operation dial touch sensor D2b is one example of the detection unit. The second operation dial touch sensor D2b detects the contact of the finger with the second operation dial D2. In the case where the contact of the finger with the second operation dial D2 is detected, the second operation dial touch sensor D2b outputs the information to the system controller 80.

<Operation Target Setting Unit>

The operation target setting unit 110 sets the operation targets of the first operation dial D1 and the second operation dial D2. As described above, the targets to be operated by the first operation dial D1 and the second operation dial D2 are automatically switched according to the state of the digital camera 1. The operation target setting unit 110 executes this switching processing.

In the case where the digital camera 1 is in the playback mode, a function of performing frame feeding is assigned to the first operation dial D1. In this case, an image is sent one frame in a case where the first operation dial D1 is rotated counterclockwise, and an image is returned one frame in a case where the first operation dial D1 is rotated clockwise.

Further, in the case where the digital camera 1 is in the playback mode, a function of zooming an image during playback is assigned to the second operation dial D2. In this case, an image is enlarged in a case where the second operation dial D2 is rotated counterclockwise, and an image is reduced in a case where the second operation dial D2 is rotated clockwise.

Further, in a case where various settings are performed by using the main-display 14, a function of changing the setting value is assigned to the first operation dial D1. In this case, the setting value is advanced in the case where the first operation dial D1 is rotated counterclockwise, and the setting value is lowered in the case where the first operation dial D1 is rotated clockwise. The same function is also assigned to the second operation dial D2.

Furthermore, in the case where the digital camera 1 is in the imaging mode, the functions according to the selected modes are assigned to the first operation dial D1 and the second operation dial D2. Hereinafter, the functions assigned to the first operation dial D1 and the second operation dial D2 for each mode will be described.

(1) Program Mode

In the case where the program mode is selected, a function of the program shift, that is, a function of changing the combination of the F-number and the shutter speed while the exposure is constantly maintained is assigned to the first operation dial D1. On the other hand, the function of setting the exposure correction amount, that is, a function as an exposure correction dial is assigned to the second operation dial D2. In this case, the shutter speed is advanced (F-number is lowered) in the case where the first operation dial D1 is rotated counterclockwise, and the shutter speed is lowered (F-number is advanced) in the case where the first operation dial D1 is rotated in the clockwise direction. Further, the exposure correction amount is stepwise set to a plus side in the case where the second operation dial D2 is rotated counterclockwise, and the exposure correction amount is stepwise set to a minus side in the case where the second operation dial D2 is rotated in the clockwise direction.

(2) Shutter Speed Priority Mode

In a case where a shutter speed priority mode is selected, a function of setting the shutter speed, that is, a function as a shutter speed dial is assigned to the first operation dial D1. On the other hand, the function of setting the exposure correction amount is assigned to the second operation dial D2. In this case, the shutter speed is stepwise advanced in the case where the first operation dial D1 is rotated counterclockwise, and the shutter speed is stepwise lowered in the case where the first operation dial D1 is rotated in the clockwise direction. Further, the exposure correction amount is stepwise set to the plus side in the case where the second operation dial D2 is rotated counterclockwise, and the exposure correction amount is stepwise set to the minus side in the case where the second operation dial D2 is rotated in the clockwise direction.

(3) Aperture Stop Priority Mode

In a case where an aperture stop priority mode is selected, a function of setting the F-number, that is, a function as an aperture stop dial is assigned to the first operation dial D1. On the other hand, the function of setting the exposure correction amount is assigned to the second operation dial D2. In this case, the F-number is stepwise advanced in the case where the first operation dial D1 is rotated counterclockwise, and the F-number is stepwise lowered in the case where the first operation dial D1 is rotated in the clockwise direction. Further, the exposure correction amount is stepwise set to the plus side in the case where the second operation dial D2 is rotated counterclockwise, and the exposure correction amount is stepwise set to the minus side in the case where the second operation dial D2 is rotated in the clockwise direction.

(4) The Manual Mode

In a case where a manual mode is selected, the function of setting the shutter speed, that is, a function as the shutter speed dial is assigned to the first operation dial D1. On the other hand, the function of setting the F-number, that is, the function as the aperture stop dial is assigned to the second operation dial D2. In this case, the shutter speed is stepwise advanced in the case where the first operation dial D1 is rotated counterclockwise, and the shutter speed is stepwise lowered in the case where the first operation dial D1 is rotated in the clockwise direction. Further, the F-number is stepwise advanced in the case where the second operation dial D2 is rotated counterclockwise, and the F-number is stepwise lowered in the case where the second operation dial D2 is rotated in the clockwise direction.

A table in which the function assigned according to the state of the digital camera 1 is defined is stored in the data memory 64. The operation target setting unit 110 sets the operation targets of the first operation dial D1 and the second operation dial D2 with reference to this table.

The function of the operation target setting unit 110 is provided as one function of the system controller 80. That is, the microcomputer executes the predetermined program to provide the function of the operation target setting unit 110 as one function of the system controller 80.

<Setting Change Unit>

The setting change unit 112 changes the settings of the operation targets set by the operation target setting unit 110 based on the operations of the first operation dial D1 and the second operation dial D2. For example, it is assumed that the function of setting the shutter speed is assigned to the first operation dial D1 and the function of setting the exposure correction amount is assigned to the second operation dial D2. In this case, the shutter speed is advanced according to a rotation amount (operation amount) of the first operation dial D1 in the case where the first operation dial D1 is rotated counterclockwise. Further, the shutter speed is lowered according to the rotation amount in the case where the first operation dial D1 is rotated clockwise. Further, the exposure correction amount is stepwise set to the plus side according to a rotation amount (operation amount) of the second operation dial D2 in the case where the second operation dial D2 is rotated counterclockwise. Further, the exposure correction amount is stepwise set to the minus side according to the rotation amount in the case where the second operation dial D2 is rotated clockwise.

The function of the setting change unit 112 is provided as one function of the system controller 80. That is, the microcomputer executes the predetermined program to provide the function of the setting change unit 112 as one function of the system controller 80.

<Sub-Display Display Control Unit>

The sub-display display control unit 114 is one example of the display control unit. The sub-display display control unit 114 controls the display on the sub-display 16 through the sub-display drive unit 72. The sub-display display control unit 114 controls the display on the sub-display 16 based on detection results of the contact of the finger with the first operation dial D1 and the second operation dial D2 and the rotation operations of the first operation dial D1 and the second operation dial D2.

The function of the sub-display display control unit 114 is provided as one function of the system controller 80. That is, the microcomputer executes the predetermined program to provide the function of the sub-display display control unit 114 as one function of the system controller 80.

«Display on Sub-Display»

Figure 9:
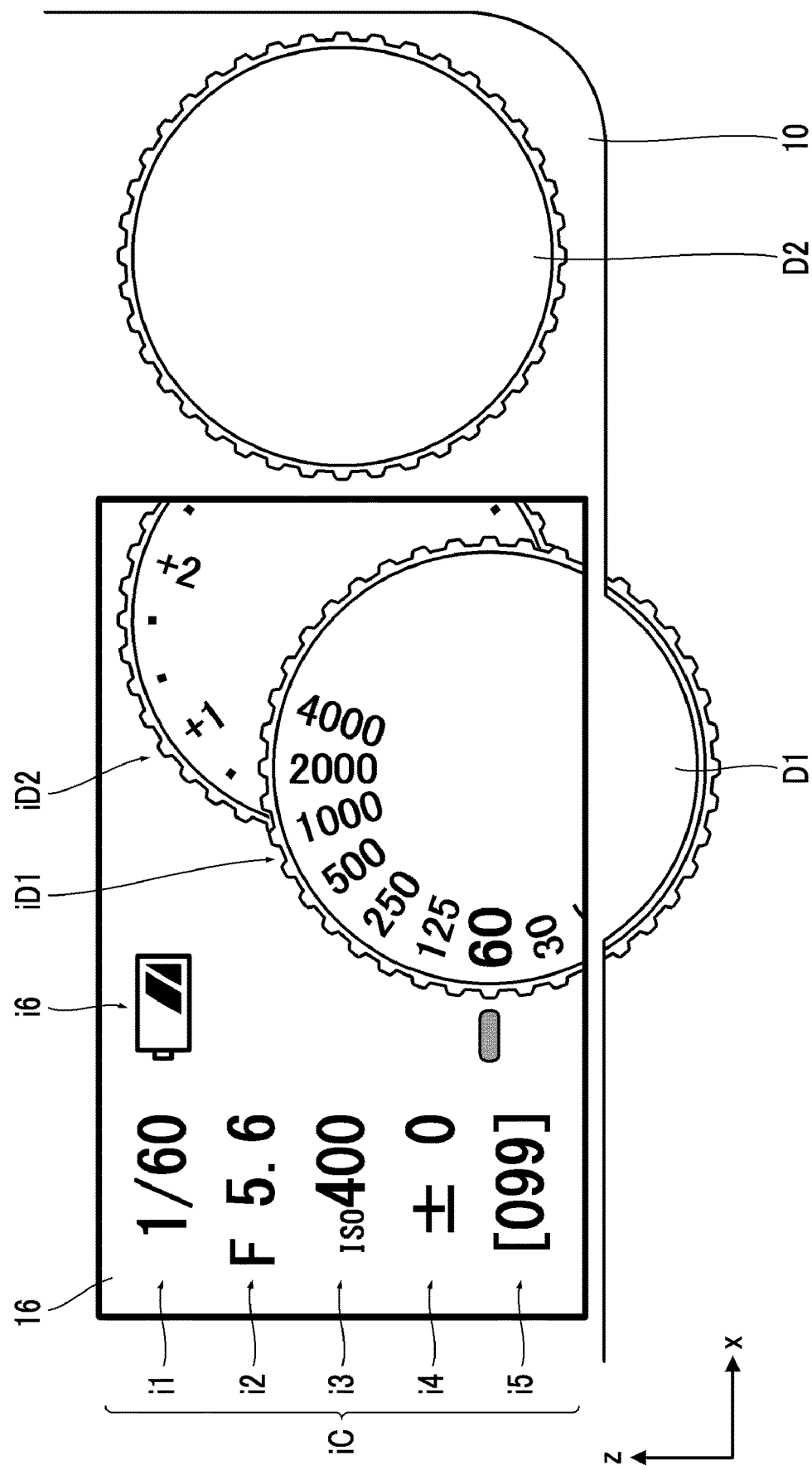
FIG. 9 is a plan view showing an example of a display on the sub-display.
Figure 10:
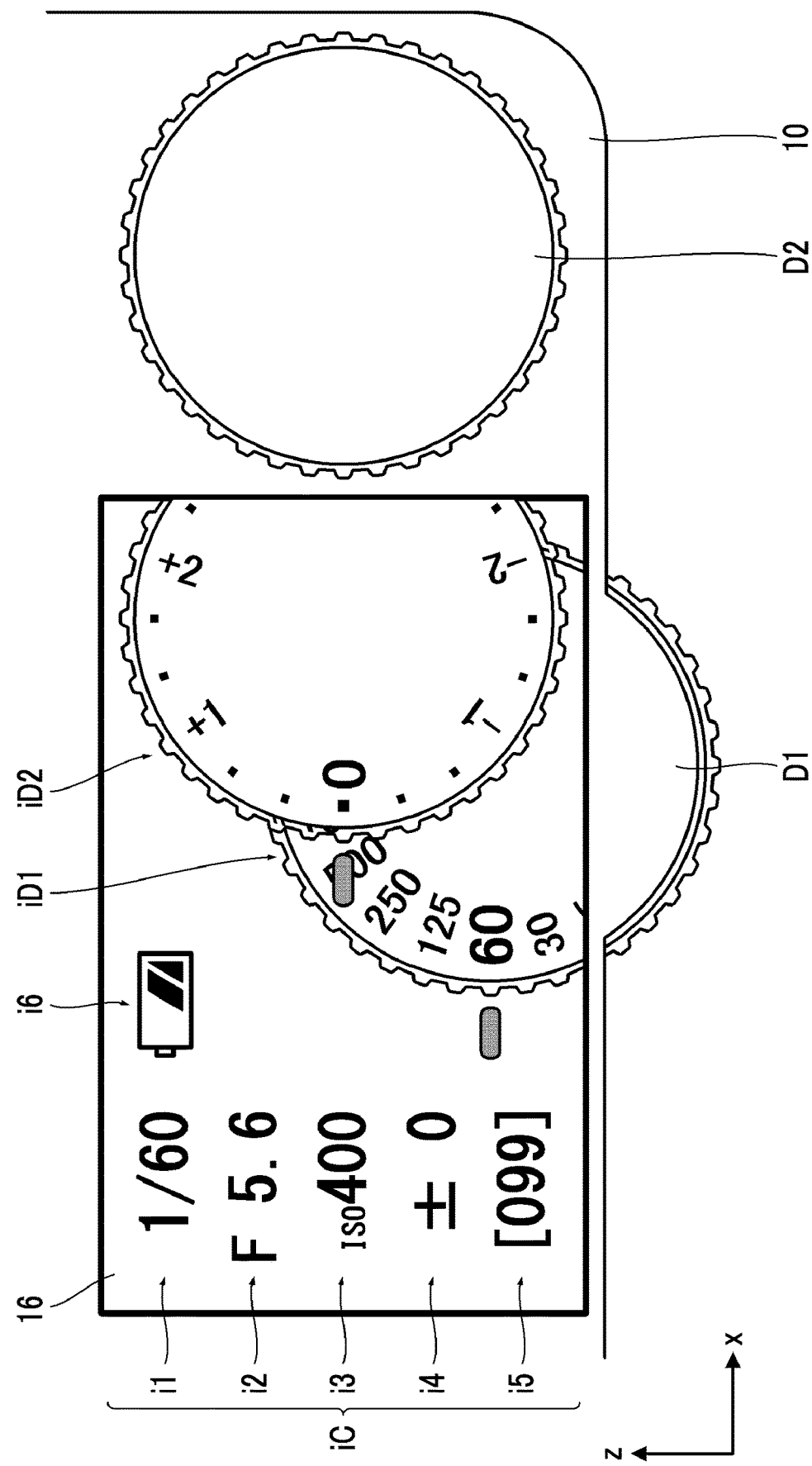
FIG. 10 is a plan view showing an example of the display on the sub-display.

FIGS. 9 and 10 are plan views showing examples of the display on the sub-display 16. FIG. 9 shows the display on the sub-display 16 in the case where the contact with the first operation dial D1 is detected. FIG. 10 shows the display on the sub-display in the case where the contact with the second operation dial D2 is detected. Further, FIGS. 9 and 10 show the examples in a case where the function of changing the setting of the shutter speed is assigned to the first operation dial D1 and the function of changing the setting of the exposure correction amount is assigned to the second operation dial D2.

The sub-display 16 displays image pictures iD1 and iD2 of the respective operation dials and current setting contents iC of the camera as shown in FIGS. 9 and 10.

<Image Picture of Operation Dial>

The image pictures iD1 and iD2 of the respective operation dials are formed of images obtained by imitating an actual operation dial in a plan view. Therefore, the image pictures iD1 and iD2 of the respective operation dials are formed of images having circular external shapes. Further, the sizes of the image pictures iD1 and iD2 of the respective operation dials are formed of substantially the same size as the actual operation dial.

Further, the image pictures iD1 and iD2 of the respective operation dials are formed of images in which dial plate portions of the image pictures iD1 and iD2 of the respective operation dials correspond to the items to be set by the respective operation dials. Therefore, in a case where the item to be set by the operation dial is changed, the image on the dial plate portion of the operation dial also changes. The dial plate portion refers to a portion of the inner side of a circle that defines the external shape. Hereinafter, a specific example of the image picture of the operation dial for each item will be described.

(1) Shutter Speed

Figure 11:
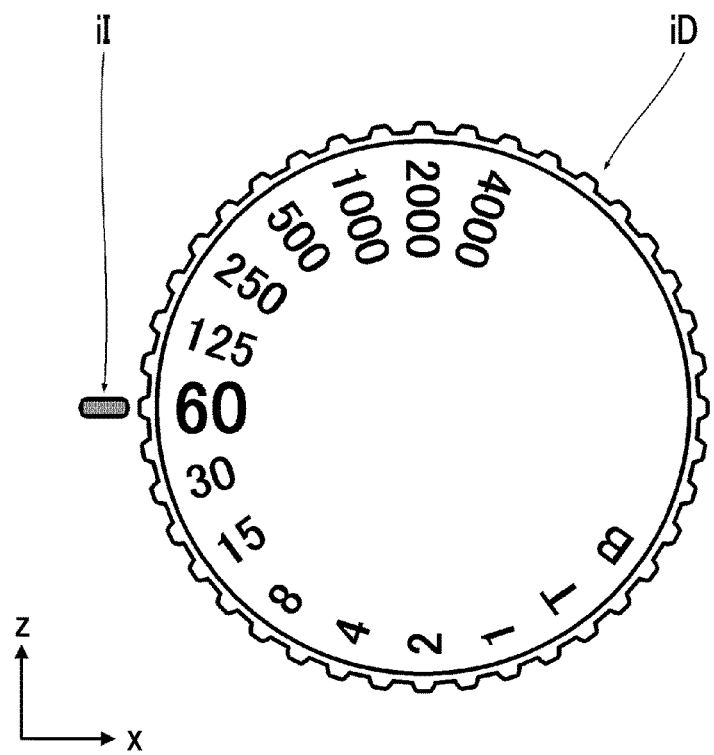
FIG. 11 is a diagram showing an example of an image picture in a case where an item to be set by the operation dial is a shutter speed.

FIG. 11 is a diagram showing an example of the image picture in a case where the item to be set by the operation dial is the shutter speed.

In the case where the item to be set by the operation dial is the shutter speed, an image picture iD of the operation dial is formed of an image obtained by imitating an actual shutter speed dial. That is, the image picture iD thereof is formed of an image in which selectable shutter speeds are displayed at regular intervals in the circumference direction on the dial plate portion.

In this case, an image picture iI of an indicator indicating the current setting value is also displayed. The image picture iI of the indicator is displayed at a position of nine o'clock. The case of the example shown in FIG. 11 indicates that a current shutter speed setting is 1/60.

The current setting value is displayed in a size larger than other selectable setting values. Accordingly, the current setting value can be viewed easily.

(2) F-Number

Figure 12:
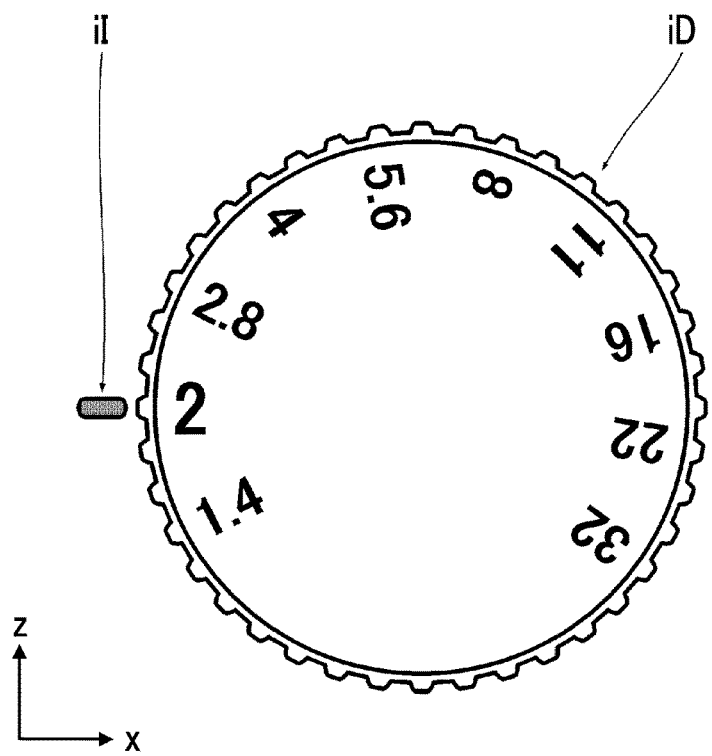
FIG. 12 is a diagram showing an example of the image picture in a case where the item to be set by the operation dial is an F-number.

FIG. 12 is a diagram showing an example of the image picture in a case where the item to be set by the operation dial is the F-number.

In the case where the item to be set by the operation dial is the F-number, the image picture iD of the operation dial is formed of an image obtained by imitating an actual aperture stop dial. That is, the image picture iD thereof is formed of an image in which selectable F-numbers are displayed at regular intervals in the circumference direction on the dial plate portion.

In this case, the image picture iI of the indicator indicating the current setting value is also displayed. The image picture iI of the indicator is displayed at the position of nine o'clock. The case of the example shown in FIG. 12 indicates that a current F-number setting is F2.

The current setting value is displayed in a size larger than other selectable setting values. Accordingly, the current setting value can be viewed easily.

(3) Exposure Correction

Figure 13:
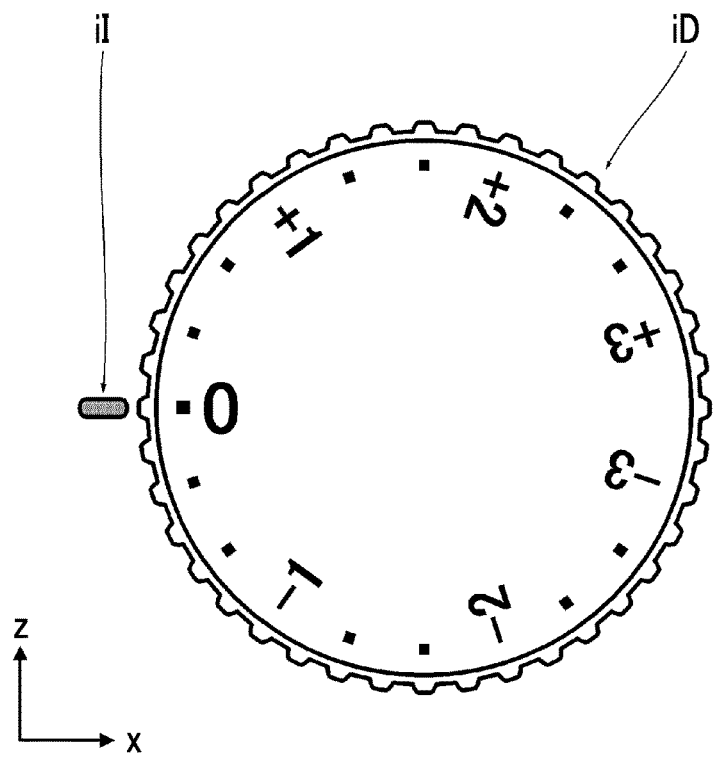
FIG. 13 is a diagram showing an example of the image picture in a case where the item to be set by the operation dial is an exposure correction amount.

FIG. 13 is a diagram showing an example of the image picture in a case where the item to be set by the operation dial is an exposure correction amount.

In the case where the item to be set by the operation dial is the exposure correction amount, the image picture iD of the operation dial is formed of an image obtained by imitating an actual exposure correction dial. That is, the image picture iD thereof is formed of an image in which selectable exposure correction amounts are displayed at regular intervals in the circumference direction on the dial plate portion.

In this case, the image picture iI of the indicator indicating the current setting value is also displayed. The image picture iI of the indicator is displayed at the position of nine o'clock. The case of the example shown in FIG. 13 indicates that a current exposure correction amount setting is ±0.

The current setting value is displayed in a size larger than other selectable setting values. Accordingly, the current setting value can be viewed easily.

(4) ISO Sensitivity

Figure 14:
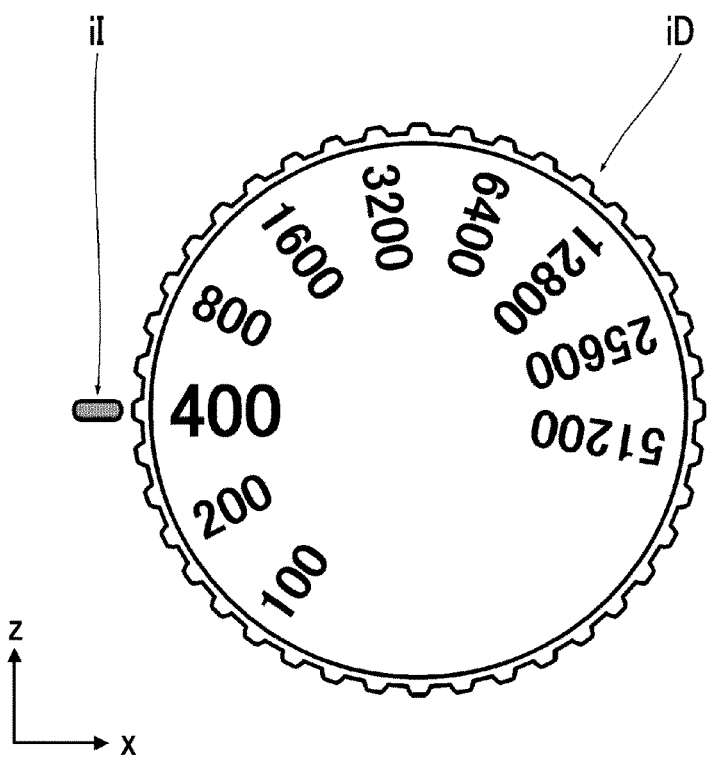
FIG. 14 is a diagram showing an example of the image picture in a case where the item to be set by the operation dial is ISO sensitivity.

FIG. 14 is a diagram showing an example of the image picture in a case where the item to be set by the operation dial is ISO sensitivity.

In the case where the item to be set by the operation dial is the international organization for standardization sensitivity (ISO), the image picture iD of the operation dial is formed of an image obtained by imitating an actual sensitivity dial. That is, the image picture iD thereof is formed of an image in which selectable pieces of ISO sensitivity are displayed at regular intervals in the circumference direction on the dial plate portion.

In this case, the image picture iI of the indicator indicating the current setting value is also displayed. The image picture iI of the indicator is displayed at the position of nine o'clock. The case of the example shown in FIG. 14 indicates that a current ISO sensitivity setting is ISO400.

The current setting value is displayed in a size larger than other selectable setting values. Accordingly, the current setting value can be viewed easily.

(5) Program Shift

Figure 15:
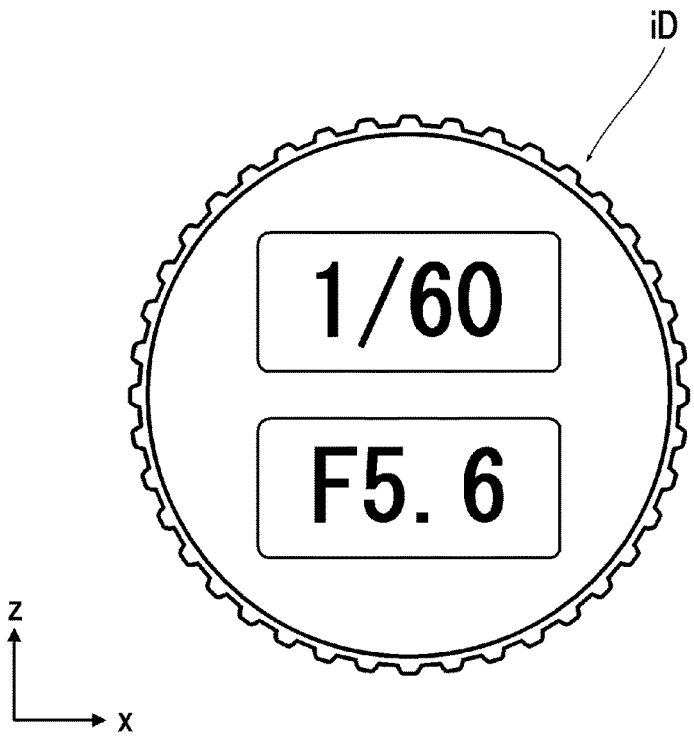
FIG. 15 is a diagram showing an example of the image picture in a case where the item to be set by the operation dial is a program shift.

FIG. 15 is a diagram showing an example of the image picture in a case where the item to be set by the operation dial is the program shift.

In the case where the item to be set by the operation dial is the program shift, the image picture iD of the operation dial is formed of an image in which the current shutter speed and F-number are displayed on the dial plate portion. The shutter speed and the F-number are displayed side by side in the front-rear direction (z direction) and are displayed within each frame. FIG. 15 shows an example in which the current shutter speed is 1/60 second and the current F-number is F5.6.

<Setting Contents of Camera>

In the digital camera 1 of the embodiment, currently set shutter speed information i1, currently set F-number information i2, currently set ISO sensitivity information i3, currently set exposure correction amount information i4, the current number of capturable images information i5, and current battery remaining amount information i6 are displayed as the setting contents iC of the camera.

The items to be displayed as the setting contents iC of the camera include at least pieces of information on items that may be set by the first operation dial D1 and the second operation dial D2. As described above, since the shutter speed, the F-number, and the exposure correction amount may be set by the first operation dial D1 and the second operation dial D2 in the digital camera 1 of the embodiment, the items to be displayed as the setting contents iC of the camera include the shutter speed information, the F-number information, and the exposure correction amount information.

<Layout>

(1) Disposition of Image Picture of Operation Dial

The image pictures iD1 and iD2 of the respective operation dials are displayed from edges in the vicinity of the respective operation dials. That is, the image pictures iD1 and iD2 of the respective operation dials are displayed so as to overhang from the edges to display regions of the sub-display 16 in a state where parts of the image pictures iD1 and iD2 are hidden outside the frame. The edges in the vicinity refer to edges (sides) closest to the actual operation dial. In this manner, it is possible to clarify a relationship between the actual operation dial and the image picture to be displayed on the sub-display 16 by displaying the image pictures iD1 and iD2 of the respective operation dials from the edges in the vicinity of the respective operation dials.

(a) First Operation Dial

As described above, an actual first operation dial D1 is disposed on the rear side of the sub-display 16. Therefore, the image picture iD1 of the first operation dial D1 is displayed from the edge on the rear side of the sub-display 16 as shown in FIG. 9. That is, the image picture iD1 thereof is displayed so as to overhang from the edge on the rear side of the sub-display 16 to the display region of the sub-display 16 in the state where the part of the image picture iD1 thereof is hidden outside the frame.

Further, the image picture iD1 of the first operation dial D1 is displayed coaxially with the actual first operation dial D1. Accordingly, the image picture iD1 to be displayed on the sub-display 16 is an image having an arc-like external shape obtained by extending the part of the outer periphery of the first operation dial D1 exposed from the camera body 10. This image is an image displaying a hidden portion of the first operation dial D1. Accordingly, it can be displayed as if the first operation dial D1 is provided on the top surface of the camera body 10.

(b) Second Operation Dial

An actual second operation dial D2 is disposed adjacent to the right of the sub-display 16. Therefore, the image picture iD2 of the second operation dial D2 is displayed from the edge on the right side of the sub-display 16 as shown in FIG. 10. That is, the image picture iD2 thereof is displayed so as to overhang from the edge on the right side of the sub-display 16 to the display region of the sub-display 16 in the state where the part of the image picture iD2 thereof is hidden outside the frame. An amount to be displayed in an overhanging manner is approximately ⅔ of the entire image picture iD2.

A position where the image picture iD2 of the second operation dial D2 is displayed is on a straight line passing through the rotation axis of the actual second operation dial D2 and orthogonal to the edge (side) on the right side of the sub-display 16. That is, the image picture iD2 of the second operation dial D2 is displayed at a position where the actual second operation dial D2 is slid to the left direction as shown in FIG. 10.

The image pictures iD1 and iD2 of the first operation dial D1 and the second operation dial D2 displayed as described above are displayed at mutually overlapping positions as shown in FIGS. 9 and 10. An overlapping order is controlled based on the detection result of the contact. That is, the image picture to be displayed on the front surface is controlled based on the detection result of the contact. This point will be described below.

(2) Disposition of Display of Setting Contents of Camera

The setting contents iC of the camera are displayed in a margin region in a case where the image pictures iD1 and iD2 of the first operation dial D1 and the second operation dial D2 are displayed.

In the digital camera 1 of the embodiment, the margin region is generated on the left side of a screen of the sub-display 16 as shown in FIGS. 9 and 10. Therefore, in the digital camera 1 of the embodiment, the setting contents iC of the camera are displayed on the region on the left side of the screen thereof.

Each item of the setting contents iC of the camera is displayed at a predetermined position. In the examples shown in FIGS. 9 and 10, the shutter speed information i1, the F-number information i2, the ISO sensitivity information i3, the exposure correction amount information i4, and the number of capturable images information i5 are displayed in a row, and the battery remaining amount information i6 is independently displayed.

«the Display Control of the Sub-Display»

<Switching Overlapping of Image Picture>

As described above, the image picture iD1 of the first operation dial D1 and the image picture iD2 of the second operation dial D2 are displayed at the mutually overlapping positions. The image picture to be displayed on a forefront surface is determined based on the detection result of the contact of the finger with the actual operation dials D1 and D2.

Specifically, the image picture of the operation dial on which the contact of the finger is detected is displayed on the forefront surface. Therefore, in a case where the contact of the finger with the first operation dial D1 is detected, the image picture iD1 of the first operation dial D1 is displayed on the forefront surface. Further, in a case where the contact of the finger with the second operation dial D2 is detected, the image picture iD2 of the second operation dial D2 is displayed on the forefront surface.

Therefore, the image picture of the operation dial on which the contact is detected at the last is always displayed on the forefront surface. Therefore, for example, in a case where the second operation dial D2 is touched and then the first operation dial D1 is touched, the image picture iD1 of the first operation dial D1 is displayed on the forefront surface. Further, in a case where the first operation dial D1 is touched and then the first operation dial D1 is touched again, the image picture iD1 of the first operation dial D1 is displayed on the forefront surface.

The sub-display display control unit 114 controls the displays of two image pictures iD1 and iD2 based on outputs of the first operation dial touch sensor D1b provided in the first operation dial D1 and the second operation dial touch sensor D2b provided in the second operation dial D2. That is, the sub-display display control unit 114 controls the displays of the image pictures iD1 and iD2 of the respective operation dials such that the image picture of the operation dial on which the contact is detected at the last is always displayed on the forefront surface. Hereinafter, a procedure of this processing (display control method) will be described.

Figure 16:
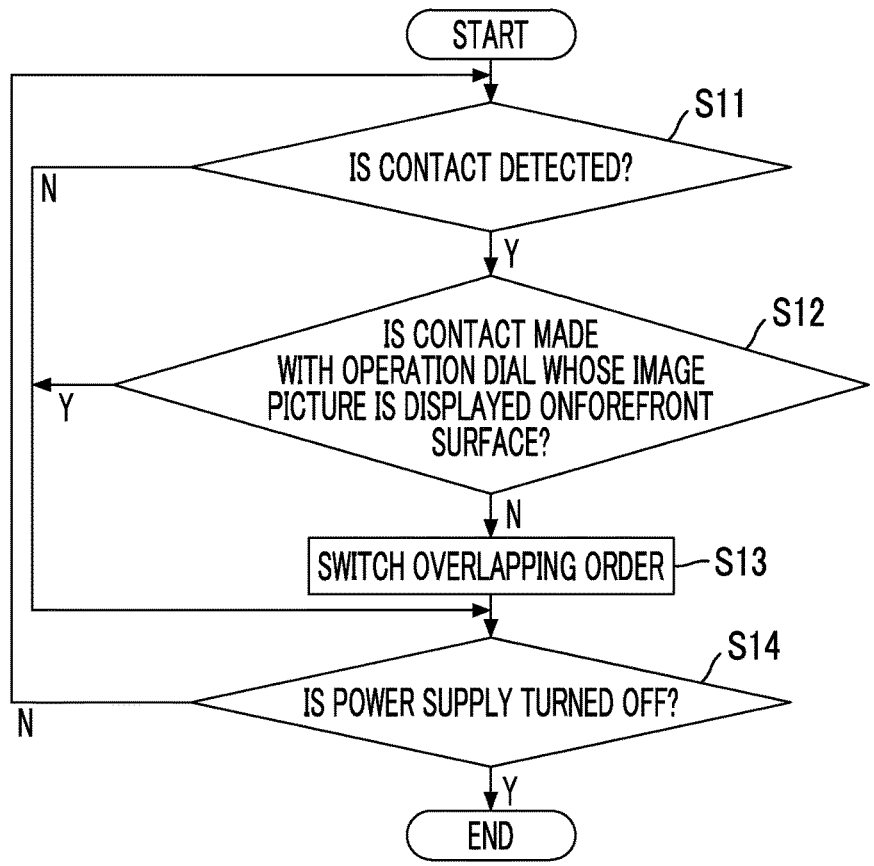
FIG. 16 is a flowchart showing a processing procedure of switching overlapping of the image picture of the operation dial.

FIG. 16 is a flowchart showing a processing procedure of switching overlapping of the image picture of the operation dial.

The sub-display display control unit 114 determines the presence or absence of the contact of the finger with the first operation dial D1 and the second operation dial D2 based on the outputs of the first operation dial touch sensor D1*b* provided in the first operation dial D1 and the second operation dial touch sensor D2*b* provided in the second operation dial D2 (step S11).

In a case where it is determined that the contact is detected, it is determined whether the contact is made with the operation dial whose image picture is displayed on the forefront surface at the present time (step S12). For example, in a case where the image picture iD1 of the first operation dial D1 is displayed on the forefront surface at the present time, it is determined whether the contact is made with the first operation dial D1. Similarly, in a case where the image picture iD2 of the second operation dial D2 is displayed on the forefront surface at the present time, it is determined whether the contact is made with the second operation dial D2.

In a case where it is determined that the contact is made with the operation dial whose image picture is displayed on the forefront surface at the present time, the switching processing is not performed and the processing proceeds to step S14. That is, it is determined whether the power supply of the digital camera 1 is turned off (step S14). In a case where it is determined that the power supply thereof is not turned off, the processing returns to step S11 to determine the presence or absence of the detection of the contact again (step S11).

On the other hand, in a case where it is determined that the contact is not made with the operation dial whose image picture is displayed on the forefront surface at the present time, the sub-display display control unit 114 executes the processing of switching the overlapping (step S13). That is, the sub-display display control unit 114 switches the front and back of the overlapping. For example, in the case where the contact of the finger with the first operation dial D1 is detected in the case where the image picture iD2 of the second operation dial D2 is displayed on the forefront surface as shown in FIG. 10, the display is switched such that the image picture iD1 of the first operation dial D1 is displayed on the forefront surface as shown in FIG. 9. Similarly, in the case where the contact of the finger with the second operation dial D2 is detected in the case where the image picture iD1 of the first operation dial D1 is displayed on the forefront surface as shown in FIG. 9, the display is switched such that the image picture iD2 of the second operation dial D2 is displayed on the forefront surface as shown in FIG. 10.

In this manner, the overlapping order is controlled based on the detection result of the contact of the finger with the actual operation dial. The display is controlled such that the image picture of the operation dial on which the contact is detected is always displayed on a front surface.

<Rotation of Image Picture>

The image pictures iD1 and iD2 of the first operation dial D1 and the second operation dial D2 are respectively rotated in conjunction with the rotations of the actual first operation dial D1 and the second operation dial D2.

The sub-display display control unit 114 controls the displays of two image pictures iD1 and iD2 based on outputs of the first operation dial operation detection unit D1*a* provided in the first operation dial D1 and the second operation dial operation detection unit D2*a* provided in the second operation dial D2. That is, the image picture of each of the operation dials is rotated in conjunction with the rotation of each operation dial.

《Action of Operation System by Using First Operation Dial and Second Operation Dial》

The functions assigned to the first operation dial D1 and the second operation dial D2 are automatically switched according to the state of the digital camera 1. The image pictures of the operation dials that are formed of the images corresponding to the assigned functions are displayed on the sub-display 16.

For example, in a case where the digital camera 1 is set to the imaging mode and the shutter speed priority mode is selected, the function of setting the shutter speed is assigned to the first operation dial D1 and the function of setting the exposure correction amount is assigned to the second operation dial D2.

In this case, in the case where the first operation dial D1 is touched, the image picture iD1 of the first operation dial D1 is displayed on the forefront surface as shown in FIG. 9. Furthermore, in the case where the rotation operation of the first operation dial D1 is performed, the image picture iD1 of the first operation dial D1 is rotated in conjunction with the rotation thereof. Accordingly, it is possible to set the shutter speed by using the first operation dial D1 while the sub-display 16 is viewed. Further, at this time, it is possible for the user to set the shutter speed as if the shutter speed dial is provided on the top surface.

Further, in the case where the second operation dial D2 is touched, the image picture iD2 of the second operation dial D2 is displayed on the forefront surface as shown in FIG. 10. Furthermore, in the case where the rotation operation of the second operation dial D2 is performed, the image picture iD2 of the second operation dial D2 is rotated in conjunction with the rotation thereof. Accordingly, it is possible to set the exposure correction amount by using the second operation dial D2 while the sub-display 16 is viewed.

In this manner, in the digital camera 1 of the embodiment, the image picture of each of the operation dials is displayed on the sub-display 16. Accordingly, it is possible to perform various settings with the same operation feeling as in a case where the operation dial is actually provided on the top surface.

Further, since the image picture of each of the operation dials is displayed in an overlapped manner, it is possible to ensure sufficient visibility even though a size of the sub-display 16 is small. Accordingly, it is possible to provide good operability.

Furthermore, since the overlapping order can be controlled in conjunction with the contact of the finger with the actual operation dial, it is possible to appropriately display information desired by the user. Accordingly, it is possible to provide good operability.

Modification Example

《Modification Example of Display of Setting Contents of Camera》

In the above embodiment, the pieces of information on the shutter speed, the F-number, the ISO sensitivity, the exposure correction amount, the number of capturable images, and the battery remaining amount are displayed as the setting contents of the camera. However, the item to be displayed as the setting contents of the camera are not limited to the above. In addition, for example, flash setting information, flash dimming correction amount information, macro mode setting information, consecutive imaging mode setting information, white balance setting information, AF mode setting information, image size setting information, image quality setting information, camera shake correction setting information, and the like may be displayed as the setting contents of the camera.

As described above, it is preferable that the item to be displayed as the setting contents of the camera includes the pieces of information on the items that may be set by the first operation dial D1 and the second operation dial D2. Accordingly, it is possible to confirm the current setting value from the display of the setting contents iC of the camera even in a case where the image picture is hidden underneath and thus to provide better operability.

Further, the item to be set by the operation dial whose image picture is displayed on the forefront surface may be excluded from the item to be displayed as the setting contents iC of the camera.

Figure 17:
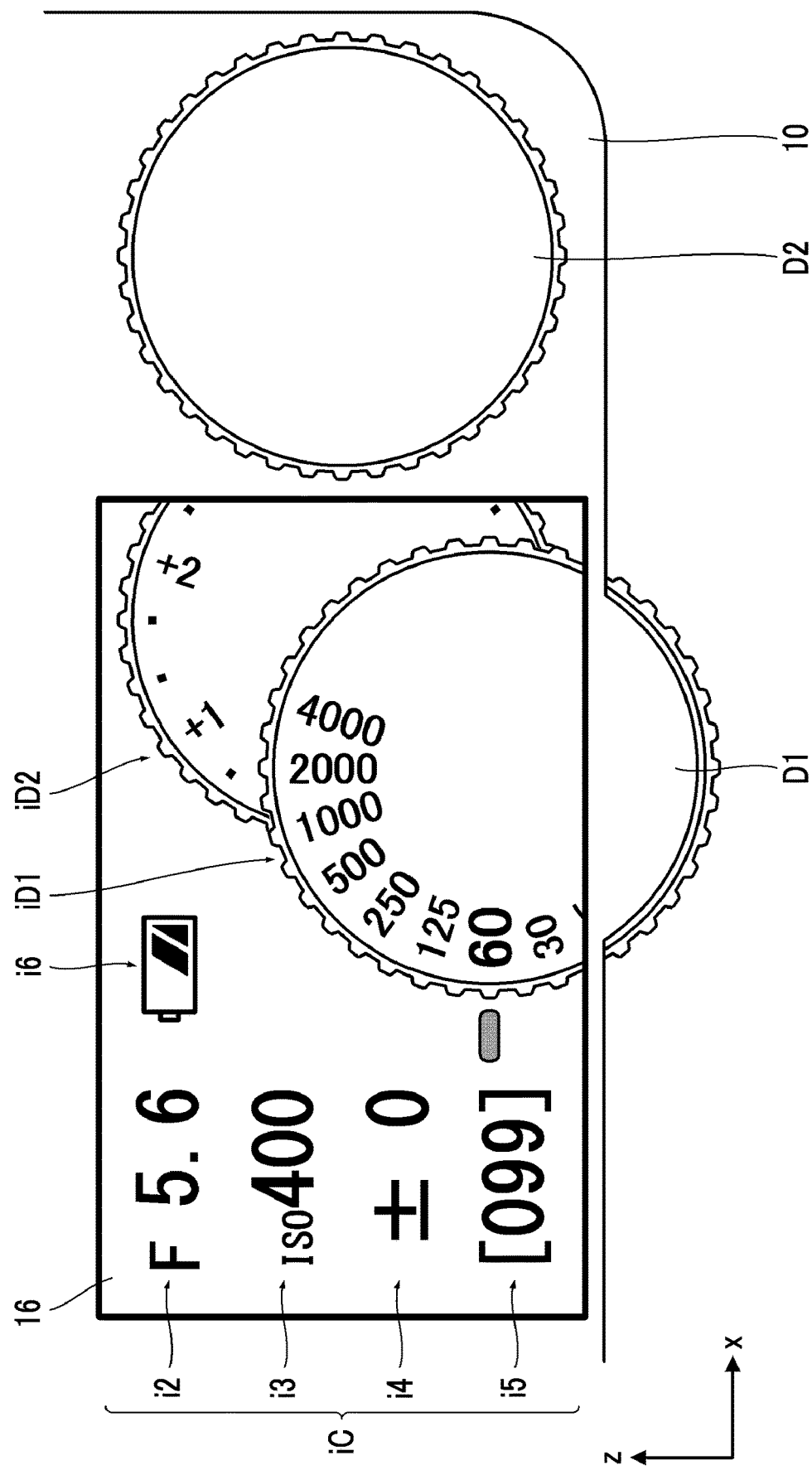
FIG. 17 is a plan view showing an example of the display on the sub-display in a case where a part of setting contents of the camera is not displayed.
Figure 18:
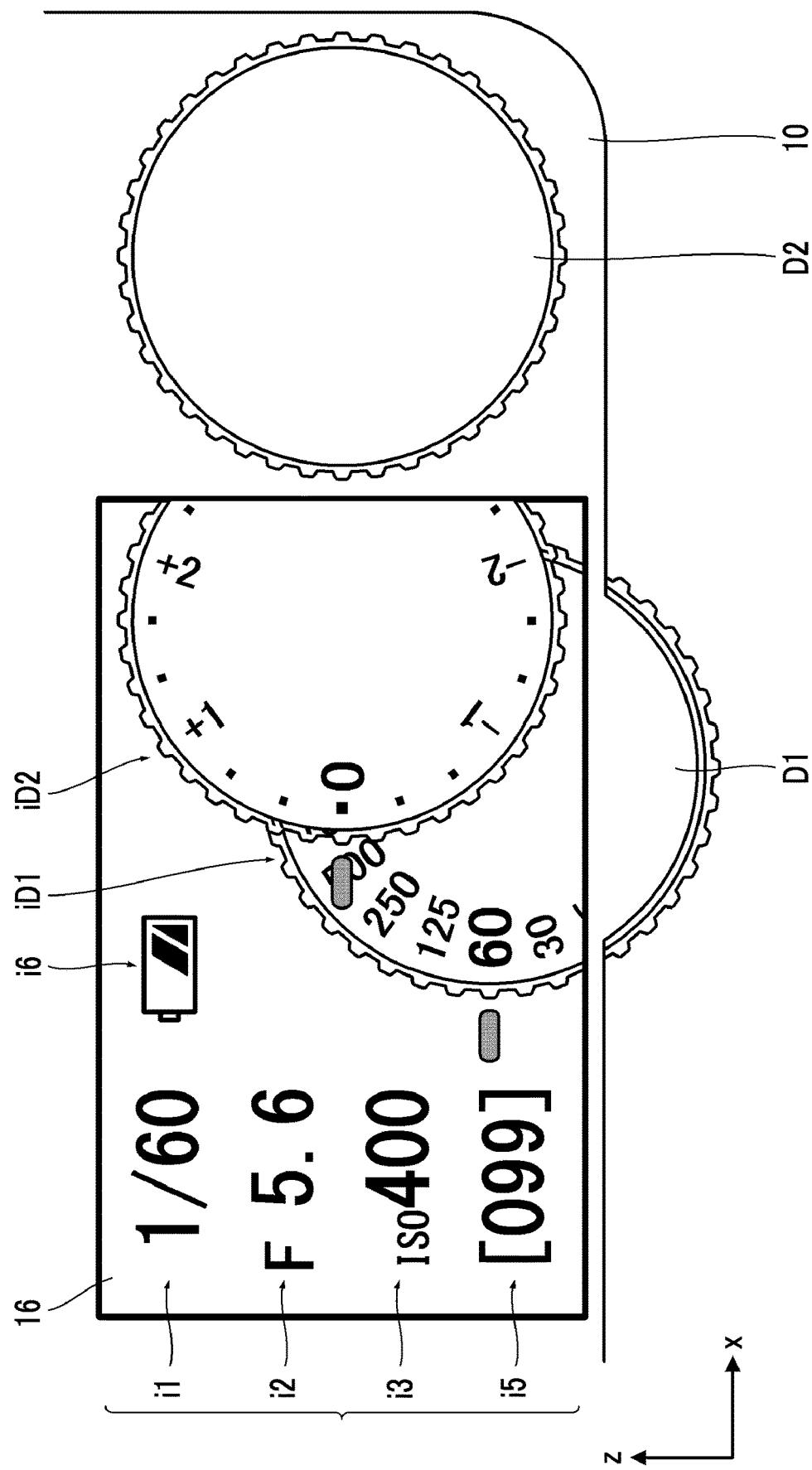
FIG. 18 is a plan view showing an example of the display on the sub-display in the case where a part of setting contents of the camera is not displayed.

FIGS. 17 and 18 are plan views showing examples of the display on the sub-display in a case where a part of setting contents of the camera is not displayed.

FIGS. 17 and 18 show examples in the case where the item to be changed in the setting by the first operation dial D1 is the shutter speed and the item to be changed in the setting by the second operation dial D2 is the exposure correction amount.

FIG. 17 shows the example in the case where the image picture iD1 of the first operation dial D1 is displayed on the forefront surface. Further, FIG. 18 shows the example in the case where the image picture iD2 of the second operation dial D2 is displayed on the forefront surface.

In the case where the image picture iD1 of the first operation dial D1 is displayed on the forefront surface, the shutter speed information is excluded from the item to be displayed as the setting contents of the camera as shown in FIG. 17. In this case, the currently set F-number information i2, the currently set ISO sensitivity information i3, the currently set exposure correction amount information i4, the current number of capturable images information i5, and the current battery remaining amount information i6 are displayed as the setting contents iC of the camera.

On the other hand, in the case where the image picture iD2 of the second operation dial D2 is displayed on the forefront surface, the exposure correction amount information is excluded from the item to be displayed as the setting contents of the camera as shown in FIG. 18. In this case, the currently set shutter speed information i1, the F-number information i2, the currently set ISO sensitivity information i3, the current number of capturable images information i5, and the current battery remaining amount information i6 are displayed as the setting contents iC of the camera.

In this manner, it is possible to eliminate a redundant display by excluding the information on the item to be set by the operation dial whose image picture is displayed on the forefront surface from the item to be displayed as the setting contents iC of the camera. Accordingly, the information on the item to be displayed as the setting contents iC of the camera may be displayed in a large size or the number of items to be displayed as the setting contents iC of the camera may be increased.

It is preferable that the setting value of the operation dial other than the operation dial whose image picture is displayed on the forefront surface is always displayed in the margin region as one item of the setting contents iC of the camera. Accordingly, it is possible to confirm the setting value of the item to be set by the operation dial even in the case where the image picture is hidden underneath.

«Modification Example of Image Picture of Operation Dial»

The image forming the image picture of the operation dial may be an image having an external shape that can be recognized at least as a dial, and an image in which the assigned function, that is, the item to be changed in the setting in the case where the operation is performed can be recognized. Therefore, the image may have a circular or arc-like external shape, and information that can recognize the assigned function may be added inside the image, that is, on the dial plate portion.

<Case of Displaying Assigned Function>

Figure 19:
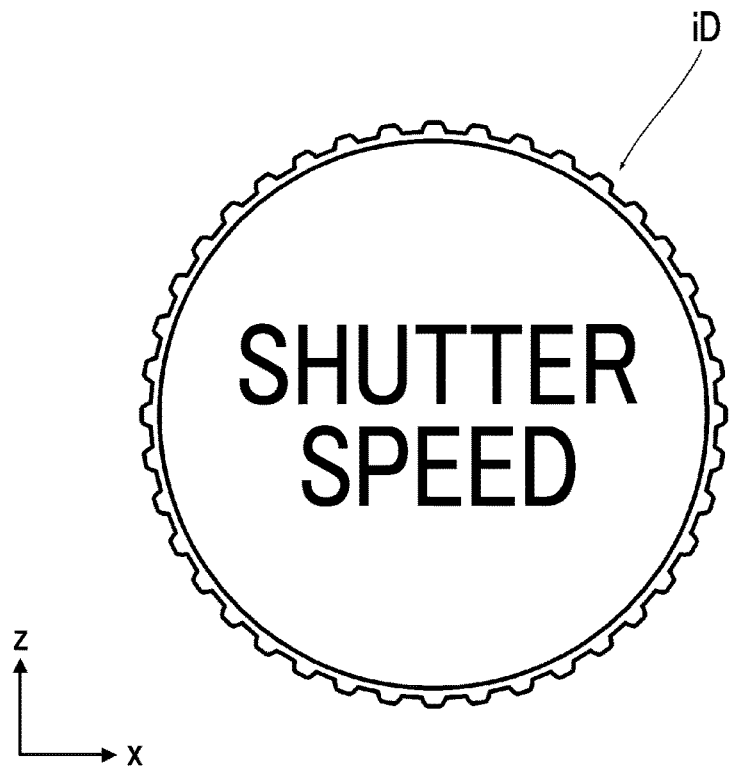
FIG. 19 is a diagram showing another example of the image picture of the operation dial.

FIG. 19 is a diagram showing another example of the image picture of the operation dial. FIG. 19 shows another example of the image picture in the case where the item to be set by the operation dial is the shutter speed.

In the example shown in FIG. 19, the image picture iD of the operation dial is formed of a figure in which a character of "SHUTTER SPEED" is displayed inside the image obtained by imitating the external shape of the dial (dial plate portion).

"IRIS" is displayed in a case where the item to be changed in the setting by the operation dial is the F-number, "ISO" is displayed in a case of the ISO sensitivity, and "EXPOSURE COMPENSATION" is displayed in a case of the exposure correction amount.

<Case of Displaying Current Setting Value of Assigned Function>

Figure 20:
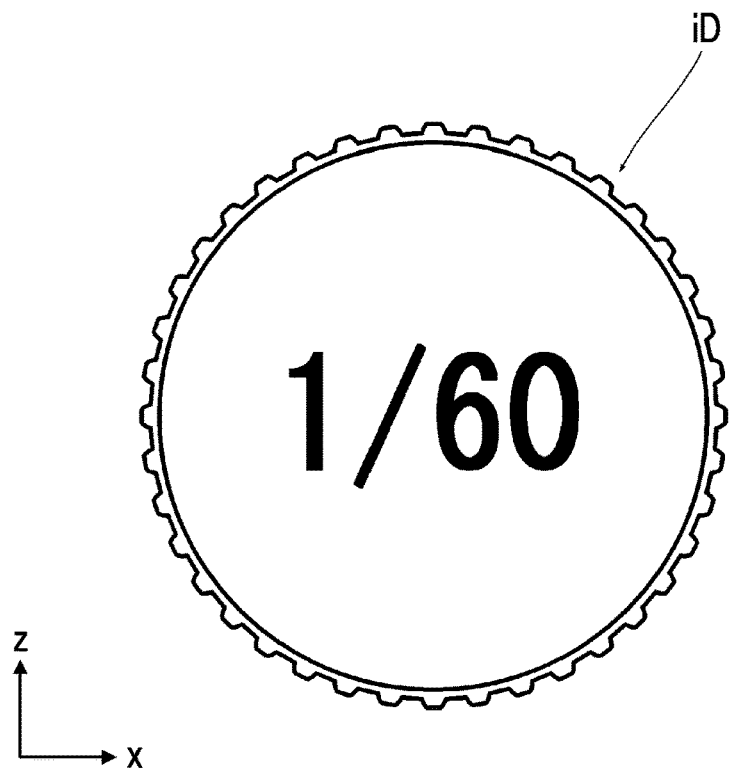
FIG. 20 is a diagram showing another example of the image picture of the operation dial.

FIG. 20 is a diagram showing another example of the image picture of the operation dial. FIG. 20 shows another example of the image picture in the case where the item to be set by the operation dial is the shutter speed.

In the example shown in FIG. 20, the image picture iD of the operation dial is formed of an image in which the current setting value of the item to be changed in the setting in the case where the operation dial is operated is displayed inside the image obtained by imitating the external shape of the dial (dial plate portion). The example shown in FIG. 20 is an example in the case where the current shutter speed is 1/60 second.

The currently set F-number (F5.6 or the like) is displayed in the case where the item to be changed in the setting by the operation dial is the F-number, the currently set ISO sensitivity (ISO400 or the like) is displayed in the case of the ISO sensitivity, and the currently set exposure correction amount (±0 or the like) is displayed in the case of the exposure correction amount.

Figure 21:
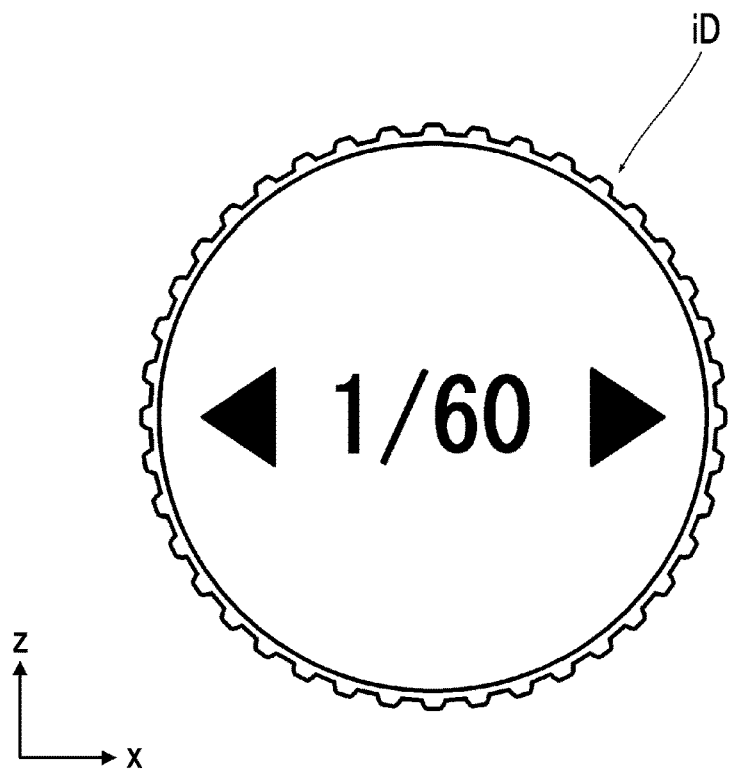
FIG. 21 is a diagram showing another example of the image picture of the operation dial.

FIG. 21 is a diagram showing another example of the image picture of the operation dial. In particular, FIG. 21 shows an example of the image picture in the case where the operation dial is touched. FIG. 21 shows an example in the case where the item to be set by the operation dial is the shutter speed.

As shown in FIG. 21, in a case where the finger touches the actual operation dial, the image may be changed to a form that can grasp from the image that the setting can be changed by operating the operation dial. In the example shown in FIG. 21, triangular figures are displayed on both sides of the current setting value in order to indicate that the shutter speed can be changed in the setting by operating the first operation dial D1.

A display form of the image picture may be changed in a case where the operation dial is rotationally operated.

<Case of Displaying Assigned Function and Current Setting Value of Function>

Figure 22:
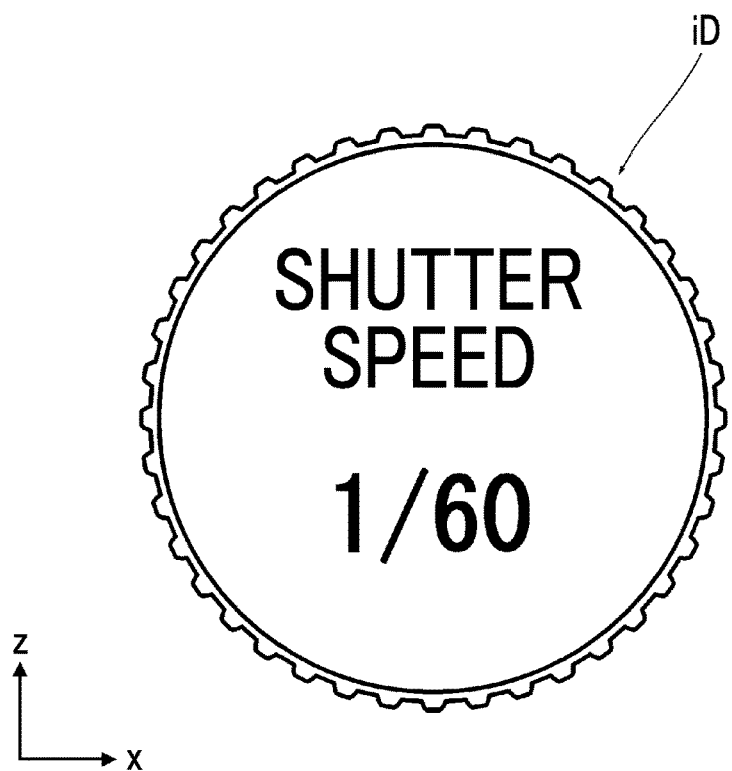
FIG. 22 is a diagram showing another example of the image picture of the operation dial.

FIG. 22 is a diagram showing another example of the image picture of the operation dial. FIG. 22 shows another example of the image picture in the case where the item to be set by the operation dial is the shutter speed.

In the example shown in FIG. 22, the image picture iD of the operation dial is formed of a figure in which a character of "SHUTTER SPEED" and the current setting value are displayed inside the image obtained by imitating the external shape of the dial (dial plate portion).

In the case where the item to be changed in the setting by the operation dial is the F-number, the character of "IRIS" and the current setting value of the F-number are displayed. Further, in the case where the item to be changed in the setting by the operation dial is the ISO sensitivity, the character of "ISO" and the current setting value of the ISO sensitivity are displayed. Further, in the case where the item to be changed in the setting by the operation dial is the exposure correction amount, the character of "EXPOSURE COMPENSATION" and the current exposure correction amount are displayed.

<Case of Displaying Settable Setting Values by Operation Dial Side by Side on Dial Plate Portion>

Figure 23:
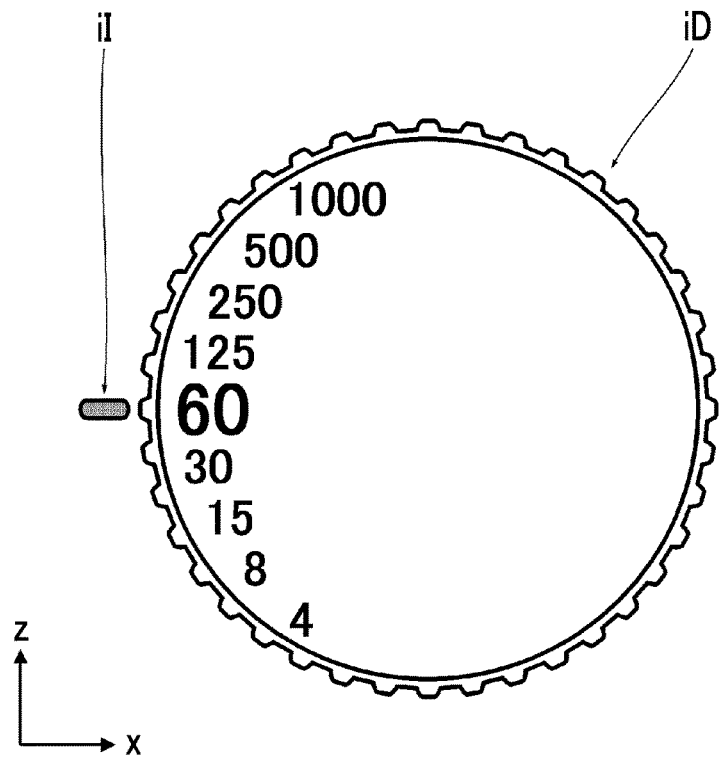
FIG. 23 is a diagram showing another example of the image picture of the operation dial.
Figure 24:
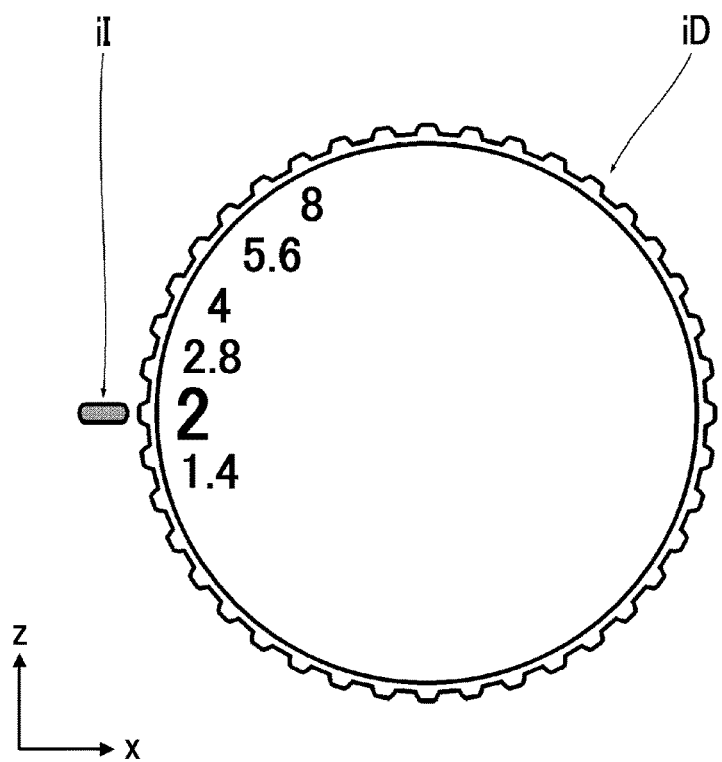
FIG. 24 is a diagram showing another example of the image picture of the operation dial.
Figure 25:
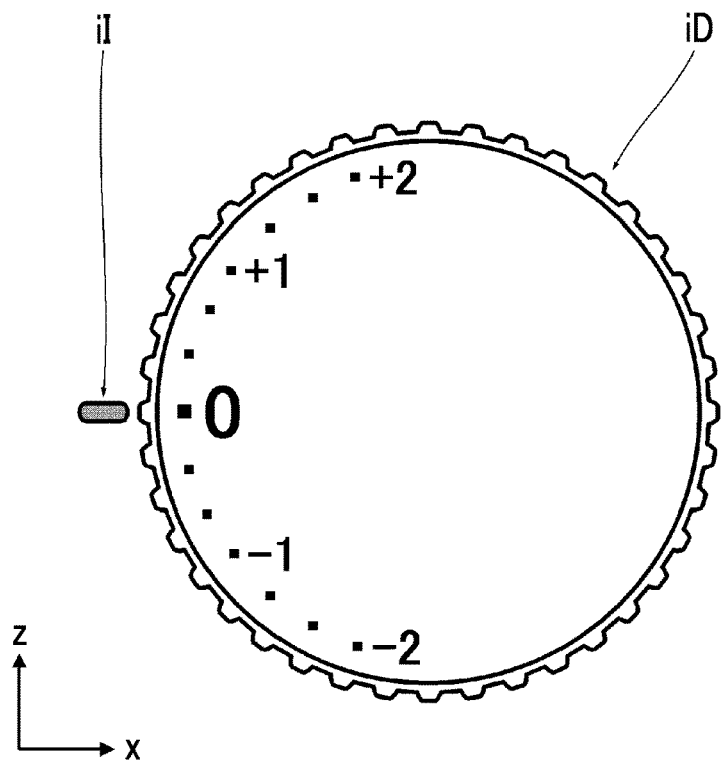
FIG. 25 is a diagram showing another example of the image picture of the operation dial.

FIGS. 23 to 26 are diagrams respectively showing another example of the image picture of the operation dial. FIGS. 23 to 26 respectively show examples in a case where the setting values settable by the operation dial are displayed side by side on the dial plate portion. In particular, FIGS. 23 to 25 show examples in a case where the setting values settable by the operation dial are displayed side by side along an arc that defines the external shape of the image picture.

FIG. 23 shows an example in the case where the item to be set by the operation dial is the shutter speed. In particular, FIG. 23 shows an example in a case where the settable shutter speeds are displayed side by side at regular intervals along the arc that defines the external shape of the image picture. In the example, the numerical values indicating the shutter speed are displayed without being inclined different from the example shown in FIG. 11. There is a case where it is easy to view the numerical values by displaying the values without being inclined in this manner depending on the layout to be displayed on the sub-display 16. Therefore, in such case, the numerical values are displayed without being inclined as in this example.

FIG. 24 shows an example in the case where the item to be set by the operation dial is the F-number. In particular, FIG. 24 shows an example in a case where the settable F-numbers are displayed side by side at regular intervals along the arc that defines the external shape of the image picture. In the example, the numerical values indicating the F-number are also displayed without being inclined.

FIG. 25 shows an example in the case where the item to be set by the operation dial is the exposure correction amount. In particular, FIG. 25 shows an example in a case where the settable exposure correction amounts are displayed side by side at regular intervals along the arc that defines the external shape of the image picture. In the example, the numerical values indicating the exposure correction amount are also displayed without being inclined.

Figure 26:
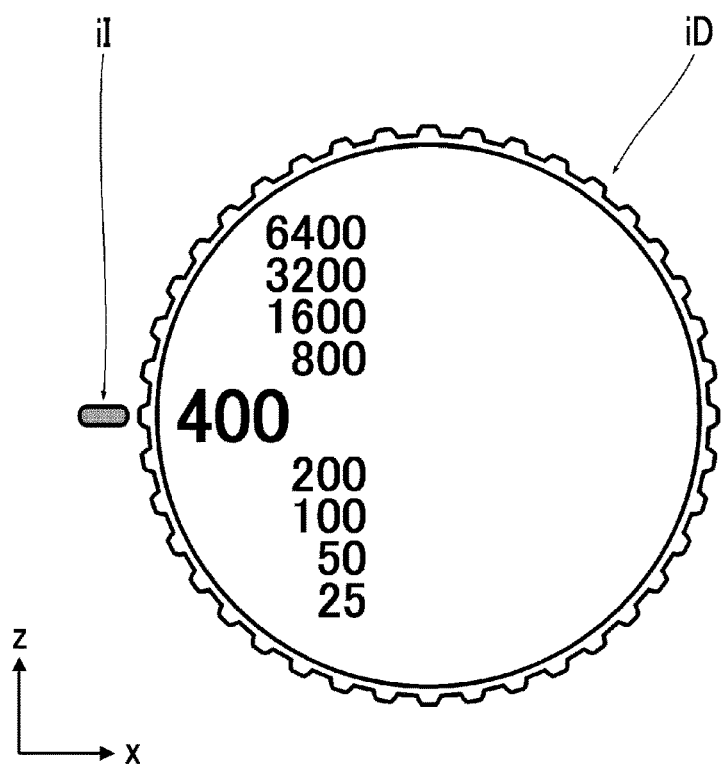
FIG. 26 is a diagram showing another example of the image picture of the operation dial.

FIG. 26 shows an example in the case where the item to be set by the operation dial is the ISO sensitivity. In particular, FIG. 26 shows an example in a case where the settable pieces of ISO sensitivity are displayed side by side in a row. There is a case where it is easy to view the setting values by displaying the values in this manner depending on the layout to be displayed on the sub-display 16. Therefore, in such case, the settable setting values are displayed side by side in a row as in this example.

In this manner, in the case where the setting values settable by the operation dial are displayed on the dial plate portion, various forms can be employed as the display form of the setting values. It is possible to display the settable setting values in an easily visible manner by displaying the setting values settable by the operation dial side by side on the dial plate portion.

In the case where the setting values settable by the operation dial are displayed on the dial plate portion of the image picture, it is not necessary to display all the settable setting values. Only numerical values in a certain range before and after the currently set setting value may be displayed.

Further, the image picture of the indicator is also displayed in the example, but the image picture of the indicator is not necessary in a case where the current setting value is displayed in a recognizable form on the dial plate. For example, in a case where the current setting value is displayed surrounded by a frame or the like on the dial plate, the current setting value can be recognized on the dial plate. Therefore, the display of the image picture of the indicator is not necessary.

Second Embodiment

In a digital camera of an embodiment, the display form of the image picture of the operation dial to be displayed on the sub-display 16 is switched between the case where the operation dial is touched and the case where the operation dial is not touched. In other words, the image picture of the operation dial to be displayed on the sub-display 16 differs between during operation and during waiting of the operation.

Only the display on the sub-display 16 is different from the digital camera of the first embodiment. Therefore, only the display on the sub-display 16 will be described herein.

In the following description, an example in the case where the function of setting the shutter speed is assigned to the first operation dial D1 and the function of setting the exposure correction amount is assigned to the second operation dial D2 will be described.

«Display on Sub-Display»

<Case where First Operation Dial is Touched>

Figure 27:
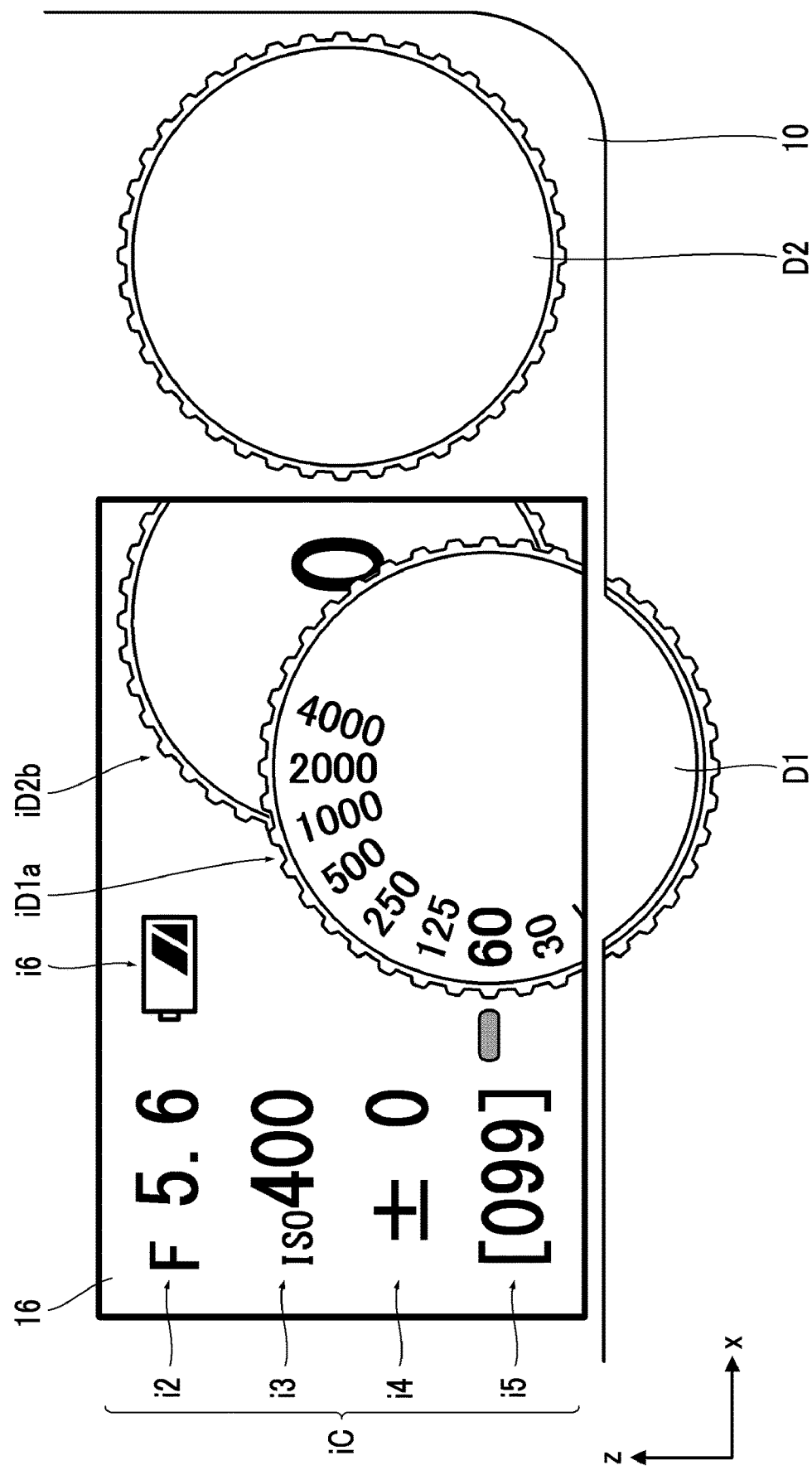
FIG. 27 is a plan view showing the display on the sub-display in a case where the first operation dial is touched.

FIG. 27 is a plan view showing the display on the sub-display in a case where the first operation dial is touched.

As shown in FIG. 27, in the case where the first operation dial D1 is touched, that is, in the case where the contact with the first operation dial D1 is detected, the image picture iD1a of the first operation dial D1 is displayed on the forefront surface.

In this case, the image picture iD1a of the first operation dial D1 is formed of an image obtained by imitating the actual shutter speed dial. That is, the image picture iD1a thereof is formed of an image in which selectable shutter speeds are displayed at regular intervals in the circumference direction on the dial plate portion. Accordingly, it is possible for the user to grasp that the shutter speed can be changed by operating the first operation dial D1. Further, it is also possible for the user to grasp a settable range of the shutter speed.

In the example shown in FIG. 27, the shutter speed information is excluded from the information to be displayed as the setting contents iC of the camera. Since the setting of the current shutter speed can be confirmed from the image picture of the first operation dial D1, the shutter speed information is excluded from the information to be displayed as the setting contents iC of the camera.

On the other hand, the current exposure correction amount is displayed in the margin region as one item of the setting contents iC of the camera. Accordingly, it is possible to confirm the setting value of the current exposure correction amount even in a case where the image picture iD2b of the second operation dial D2 is hidden.

The display shown in FIG. 27 is maintained as long as the finger continues to touch the first operation dial D1. That is, the display is maintained as long as the contact of the finger with the first operation dial D1 continues to be detected.

<Case where Finger Touches First Operation Dial and then Finger is Released>

Figure 28:
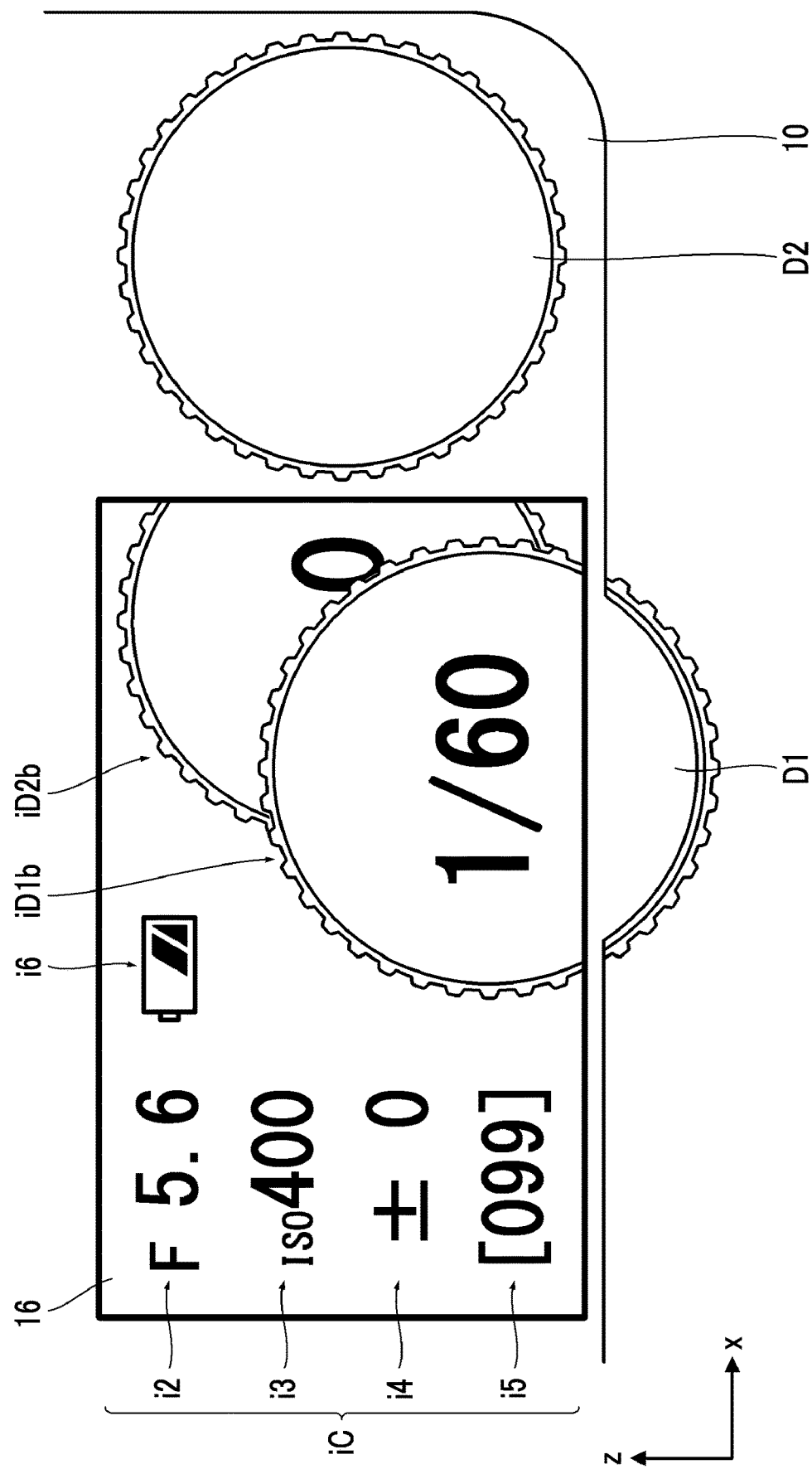
FIG. 28 is a plan view showing the display on the sub-display in a case where a finger touches the first operation dial and then the finger is released.

FIG. 28 is a plan view showing the display on the sub-display in a case where the finger touches the first operation dial and then the finger is released.

As shown in FIG. 28, even in the case where the finger touches the first operation dial D1 and then the finger is released, the image picture iD1b of the first operation dial D1 continues to be displayed on the forefront surface. The image picture of the operation dial touched by the finger at the last is displayed on the forefront surface on the sub-display 16.

However, in the case where the finger is released, that is, in a case where the contact of the finger is no longer detected, the display form of the image picture is switched. In this example, the currently set shutter speed is displayed on the dial plate portion in a large size as shown in FIG. 28.

In this manner, in a case where the finger does not touch the first operation dial D1, that is, during waiting of the operation, only the current setting value of the item to be set by the first operation dial D1 is displayed on the dial plate portion. Accordingly, it is possible to easily grasp the current setting of the item to be set by the first operation dial D1 and thus to provide better operability.

<Case where Second Operation Dial is Touched>

Figure 29:
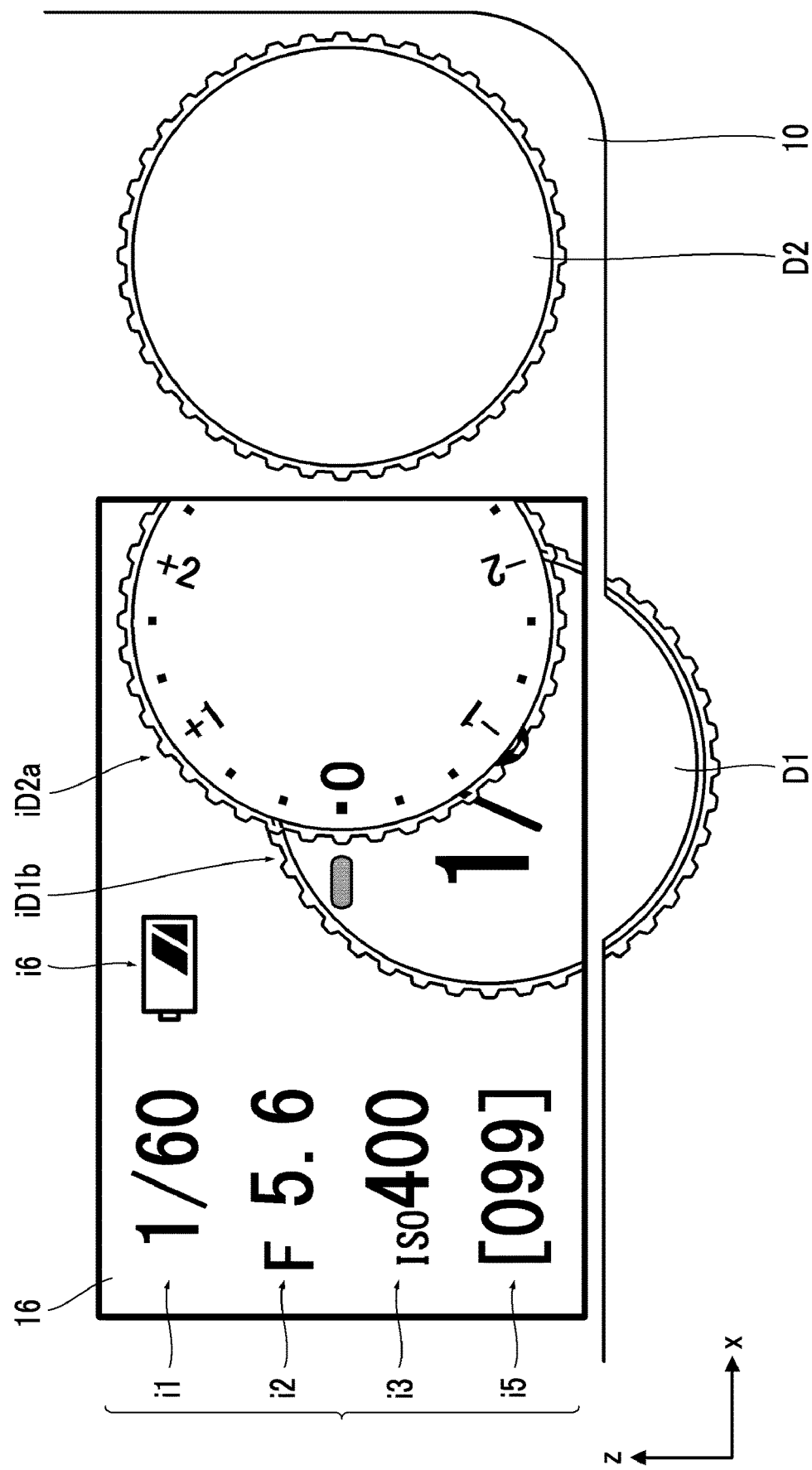
FIG. 29 is a plan view showing the display on the sub-display in a case where the second operation dial is touched.

FIG. 29 is a plan view showing the display on the sub-display in a case where the second operation dial is touched.

As shown in FIG. 29, in the case where the second operation dial D2 is touched, that is, in the case where the contact with the second operation dial D2 is detected, the image picture iD2a of the second operation dial D2 is displayed on the forefront surface.

At this time, the image picture iD2a of the second operation dial D2 is formed of an image obtained by imitating the actual exposure correction dial. That is, the image picture iD2a thereof is formed of an image in which selectable exposure correction amounts are displayed at regular intervals in the circumference direction on the dial plate portion. Accordingly, it is possible for the user to grasp that the exposure correction can be performed by operating the second operation dial D2. Further, it is also possible for the user to grasp a settable range of the exposure correction amount.

In the example shown in FIG. 29, the exposure correction amount information is excluded from the information to be displayed as the setting contents iC of the camera. Since the current exposure correction amount can be confirmed from the image picture of the second operation dial D2, the exposure correction amount information is excluded from the information to be displayed as the setting contents iC of the camera.

On the other hand, the shutter speed is displayed in the margin region as one item of the setting contents iC of the camera for the setting of the shutter speed. Accordingly, it is possible to confirm the setting value of the shutter speed even in a case where the image picture iD1b of the first operation dial D1 is hidden.

The display shown in FIG. 29 is maintained as long as the finger continues to touch the second operation dial D2. That is, the display is maintained as long as the contact of the finger with the second operation dial D2 continues to be detected.

<Case where Finger Touches Second Operation Dial and then Finger is Released>

Figure 30:
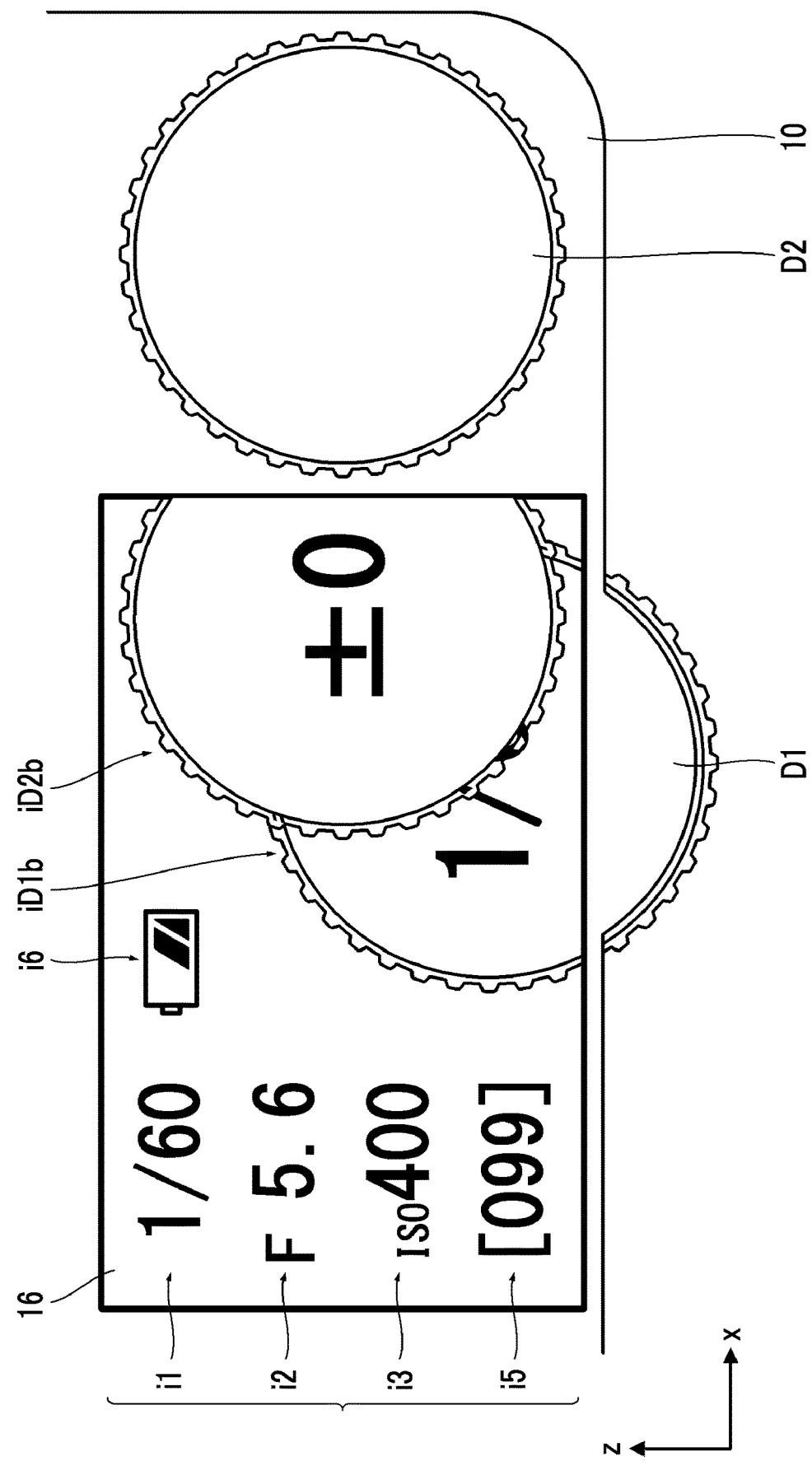
FIG. 30 is a plan view showing the display on the sub-display in a case where the finger touches the second operation dial and then the finger is released.

FIG. 30 is a plan view showing the display on the sub-display in a case where the finger touches the second operation dial and then the finger is released.

As shown in FIG. 30, even in the case where the finger touches the second operation dial D2 and then the finger is released, the image picture iD2b of the second operation dial D2 continues to be displayed on the forefront surface. The image picture of the operation dial touched by the finger at the last is displayed on the forefront surface on the sub-display 16.

However, in the case where the finger is released, that is, in the case where the contact of the finger is no longer detected, the display form of the image picture is switched. In this example, the currently set exposure correction amount is displayed on the dial plate portion in a large size as shown in FIG. 30.

In this manner, in a case where the finger does not touch the second operation dial D2, that is, during waiting of the operation, only the current setting value of the item to be set by the second operation dial D2 is displayed on the dial plate portion. Accordingly, it is possible to easily grasp the current setting of the item to be set by the second operation dial D2 and thus to provide better operability.

Modification Example

«Another Example of Image Picture»

The image picture of each of the operation dials shown in the above embodiment is one example.

Figure 31:
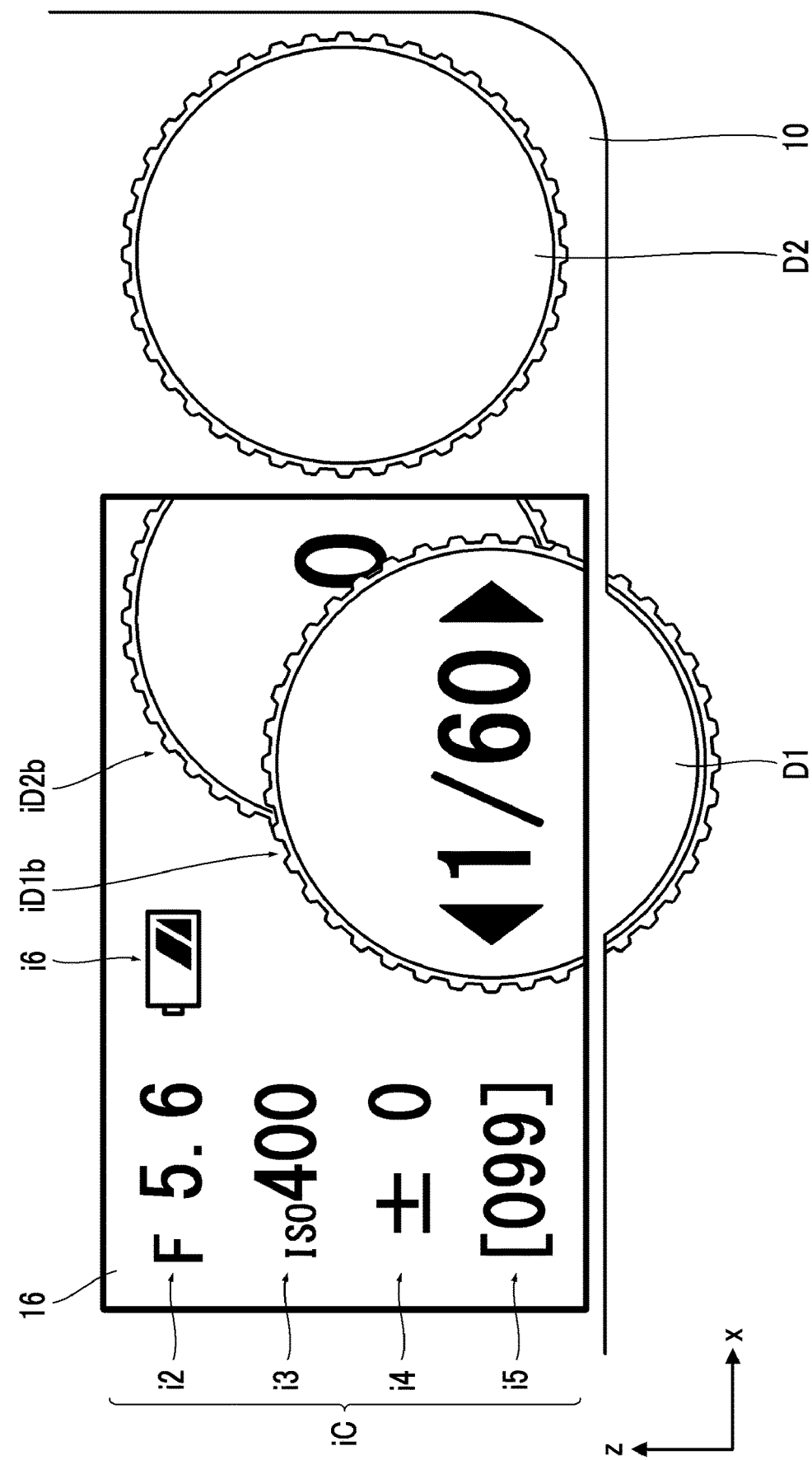
FIG. 31 is a plan view showing another example of the display on the sub-display in the case where the first operation dial is touched.

FIG. 31 is a plan view showing another example of the display on the sub-display in the case where the first operation dial is touched.

In the example shown in FIG. 31, the current setting value is displayed on the dial plate portion, and the triangular figures are displayed on both sides of the current setting value.

In this case, in the case where the finger is released from the first operation dial D1, the triangular figures displayed on both sides of the current setting value are deleted. That is, only the current setting value is displayed on the dial plate portion (refer to FIG. 28).

In addition, the current setting value may be displayed in a stationary state on the dial plate portion in the case where the operation dial is not touched (refer to FIG. 28), and the current setting value displayed on the dial plate portion may be turned on and off in the case where the operation dial is touched.

«Modification Example of Display Form of Image Picture»

Except for the image picture displayed on the forefront surface, at least a part of another image picture is hidden behind the image picture and displayed. In this case, even in a case where the setting value is displayed on the dial plate portion, the setting value may not be visually recognized. Thus, in the image picture other than the image picture displayed on the forefront surface, the current setting value is displayed on the dial plate portion avoiding a region where the image picture of another operation dial is overlapped.

Figure 32:
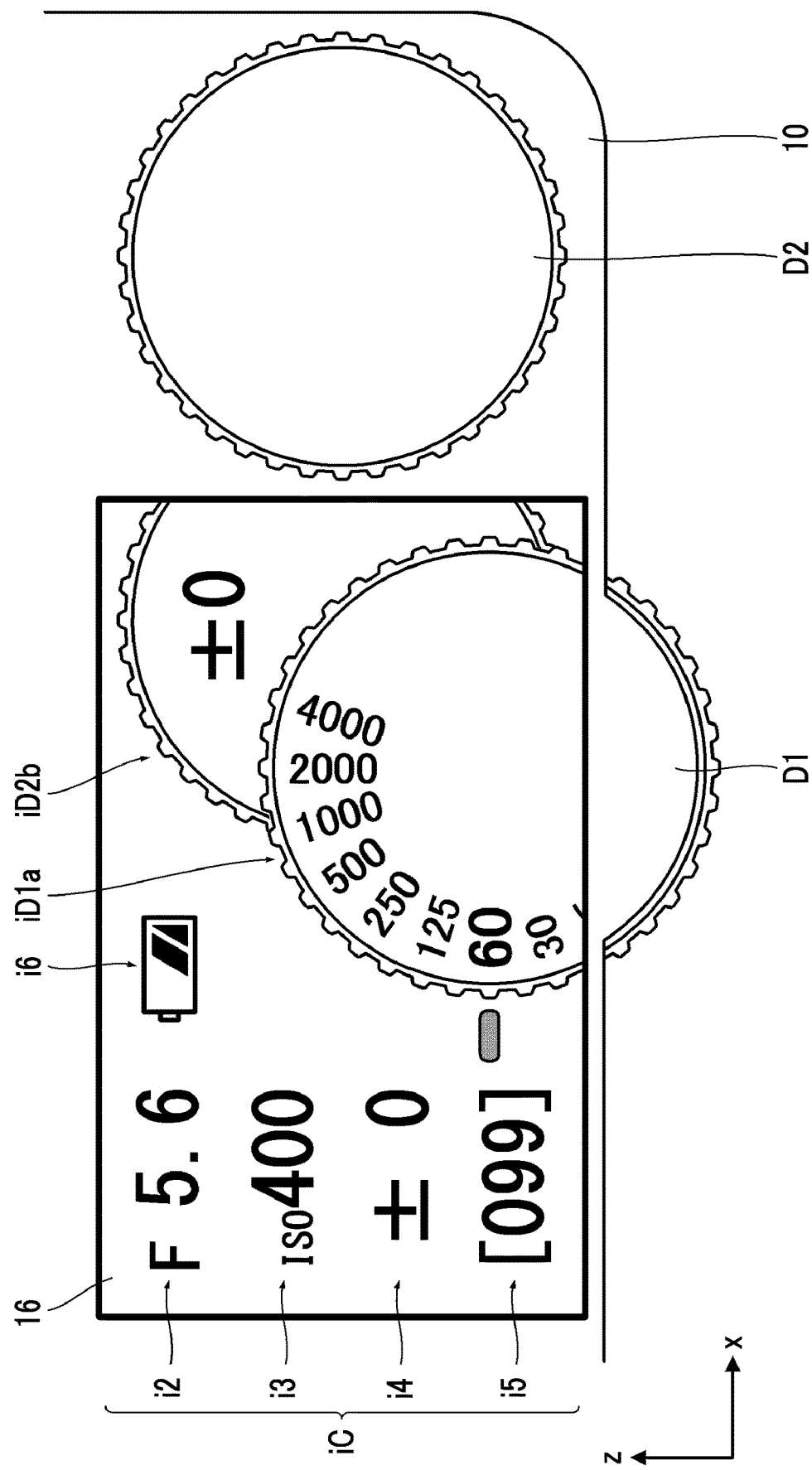
FIG. 32 is a diagram showing an example of the display of the image picture in a case where a current setting value is displayed on a dial plate portion avoiding a region where the image picture of another operation dial is overlapped.
Figure 33:
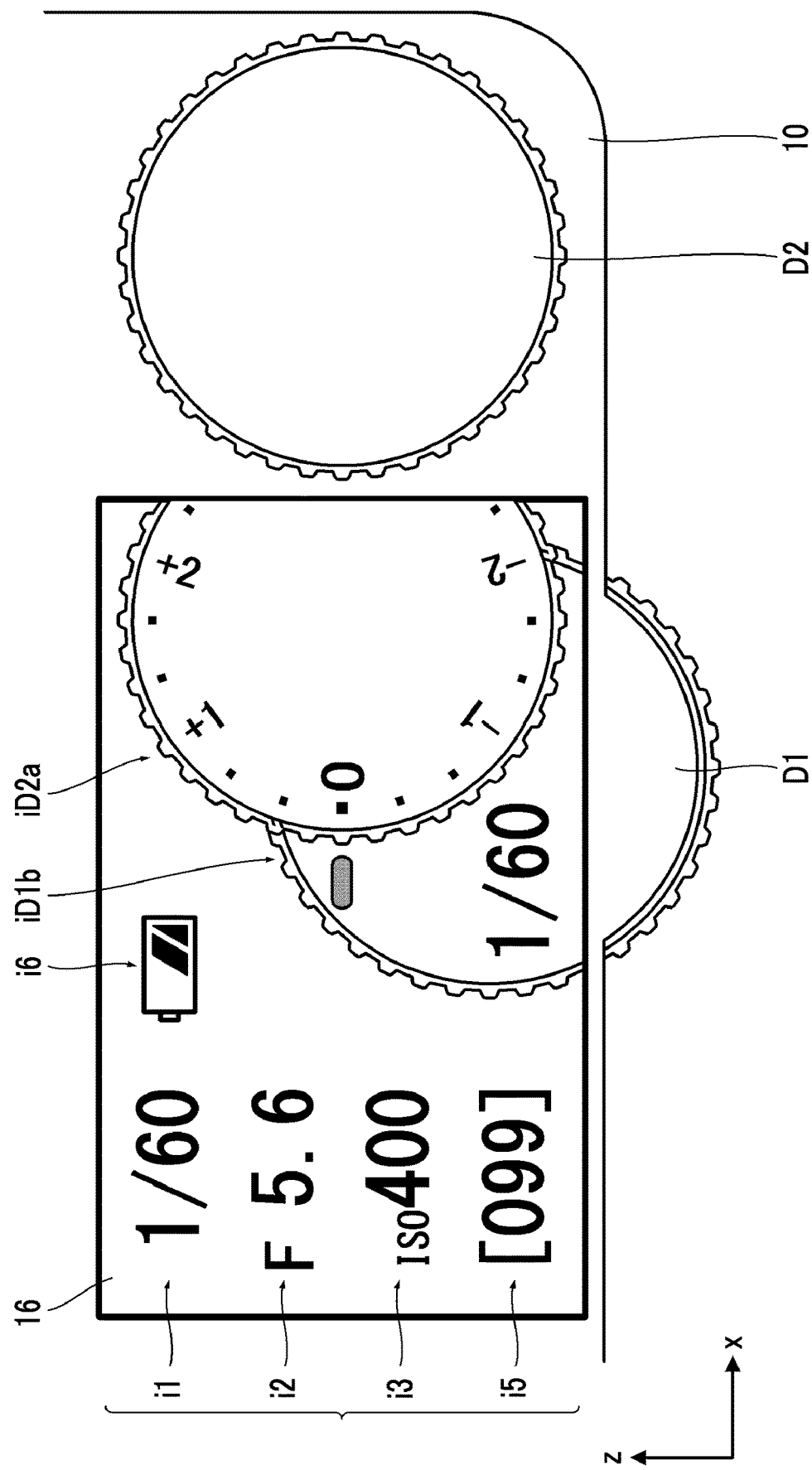
FIG. 33 is a diagram showing an example of the display of the image picture in a case where a current setting value is displayed on a dial plate portion avoiding a region where the image picture of another operation dial is overlapped.

FIGS. 32 and 33 are diagrams showing examples of the display of the image picture in the case where the current setting value is displayed on the dial plate portion avoiding the region where the image picture of another operation dial is overlapped.

FIG. 32 shows an example of the display on the sub-display 16 in the case where the first operation dial D1 is touched. In this case, the image picture iD1a of the first operation dial D1 is displayed on the forefront surface. A part of the image picture iD2b of the second operation dial D2 is hidden by the image picture iD1a of the first operation dial D1 and displayed. That is, the overlapped portion is hidden and displayed. In this case, in a case where the current setting value of the second operation dial D2 is displayed at the center of the dial plate portion, the display of the current setting value is hidden and is not viewed (refer to FIG. 27).

Thus, in the image picture iD2b of the second operation dial D2, the current setting value is displayed on the dial plate portion avoiding a region where the image picture iD1a of the first operation dial D1 is overlapped as shown in FIG. 32. Since the region where the image picture iD1a of the first operation dial D1 is overlapped is already known, the current setting value is displayed avoiding the region. In this case, a character size of the current setting value is adjusted and displayed as necessary.

FIG. 33 shows an example of the display on the sub-display 16 in the case where the second operation dial D2 is touched. In this case, the image picture iD2a of the second operation dial D2 is displayed on the forefront surface. A part of the image picture iD1b of the first operation dial D1 is hidden by the image picture iD2a of the second operation dial D2 and displayed. Therefore, in this case, in the image picture iD1b of the first operation dial D1, the current setting value is displayed on the dial plate portion avoiding a region where the image picture iD2a of the second operation dial D2 is overlapped as shown in FIG. 33. Since the region where the image picture iD2a of the second operation dial D2 is overlapped is already known, the current setting value is displayed avoiding the region. In this case, the character size of the current setting value is adjusted and displayed as necessary.

In a case where the display of the image picture on the lower side can be visually recognized even in the case where the two image pictures are overlapped each other, the processing as in this example is unnecessary. That is, since there is a case where the display of the image picture hidden on the lower side on the dial plate portion can be visually recognized depending on a display layout mode, it is not always necessary to switch the display form.

Figure 34:
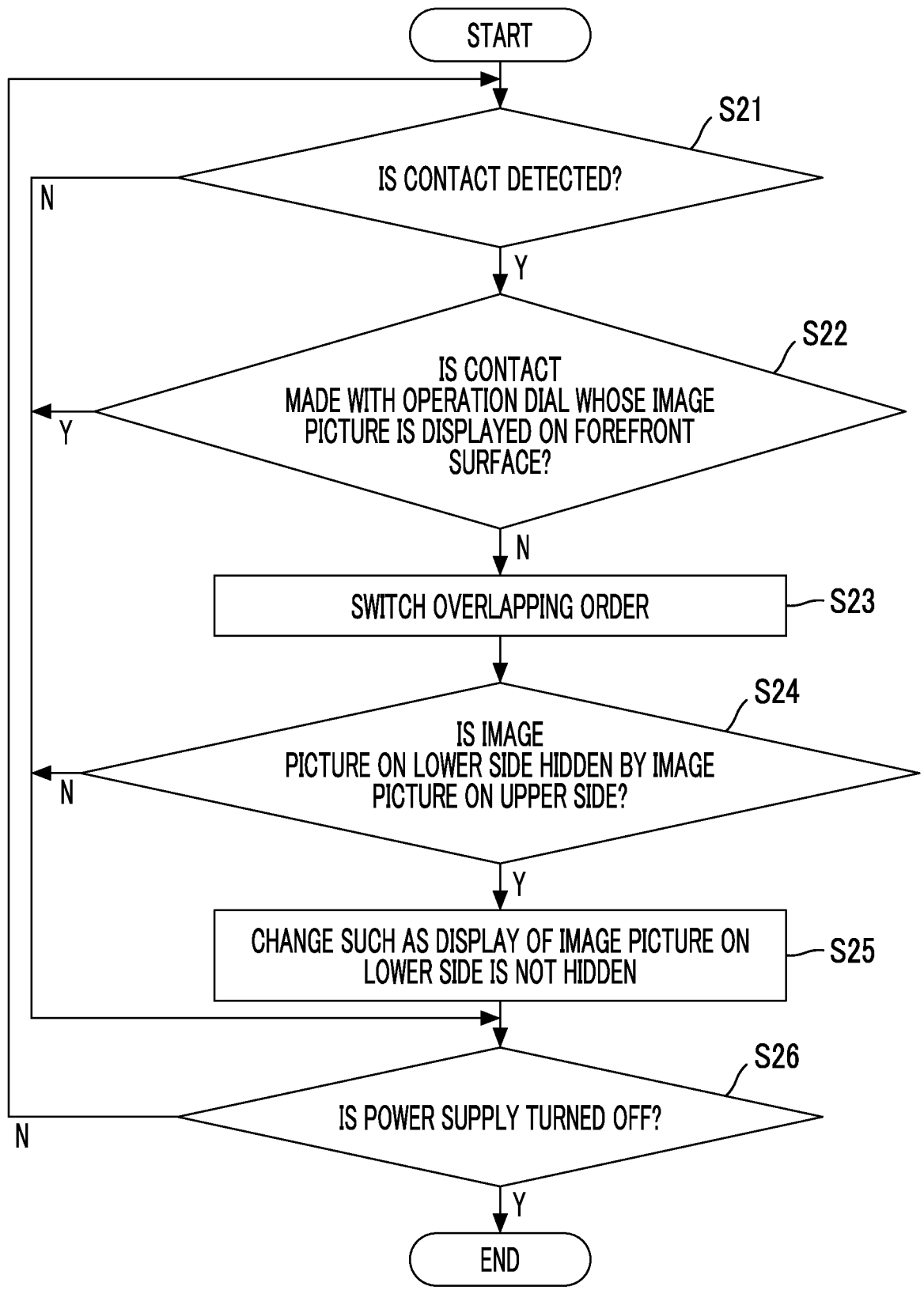
FIG. 34 is a flowchart showing a procedure of display processing of the image picture of the operation dial.

FIG. 34 is a flowchart showing a procedure of display processing of the image picture of the operation dial in this example.

The sub-display display control unit 114 determines the presence or absence of the contact of the finger with the first operation dial D1 and the second operation dial D2 (step S21).

In the case where it is determined that the contact is detected, it is determined whether the contact is made with the operation dial whose image picture is displayed on the forefront surface at the present time (step S22).

In the case where it is determined that the contact is made with the operation dial whose image picture is displayed on the forefront surface at the present time, the switching processing is not performed and the processing proceeds to step S26. That is, it is determined whether the power supply of the digital camera 1 is turned off (step S26). In the case where it is determined that the power supply thereof is not turned off, the processing returns to step S21 to determine the presence or absence of the detection of the contact again (step S21).

On the other hand, in the case where it is determined that the contact is not made with the operation dial whose image picture is displayed on the forefront surface at the present time, the sub-display display control unit 114 switches the overlapping order (step S23).

In a case where the overlapping order is switched, the sub-display display control unit 114 determines whether the display of the image picture on the lower side on the dial plate portion is hidden by the image picture to be displayed on the upper side (step S24). The determination is made with reference to, for example, a table.

In a case where the display of the image picture on the lower side on the dial plate portion is not hidden by the image picture to be displayed on the upper side, the display form is not switched.

On the other hand, in a case where the display of the image picture on the lower side on the dial plate portion is hidden by the image picture to be displayed on the upper side, the display form of the image picture on the lower side is switched. That is, the display form is changed such that the display of the current setting value is not hidden (step S25).

In this manner, it is possible to easily confirm the current setting value by displaying the current setting value on the dial plate portion avoiding the overlapping region for the image picture hidden on the lower side. Accordingly, it is possible to further improve operability.

Third Embodiment

In a digital camera of an embodiment, in a case where any operation dial is not touched, the image picture of each of the operation dials is divided into mutually overlapping regions and displayed.

Only the display on the sub-display 16 is different from the digital camera of the first embodiment. Therefore, only the display on the sub-display 16 will be described herein.

In the following description, an example in the case where the function of setting the shutter speed is assigned to the first operation dial D1 and the function of setting the exposure correction amount is assigned to the second operation dial D2 will be described.

«Display on Sub-Display»

<Case where First Operation Dial and Second Operation Dial are not Touched>

Figure 35:
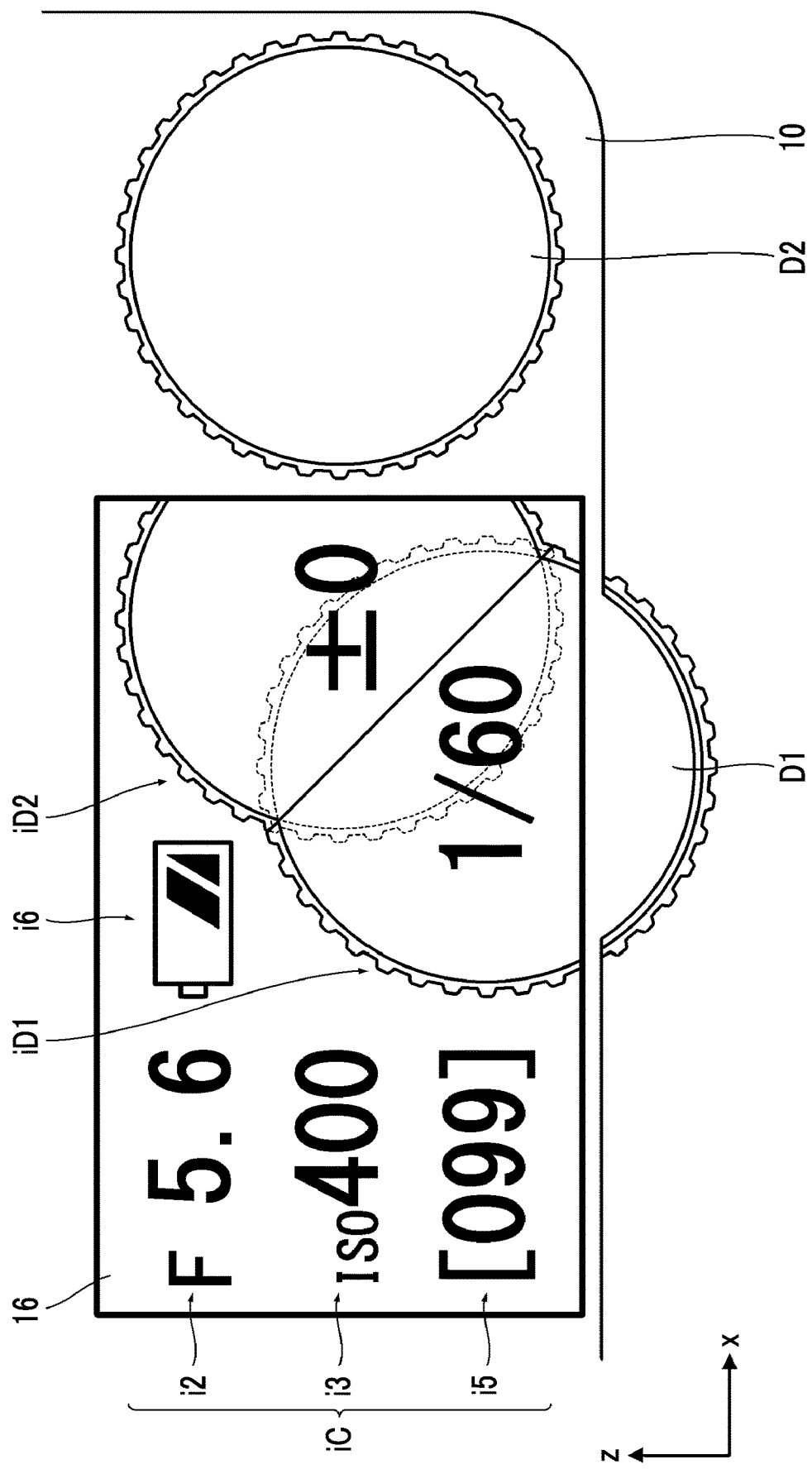
FIG. 35 is a plan view showing an example of the display on the sub-display of a digital camera of an embodiment.

FIG. 35 is a plan view showing an example of the display on the sub-display of the digital camera of the embodiment. FIG. 35 shows the display on the sub-display 16 in the case where the finger does not touch any operation dial, that is, in the case where the contact of the finger is not detected. The broken lines indicate the overlapping and are not actually displayed on the screen.

As shown in FIG. 35, the image picture iD1 of the first operation dial D1 and the image picture iD2 of the second operation dial D2 are displayed at the mutually overlapping positions. The image picture iD1 thereof and the image picture iD2 thereof are divided into the mutually overlapping regions and displayed. In other words, the "displayed in a divided manner" means that the image picture is notched in the overlapping region and displayed.

In the example shown in FIG. 35, the image picture iD1 thereof and the image picture iD2 thereof are divided by a straight line connecting intersection points of a circle that defines the external shape of the image picture iD1 of the first operation dial D1 and a circle that defines the external shape of the image picture iD2 of the second operation dial D2 to display the image picture iD1 of the first operation dial D1 and the image picture iD2 of the second operation dial D2.

Further, in the example shown in FIG. 35, an image in which the current setting value is displayed on the inner side of the circle representing the external shape of the dial (dial plate portion) is employed as the image picture iD1 of the first operation dial D1. Similarly, an image in which the current setting value is displayed on the inner side of the circle representing the external shape of the dial (dial plate portion) is employed as the image picture iD2 of the second operation dial D2.

In this manner, in the case where any operation dial is not touched, the image picture of each of the operation dials is divided into the mutually overlapping regions and displayed. Accordingly, it is possible to confirm the current setting of the item to be set by each operation dial.

In the example shown in FIG. 35, the shutter speed information and the exposure correction amount information are excluded from the item to be displayed as the setting contents iC of the camera. Since the shutter speed information and the exposure correction amount information can be confirmed by the image pictures iD1 and iD2 of the first operation dial D1 and the second operation dial D2, the displays of the shutter speed information and the exposure correction amount information are omitted. Accordingly, it is possible to eliminate the redundant display.

<Case where First Operation Dial is Touched>

In the case where the first operation dial D1 is touched, that is, in the case where the contact with the first operation dial D1 is detected, the image picture iD1 of the first operation dial D1 is displayed on the image picture iD2 of the second operation dial D2 in an overlapped manner. That is, the image picture iD1 of the first operation dial D1 is displayed on the forefront surface as shown in FIG. 28.

Accordingly, in a case where the first operation dial D1 is operated to set the shutter speed, it is possible to provide good operability.

<Case where Second Operation Dial is Touched>

In the case where the second operation dial D2 is touched, that is, in the case where the contact with the second operation dial D2 is detected, the image picture iD2 of the second operation dial D2 is displayed on the image picture iD1 of the first operation dial D1 in an overlapped manner. That is, the image picture iD2 of the second operation dial D2 is displayed on the forefront surface as shown in FIG. 30.

Accordingly, in a case where the second operation dial D2 is operated to perform the exposure correction, it is possible to provide good operability.

Modification Example

The image picture of each of the operation dials shown in the above embodiment is one example. The image obtained by imitating the actual operation dial may be employed as the image picture of the operation dial (refer to FIGS. 11 to 14 and FIGS. 23 to 26).

Further, the display form of the image picture of each of the operation dials may be switched between the case where the operation dial is touched and the case where the operation dial is not touched.

Furthermore, in the case where the image picture of each of the operation dials is displayed in an overlapped manner, the display forms described in the first or second embodiment and the modification example thereof may be employed as appropriate.

Fourth Embodiment

Figure 36:
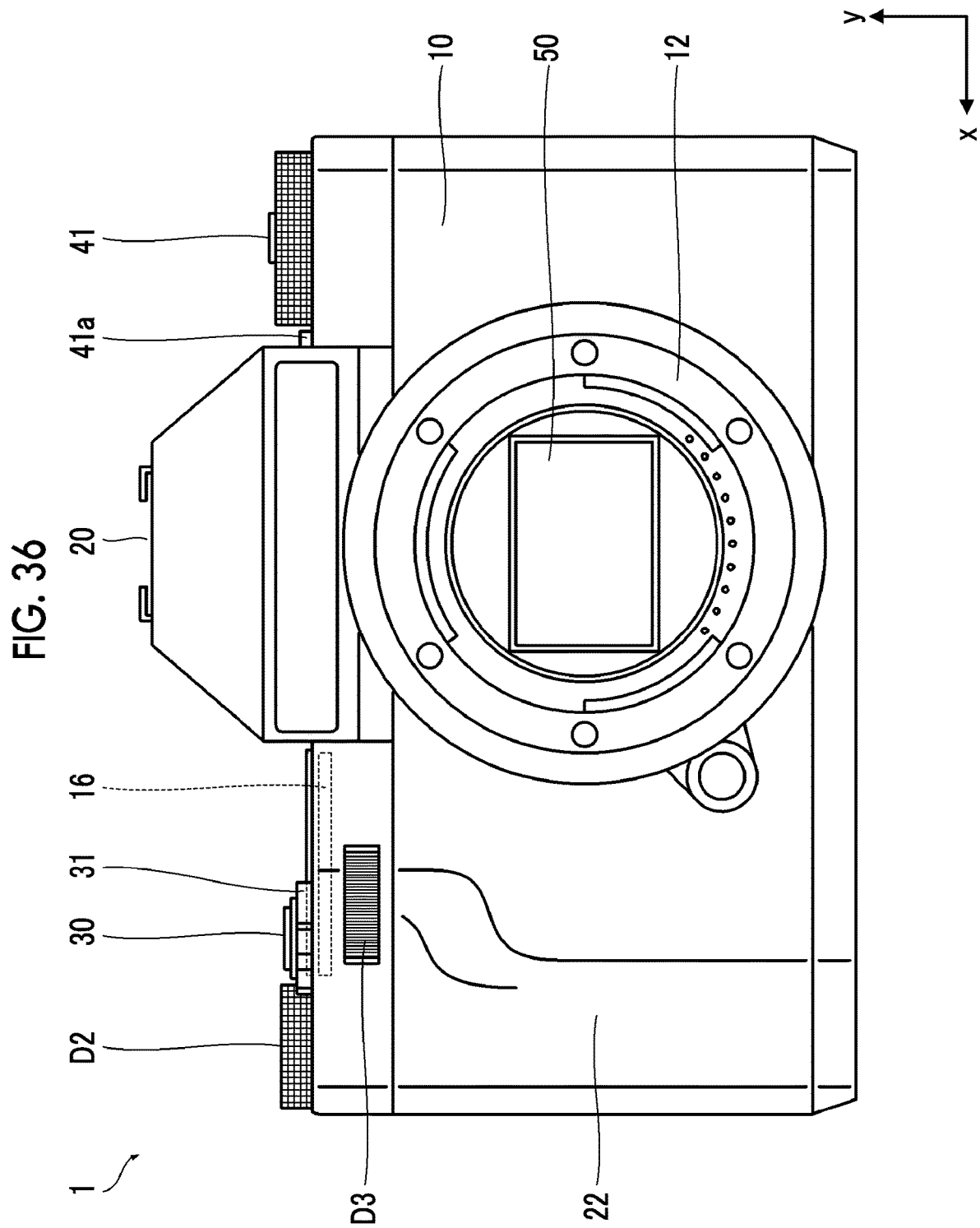
FIG. 36 is a front view of a digital camera of a fourth embodiment.
Figure 37:
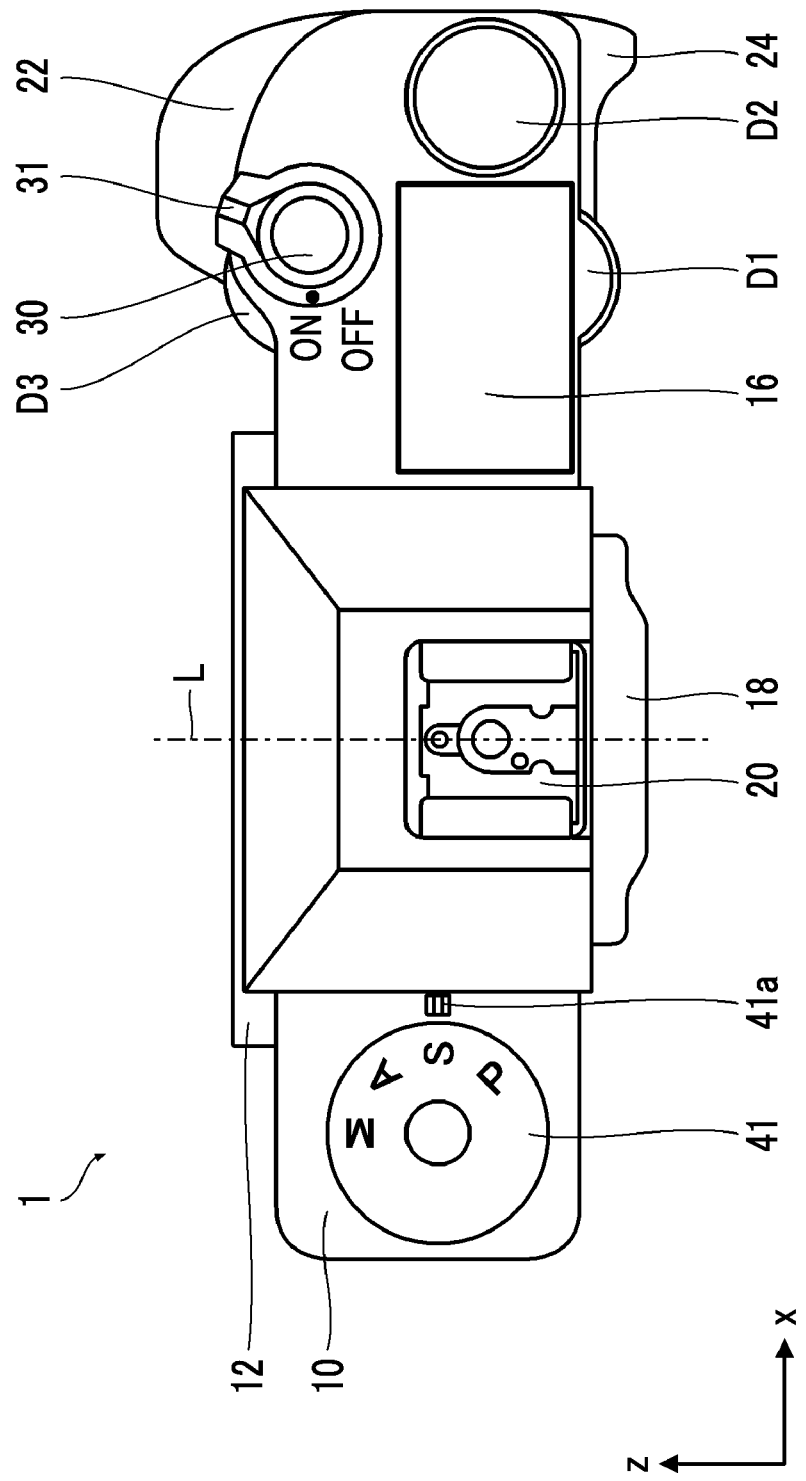
FIG. 37 is a plan view of the digital camera of the fourth embodiment.

FIG. 36 is a front view of a digital camera of a fourth embodiment. FIG. 37 is a plan view of the digital camera of the fourth embodiment.

In the digital camera 1 of the embodiment, three operation dials are provided near the sub-display 16 as shown in FIGS. 36 and 37. Specifically, the first operation dial D1 is provided on the back surface of the camera body 10, and the second operation dial D2 is provided on the top surface of the camera body 10. Furthermore, a third operation dial D3 is provided on the front surface of the camera body 10.

The first operation dial D1 and the second operation dial D2 are the same as the first operation dial D1 and the second operation dial D2 provided in the digital camera of the first embodiment.

The third operation dial D3 is provided at an upper end portion of the grip 22. A position where the third operation dial D3 is provided is a position that can be operated with the index finger of the right hand holding the grip 22. Further, this position is a position on the front side with respect to the sub-display 16.

The configuration of the third operation dial D3 is the same as the configuration of the first operation dial D1. That is, the third operation dial D3 can be rotationally operated in both directions and comprises the click mechanism. Further, the contact with the third operation dial D3 is detected by the touch sensor.

Other configurations are the same as the digital camera of the first embodiment.

The operation targets of the respective operation dials D1, D2, and D3 are automatically switched according to the state of the digital camera. For example, in the case where the program mode is selected in the imaging mode, the function of the program shift is assigned to the first operation dial D1, the function of setting the exposure correction amount is assigned to the second operation dial D2, and a function of setting the ISO sensitivity is assigned to the third operation dial D3.

Further, in the case where the shutter speed priority mode is selected, the function of setting the shutter speed is assigned to the first operation dial D1, the function of setting the exposure correction amount is assigned to the second operation dial D2, and the function of setting the ISO sensitivity is assigned to the third operation dial D3.

Furthermore, in the case where the aperture stop priority mode is selected, the function of setting the F-number is assigned to the first operation dial D1, the function of setting the exposure correction amount is assigned to the second operation dial D2, and the function of setting the ISO sensitivity is assigned to the third operation dial D3.

Further, in the case where the manual mode is selected, the function of setting the shutter speed is assigned to the first operation dial D1, the function of setting the exposure correction amount is assigned to the second operation dial D2, and the function of setting the F-number is assigned to the third operation dial D3.

«Display on Sub-Display»

Here, a case where the function of setting the shutter speed is assigned to the first operation dial D1, the function of setting the exposure correction amount is assigned to the second operation dial D2, and the function of setting the ISO sensitivity is assigned to the third operation dial D3 will be described as an example. That is, a case where the imaging mode is set and the shutter speed priority mode is selected will be described as an example.

FIGS. 38 to 40 are plan views showing examples of the display on the sub-display. FIG. 38 shows the display on the sub-display 16 in the case where the contact with the first operation dial D1 is detected. FIG. 39 shows the display on the sub-display 16 in the case where the contact with the second operation dial D2 is detected. FIG. 40 shows the display on the sub-display 16 in the case where the contact with the third operation dial D3 is detected.

As shown in FIGS. 38 to 40, the image pictures iD1, iD2, and iD3 of the respective operation dials D1, D2, and D3 are displayed at the mutually overlapping positions.

A display position of the image picture iD1 of the first operation dial D1 and a display position of the image picture iD2 of the second operation dial D2 are the same as the display positions in the digital camera of the first embodiment described above.

The image picture iD3 of the third operation dial D3 is displayed from the front edge (side) of the sub-display 16. That is, the image picture iD3 thereof is displayed so as to overhang from the edge on the front side of the sub-display 16 to the display region of the sub-display 16 in a state where the part of the image picture iD3 thereof is hidden outside the frame.

Since the third operation dial D3 is disposed on the front side with respect to the sub-display 16, the image picture iD3 is displayed from the front edge which is an edge near the front side.

The setting contents iC of the camera are displayed in the margin region. In this example, the currently set shutter speed information i1, the currently set F-number information i2, the currently set ISO sensitivity information i3, the currently set exposure correction amount information i4, and the current number of capturable images information i5 are displayed as the setting contents iC of the camera.

<Case where First Operation Dial is Touched>

In the case where the first operation dial D1 is touched, that is, in the case where the contact with the first operation dial D1 is detected, the image picture iD1 of the first operation dial D1 is displayed on the forefront surface as shown in FIG. 38.

The display in FIG. 38 continues to be maintained even in the case where the finger touches the first operation dial D1 and then the finger is released. That is, the image picture iD1 of the first operation dial D1 continues to be displayed on the forefront surface.

<Case where Second Operation Dial is Touched>

In the case where the second operation dial D2 is touched, that is, in the case where the contact with the second operation dial D2 is detected, the image picture iD2 of the second operation dial D2 is displayed on the forefront surface as shown in FIG. 39.

The display in FIG. 39 continues to be maintained even in the case where the finger touches the second operation dial D2 and then the finger is released. That is, the image picture iD2 of the second operation dial D2 continues to be displayed on the forefront surface.

FIG. 39 shows a display example in a case where the first operation dial D1 is touched and then the second operation dial D2 is touched. In this case, the image picture iD2 of the second operation dial D2 is displayed on the image picture iD1 of the first operation dial D1 in an overlapped manner.

<Case where Third Operation Dial is Touched>

In a case where the third operation dial D3 is touched, that is, in a case where the contact with the third operation dial D3 is detected, the image picture iD3 of the third operation dial D3 is displayed on the forefront surface as shown in FIG. 40.

The display in FIG. 40 continues to be maintained even in the case where the finger touches the third operation dial D3 and then the finger is released. That is, the image picture iD3 of the third operation dial D3 continues to be displayed on the forefront surface.

FIG. 40 shows a display example in a case where the second operation dial D2 is touched and then the third operation dial D3 is touched. In this case, the image picture iD3 of the third operation dial D3 is displayed on the image picture iD2 of the second operation dial D2 in an overlapped manner.

In this manner, the image picture of each of the operation dials is displayed so as to overlap each other also in the case where the three operation dials are provided, and the overlapping order of the image picture thereof is controlled by the detection of the contact. Accordingly, it is possible to provide good operability also in the case where the plurality of operation dials are provided.

Modification Example

«Number and Layout of Operation Dials Installed»

As described above, the plurality of operation dials can be provided. One operation dial is disposed on each side of the sub-display 16 in the above embodiment, but the plurality of operation dials can be disposed on one side. For example, two operation dials can be disposed in parallel on the back surface of the camera body 10. In this case, image pictures of the two operation dials are displayed from the edge on the rear side of the sub-display 16.

«Switching of Display Form of Image Picture»

Similarly to the digital camera of the second embodiment, the display form of the image picture of the operation dial to be displayed on the sub-display 16 may be switched between the case where the operation dial is touched and the case where the operation dial is not touched.

FIG. 41 is a plan view showing an example of the display on the sub-display in the case where the operation dial is not touched. FIG. 41 shows an example of the display on the sub-display 16 in a case where the third operation dial D3 is touched at the last.

As shown in FIG. 41, in the case where any operation dial is not touched, the current setting values of the image pictures iD1, iD2, and iD3 of the respective operation dials D1, D2, and D3 are respectively displayed in a large size on the dial plate portion.

Accordingly, it is possible to easily confirm the current setting. Further, it is possible to grasp from the display on the sub-display 16 that the setting is not being changed.

«Division Display»

Similarly to the digital camera of the third embodiment, in the case where any operation dial is not touched, the image picture of each of the operation dials may be displayed in a divided manner.

FIG. 42 is a plan view showing an example of the display on the sub-display in a case where the image picture of each of the operation dials is displayed by being divided into mutually overlapping regions.

As shown in FIG. 42, the image pictures iD1, iD2, and iD3 of the respective operation dials D1, D2, and D3 are divided into the mutually overlapping regions and displayed.

FIG. 43 is a plan view showing an example of the display on the sub-display in a case where the contact with the third operation dial is detected in the case where the image picture of each of the operation dials is displayed by being divided into the mutually overlapping regions.

As shown in FIG. 43, in the case where the contact with the third operation dial D3 is detected, the image picture iD3 of the third operation dial D3 is displayed on the forefront surface.

«Partially Fixed Display»

In a case where three or more operation dials are provided, an image picture of at least one operation dial can be displayed in a fixed manner. In this case, the image picture of the operation dial is excluded from the switching target of the overlapping order. Since there is a case where the fixed display of an image picture is easily viewed depending on the layout of the operation dial, the image picture is excluded from the switching target of the overlapping order in such case. In this case, the switching of the overlapping order is performed with image pictures of remaining operation dials. For example, in a case where one image picture is fixed in the case where three operation dials are provided, the switching of the overlapping order is performed with the image pictures of the remaining two operation dials. In this case, it is preferable that the image picture of the operation dial to be displayed in a fixed manner is displayed on the forefront surface.

For example, it is considered that the image picture iD2 of the second operation dial D2 is displayed in a fixed manner in the digital camera 1 shown in FIGS. 36 and 37. In this case, the image picture iD2 of the second operation dial D2 is displayed on the forefront surface regardless of the presence or absence of the contact (refer to FIG. 39). The switching of the overlapping order of the image pictures between the first operation dial D1 and the third operation dial D3 is performed.

For example, in the case where the contact with the first operation dial D1 is detected, the image picture iD1 of the first operation dial D1 is displayed on the image picture iD3 of the third operation dial D3 in an overlapped manner as shown in FIG. 39.

FIG. 44 is a diagram showing an example of the display on the sub-display in the case where the third operation dial is touched.

In the case where the contact with the third operation dial D3 is detected, the image picture iD3 of the third operation dial D3 is displayed on the image picture iD1 of the first operation dial D1 in an overlapped manner as shown in FIG. 44.

In this manner, in the case where three operation dials are provided in the camera body, the image picture of at least one operation dial may be displayed in a fixed manner. Since there is a case where it is better to display the image picture in a fixed manner depending on the operation dial, the layout mode on the sub-display 16, or the like, the image picture is displayed in a fixed manner in such case.

The image picture is displayed in a fixed manner on the forefront surface in the above example. However, since there is a case where it is better to display the image picture on the lowest layer depending on the layout, a position (layer) to be fixed is not particularly limited. It is possible to set the position as appropriate. Further, it is possible for the user to select the Image Picture to be Fixed.

«Modification Example of Display Form of Image Picture»

As described in the modification example of the second embodiment, it is preferable to switch the display forms of the image pictures such that the displays on the dial plate portions of the image pictures other than the image picture displayed on the forefront surface are not hidden. That is, the current setting value is displayed on the dial plate portion avoiding regions where the image pictures of other operation dials are overlapped.

FIG. 45 is a diagram showing an example of the display of the image picture in the case where the current setting value is displayed on the dial plate portion avoiding the regions where the image pictures of other operation dials are overlapped.

FIG. 45 shows an example of the display in the case where the contact with the third operation dial is detected in the case where the image picture of each of the operation dials is displayed by being divided into the mutually overlapping regions. As shown in FIG. 45, the current setting value of the image picture iD2 of the second operation dial D2 is displayed on the dial plate portion avoiding the regions where the image pictures of other operation dials are overlapped. Since the current setting value of the image picture iD1 of the first operation dial D1 can be visually recognized, the display form is not switched (refer to FIG. 43).

In this manner, it is possible to easily confirm the current setting value of the image picture hidden on the lower side by displaying the current setting value on the dial plate portion avoiding the overlapping regions. Accordingly, it is possible to further improve operability.

Other Embodiments

[Switching Based on Operation]

In the above embodiment, the contact with the operation dial is detected, and the display is controlled such that the image picture of the operation dial on which the contact is detected at the last is displayed on the forefront surface. However, the operation with respect to the operation dial is detected, and the display may be controlled such that the image picture of the operation dial operated at the last is displayed on the forefront surface. In this case, the overlapping order is not changed even in the case where the operation dial is touched, and the overlapping order is switched in the case where the operation dial is actually operated.

Other Embodiments of Display Section

The sub-display forming the display section is formed of a reflective LCD in the above-described embodiment, but the display forming the dial display section is not limited thereto. In addition, the display may be formed of, for example, a self-luminous display such as electronic paper, a memory liquid crystal display, or an organic electroluminescent display (EL) or the like.

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the dial display section can be confirmed even in a case where the power supply of the camera is turned off.

Further, in a case where the sub-display is formed of the LCD, it is possible to ensure good visibility even in an environment where surroundings are bright by employing a reflective LCD as the display. In the case where the display is formed of the reflective LCD, it is preferable to comprise illumination.

Another Embodiment of Operation Dial

In a case where the operation dial is built in the camera body and the part of the outer periphery of the operation dial is disposed in an exposed manner from the camera body, the operation dial is provided with a function of a pushing operation. The pushing operation refers to an operation of pushing the operation dial in a direction orthogonal to the axis.

In the case where the display on the sub-display is controlled based on the operation of the operation dial, the display on the sub-display may be switched based on the pushing operation with respect to the operation dial.

[Another Example of Means for Detecting Contact]

The touch sensor is used as means for detecting the contact with the operation dial in the above-described embodiment, but the means for detecting the contact with the operation dial is not limited thereto. For example, a non-contact type sensor may detect that the finger approaches a certain distance with respect to the operation dial to indirectly detect the contact of the finger with the operation dial.

FIG. 46 is a back view of a digital camera comprising a sensor that detects the approach of the finger to the first operation dial.

As shown in FIG. 46, a sensor SD1 that detects the approach of the finger is provided near the first operation dial D1. The sensor SD1 is formed of, for example, a proximity sensor. The proximity sensor may be any type such as an inductive type, a capacitive type, an ultrasonic type, an electromagnetic wave type, and an infrared type. In a case where the finger approaches a certain distance or more, the sensor SD1 is turned on. Therefore, it is possible to detect that the finger approaches the first operation dial D1 by detecting that the sensor SD1 is turned on.

Similarly to other operation dials, it is possible to indirectly detect the contact of the finger by installing a sensor that detects the approach of the finger.

Other Embodiments of Camera

Further, the case where the invention is applied to the digital camera is described in the above-mentioned embodiment, but the application of the invention is not limited thereto. The invention may be applied similarly to a camera that uses a silver halide film. In addition, the invention may also be applied to an electronic apparatus incorporating the rotary operation dial.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

Further, a program causing a computer to realize the function relating to the display can also be provided as a display control program, for example, by being stored in a computer readable recording medium solely.

EXPLANATION OF REFERENCES

1: digital camera
2: lens
2a: lens drive unit
10: camera body
12: lens mount
14: main-display
16: sub-display
18: electronic view finder
20: hot shoe
22: grip
24: thumb rest
30: shutter button
31: power supply lever
34: playback button
35: delete button
36: AF lock button
37: AE lock button
38: menu button
39: selector button
40: display button
41: mode dial
41a: indicator
50: image sensor
52: image sensor drive unit
54: shutter
56: shutter drive unit
58: analog signal processing section
60: image data input unit
62: work memory
64: data memory
66: digital signal processing section
68: recording control unit
70: main-display drive unit
72: sub-display drive unit
74: operation unit
78: memory card
80: system controller
110: operation target setting unit
112: setting change unit
114: sub-display display control unit
D1: first operation dial
D1a: first operation dial operation detection unit
D1b: first operation dial touch sensor
D1o: rotation axis
D2: second operation dial
D2a: second operation dial operation detection unit
D2b: second operation dial touch sensor
D2o: rotation axis
D3: third operation dial
L: optical axis
SD1: sensor
i1: shutter speed information
i2: F-number information
i3: ISO sensitivity information
i4: exposure correction amount information
i5: number of capturable images information
i6: battery remaining amount information
iC: setting contents of camera
iD: image picture of operation dial
iD1: image picture of first operation dial
iD1a: image picture of first operation dial
iD1b: image picture of first operation dial
iD2: image picture of second operation dial
iD2a: image picture of second operation dial
iD2b: image picture of second operation dial
iD3: image picture of third operation dial
iI: image picture of indicator
r: rotation direction of operation dial
S11 to S14: processing procedure of switching overlapping of image picture of operation dial S21 to S26: procedure of display processing of the image picture of the operation dial

What is claimed is:

1. A camera comprising:
a display section;
a plurality of operation dials, each of which is configured to be operated in a rotational direction;
a detector, including a sensor, configured to detect contact or approach of a finger with each of the operation dials; and
a display controller circuitry configured to control a display on the display section,
wherein the display controller circuitry displays an image picture of each of the operation dials at a mutually overlapping position and switches an overlapping order of the image picture of each of the operation dials based on a detection result of the detector to display the image picture of one of the operation dials, on which the contact or the approach is detected, on a front surface.

2. The camera according to claim 1,
wherein the display controller circuitry switches a display form of the image picture of the one of the operation dials to be displayed on the front surface between a case where the contact or the approach is being detected by the detector and a case where the contact or the approach is not being detected by the detector.

3. The camera according to claim 2,
wherein the display controller circuitry displays the image picture in a form in which setting values settable by the one of the operation dials are displayed side by side on a dial plate portion in the case where the contact or the approach is being detected by the detector and displays the image picture in a form in which only a current setting value is displayed on the dial plate portion in the case where the contact or the approach is not being detected by the detector.

4. The camera according to claim 3,
wherein in the case where the setting values settable by the one of the operation dials are displayed side by side on the dial plate portion, the display controller circuitry displays the setting values settable by the one of the operation dials side by side along an arc that defines an external shape of the image picture.

5. The camera according to claim 1,
wherein the display controller circuitry displays the image picture in a form in which only a current setting value is displayed on a dial plate portion for another one of the operation dials different than the one of the operation dials whose image picture is displayed on a forefront surface.

6. The camera according to claim 5,
wherein the display controller circuitry displays the current setting value of the other one of the operation dials on the dial plate portion avoiding a region where the image picture of another one of the operation dials is overlapped.

7. The camera according to claim 1,
wherein the display controller circuitry displays a setting value of another one of the operation dials different than the one of the operation dials whose image picture is displayed on a forefront surface, in a margin region of the display section.

8. The camera according to claim 1,
wherein in a case where three or more operation dials are provided, the display controller circuitry displays the image picture of at least one of the operation dials in a fixed manner.

9. The camera according to claim 8,
wherein the display controller circuitry displays the image picture of the at least one of the operation dials displayed in the fixed manner on a forefront surface.

10. The camera according to claim 1,
wherein the display section is provided on a top surface of a camera body, and
wherein the plurality of operation dials are provided near the display section.

11. A camera comprising:
a display section;
a plurality of operation dials, each of which is configured to be operated in a rotational direction; and
a display controller circuitry configured to control a display on the display section,
wherein the display controller circuitry displays an image picture of each of the operation dials at a mutually overlapping position and switches an overlapping order of the image picture of each of the operation dials based on an operation of each of the operation dials to display the image picture of one of the operation dials that is operated on a front surface.

12. The camera according to claim 11,
wherein the display controller circuitry switches a display form of the image picture of the one of the operation dials to be displayed on the front surface between a case where the one of the operation dials is being operated and a case where the one of the operation dials is not being operated.

13. The camera according to claim 12,
wherein the display controller circuitry displays the image picture in a form in which setting values settable by the one of the operation dials are displayed side by side on a dial plate portion in the case where the one of the operation dials is being operated and displays the image picture in a form in which only a current setting value is displayed on the dial plate portion in the case where the one of the operation dials is not being operated.

14. The camera according to claim 13,
wherein in the case where the setting values settable by the one of the operation dials are displayed side by side on the dial plate portion, the display controller circuitry displays the setting values settable by the one of the operation dials side by side along an arc that defines an external shape of the image picture.

15. The camera according to claim 11,
wherein the display controller circuitry displays the image picture in a form in which only a current setting value is displayed on a dial plate portion for another one of the operation dials different than the one of the operation dials whose image picture is displayed on a forefront surface.

16. The camera according to claim 15,
wherein the display controller circuitry displays the current setting value of the other one of the operation dials on the dial plate portion avoiding a region where the image picture of another one of the operation dials is overlapped.

17. The camera according to claim 11,
wherein the display controller circuitry displays a setting value of another one of the operation dials different than the one of the operation dials whose image picture is displayed on a forefront surface, in a margin region of the display section.

18. The camera according to claim 11,
wherein in a case where three or more operation dials are provided, the display controller circuitry displays the image picture of at least one of the operation dials in a fixed manner.

19. The camera according to claim 18,
wherein the display controller circuitry displays the image picture of the at least one of the operation dials displayed in the fixed manner on a forefront surface.

20. The camera according to claim 11,
wherein the display section is provided on a top surface of a camera body, and
wherein the plurality of operation dials are provided near the display section.

21. A camera comprising:
a display section;
a plurality of operation dials, each of which is configured to be operated in a rotational direction;
a detector, including a sensor, configured to detect contact or approach of a finger with each of the operation dials; and
a display controller circuitry configured to control a display on the display section,
wherein the display controller circuitry displays an image picture of each of the operation dials at a mutually overlapping position, displays the image picture of each of the operation dials in a mutually overlapping region in a divided manner in a case where the contact or the approach is not detected by the detector, and displays the image picture of each of the operation dials in an overlapped manner and displays the image picture of one of the operation dials, on which the contact or the approach is detected, on the front surface in a case where the contact or the approach is detected by the detector.

22. The camera according to claim 21,
wherein in the case where the contact or the approach is detected by the detector, the display controller circuitry displays a setting value of another one of the operation dials different than the one of the operation dials whose image picture is displayed on a forefront surface in a margin region of the display section.

23. The camera according to claim 21,
wherein in a case where three or more operation dials are provided, the display controller circuitry displays the image picture of at least one of the operation dials in a fixed manner in the case where the image picture of each of the operation dials is displayed in the overlapped manner.

24. The camera according to claim 23,
wherein the display controller circuitry displays the image picture of the at least one of the operation dials displayed in the fixed manner on a forefront surface.

25. The camera according to claim 21,
wherein in the case where the image picture of each of the operation dials is displayed in the overlapped manner, the display controller circuitry displays the image picture in a form in which only a current setting value is displayed on a dial plate portion for another one of the operation dials different than the one of the operation dials whose image picture is displayed on a forefront surface.

26. The camera according to claim 25,
wherein the display controller circuitry displays the current setting value of the other one of the operation dials on the dial plate portion avoiding a region where the image picture of another one of the operation dials is overlapped.

27. The camera according to claim 21,
wherein the display section is provided on a top surface of a camera body, and
wherein the plurality of operation dials are provided near the display section.

28. A camera comprising:
a display section;
a plurality of operation dials, each of which is configured to be operated in a rotational direction; and
a display controller circuitry configured to control a display on the display section,
wherein the display controller circuitry displays an image picture of each of the operation dials at a mutually overlapping position, displays the image picture of each of the operation dials in a mutually overlapping region in a divided manner in a case where none of the operation dials is operated, and displays the image picture of each of the operation dials in an overlapped manner and displays the image picture of one of the operation dials that is operated on a front surface in a case where the one of the operation dials is operated.

29. The camera according to claim 28,
wherein in the case where the one of the operation dials is operated, the display controller circuitry displays a setting value of another one of the operation dials different than the one of the operation dials whose image picture is displayed on a forefront surface, in a margin region of the display section.

30. The camera according to claim 28,
wherein in a case where three or more operation dials are provided, the display controller circuitry displays the image picture of at least one of the operation dials in a fixed manner in the case where the image picture of each of the operation dials is displayed in the overlapped manner.

31. The camera according to claim 30,
wherein the display controller circuitry displays the image picture of the at least one of the operation dials displayed in the fixed manner on a forefront surface.

32. The camera according to claim 28,
wherein in the case where the image picture of each of the operation dials is displayed in the overlapped manner, the display controller circuitry displays the image picture in a form in which only a current setting value is displayed on a dial plate portion for another one of the operation dials different than the one of the operation dials whose image picture is displayed on a forefront surface.

33. The camera according to claim 32,
wherein the display controller circuitry displays the current setting value of the other one of the operation dials on the dial plate portion avoiding a region where the image picture of another one of the operation dials is overlapped.

34. The camera according to claim 28,
wherein the display section is provided on a top surface of a camera body, and
wherein the plurality of operation dials are provided near the display section.

35. A display control method of a camera comprising:
displaying an image picture of each of a plurality of operation dials provided in an overlapped manner on a display section;

detecting contact or approach of a finger with each of the operation dials; and switching an overlapping order of the image picture of each of the operation dials based on a detection result to display the image picture of one of the operation dials, on which the contact or the approach is detected, on a front surface.

36. A display control method of a camera comprising:

displaying an image picture of each of a plurality of operation dials provided in an overlapped manner on a display section; and switching an overlapping order of the image picture of each of the operation dials based on an operation of each of the operation dials to display the image picture of one of the operation dials that is operated on a front surface.

37. A display control method of a camera comprising:

displaying an image picture of each of a plurality of operation dials provided at a mutually overlapping position on a display section;

displaying the image picture of each of the operation dials in a mutually overlapping region in a divided manner in a case where contact or approach of a finger with each of the operation dials is not detected; and displaying the image picture of each of the operation dials in an overlapped manner and displaying the image picture of one of the operation dials, on which the contact or the approach is detected, on a front surface in a case where the contact or the approach of the finger to the one of the operation dials is detected.

38. A display control method of a camera comprising:

displaying an image picture of each of a plurality of operation dials provided at a mutually overlapping position on a display section;

displaying the image picture of each of the operation dials in a mutually overlapping region in a divided manner in a case where none of the operation dials is operated; and displaying the image picture of each of the operation dials in an overlapped manner and displaying the image picture of one of the operation dials that is operated on a front surface in a case where the one of the operation dials is operated.

39. A non-transitory computer-readable tangible medium storing a display control program of a camera that causes a computer to realize:

a function of displaying an image picture of each of a plurality of operation dials provided in an overlapped manner on a display section; and a function of switching an overlapping order of the image picture of each of the operation dials based on a detection result of a detector, including a sensor, configured to detects contact or approach of a finger with each of the operation dials to display the image picture of one of the operation dials, on which the contact or the approach is detected, on a front surface.

40. A non-transitory computer-readable tangible medium storing a display control program of a camera that causes a computer to realize:

a function of displaying an image picture of each of a plurality of operation dials provided in an overlapped manner on a display section; and a function of switching an overlapping order of the image picture of each of the operation dials based on an operation of each of the operation dials to display the image picture of one of the operation dials that is operated on a front surface.

41. A non-transitory computer-readable tangible medium storing a display control program of a camera that causes a computer to realize:

a function of displaying an image picture of each of a plurality of operation dials provided at a mutually overlapping position on a display section; and a function of controlling a display of the image picture of each of the operation dials based on a detection result of a detector, including a sensor, that is configured to detect contact or approach of a finger with each of the operation dials, and a function of displaying the image picture of each of the operation dials in a mutually overlapping region in a divided manner in a case where contact or approach of a finger with each of the operation dials is not detected, and of displaying the image picture of each of the operation dials in an overlapped manner and displaying the image picture of one of the operation dials, on which the contact or the approach is detected, on a front surface in a case where the contact or the approach of the finger to the one of the operation dials is detected.

42. A non-transitory computer-readable tangible medium storing a display control program of a camera that causes a computer to realize:

a function of displaying an image picture of each of a plurality of operation dials provided at a mutually overlapping position on a display section; and a function of controlling a display of the image picture of each of the operation dials based on an operation of each of the operation dials, and a function of displaying the image picture of each of the operation dials in a mutually overlapping region in a divided manner in a case where none of the operation dials is operated, and of displaying the image picture of each of the operation dials in an overlapped manner and displaying the image picture of an one of the operation dials that is operated on a front surface in a case where the one of the operation dials is operated.

* * * * *